US012799807B2

(12) United States Patent
Megharaj et al.

(10) Patent No.: US 12,799,807 B2
(45) Date of Patent: Nov. 17, 2026

(54) VACUUM INSULATED PANEL WITH LOW TEMPERATURE SEAL HAVING LOW CARBON CONTENT

(71) Applicant: LuxWall, Inc., Ypsilanti, MI (US)

(72) Inventors: Prabhu Megharaj, Novi, MI (US); Scott V. Thomsen, Glen Arbor, MI (US)

(73) Assignee: LUXWALL, INC., Ypsilanti, MI (US)

( * ) Notice: Subject to any disclaimer, the term of this patent is extended or adjusted under 35 U.S.C. 154(b) by 225 days.

(21) Appl. No.: 18/650,204

(22) Filed: Apr. 30, 2024

(65) Prior Publication Data

US 2025/0333998 A1 Oct. 30, 2025

(51) Int. Cl.
*E06B 3/66* (2006.01)
*E06B 3/663* (2006.01)
*E06B 3/673* (2006.01)

(52) U.S. Cl.
CPC ........ *E06B 3/6612* (2013.01); *E06B 3/66333* (2013.01); *E06B 3/6736* (2013.01)

(58) Field of Classification Search
CPC ............... E06B 3/6612; E06B 3/66333; E06B 3/6736
See application file for complete search history.

(56) References Cited

U.S. PATENT DOCUMENTS 3,433,611 A 3/1969 Saunders et al.
4,040,808 A 8/1977 Kahn et al.
4,892,847 A 1/1990 Reinherz
5,124,185 A 6/1992 Kerr et al.
5,489,321 A 2/1996 Tracy et al.
5,657,607 A 8/1997 Collins
5,664,395 A 9/1997 Collins
5,935,702 A 8/1999 Macquart et al.
6,042,934 A 3/2000 Guiselin et al.
(Continued)

FOREIGN PATENT DOCUMENTS

CN 116675435 9/2023
EP 1 065 183 A1 1/2001
(Continued)

OTHER PUBLICATIONS

Modeling of Vacuum Insulating Glazing, Published by Ashrae; by Hart et al.; 7pgs. (Dec. 2013).
(Continued)

*Primary Examiner* — Catherine A. Simone
(74) *Attorney, Agent, or Firm* — Nixon & Vanderhye P.C.

(57) ABSTRACT

A vacuum insulating panel includes may include: a first substrate; a second substrate; a plurality of spacers provided in a gap between at least the first and second substrates, wherein the gap is at a pressure less than atmospheric pressure; a seal provided between at least the first and second substrates, the seal comprising a first seal layer and/or a second seal layer; and wherein the first seal layer may be a low-temperature seal layer which has a low melting point to reduce de-tempering of glass substrate(s) during manufacturing. For example, the first seal layer may include tellurium oxide and/or vanadium oxide. The first seal layer may be processed in manner to reduce carbon content therein so as to improve stability of the panel upon ultraviolet (UV) exposure.

59 Claims, 22 Drawing Sheets

(56) References Cited

U.S. PATENT DOCUMENTS

| | | | |
|---|---|---|---|
| 6,106,798 | A | 8/2000 | Kambe et al. |
| 6,322,881 | B1 | 11/2001 | Boire et al. |
| 6,352,749 | B1 | 3/2002 | Aggas |
| 6,444,281 | B1 | 9/2002 | Wang et al. |
| 6,533,632 | B1 | 3/2003 | Dynka |
| 6,558,494 | B1 | 5/2003 | Wang et al. |
| 6,641,689 | B1 | 11/2003 | Aggas |
| 6,946,171 | B1 | 9/2005 | Aggas |
| 7,045,181 | B2 | 5/2006 | Yoshizawa et al. |
| 7,115,308 | B2 | 10/2006 | Amari et al. |
| 7,314,668 | B2 | 1/2008 | Lingle et al. |
| 7,342,716 | B2 | 3/2008 | Hartig |
| 7,407,423 | B2 | 8/2008 | Aitken et al. |
| 7,425,166 | B2 | 9/2008 | Burt et al. |
| 7,560,402 | B2 | 7/2009 | Thomsen |
| 7,632,571 | B2 | 12/2009 | Hartig et al. |
| 7,858,193 | B2 | 12/2010 | Ihlo et al. |
| 7,910,229 | B2 | 3/2011 | Medwick et al. |
| 7,919,157 | B2 | 4/2011 | Cooper |
| 8,490,434 | B2 | 7/2013 | Watanabe et al. |
| 8,500,933 | B2 | 8/2013 | Cooper |
| 8,590,343 | B2 | 11/2013 | Wang |
| 8,821,999 | B2 | 9/2014 | Grzybowski et al. |
| 8,833,105 | B2 | 9/2014 | Dennis et al. |
| 8,951,617 | B2 | 2/2015 | Reymond et al. |
| 9,169,155 | B2 | 10/2015 | Dennis et al. |
| 9,215,760 | B2 | 12/2015 | Fischer et al. |
| 9,290,984 | B2 | 3/2016 | Hogan et al. |
| 9,388,628 | B2 | 7/2016 | Petrmichl et al. |
| 9,428,952 | B2 | 8/2016 | Dennis et al. |
| 9,441,416 | B2 | 9/2016 | Veerasamy et al. |
| 9,458,052 | B2 | 10/2016 | Dennis |
| 9,593,527 | B2 | 3/2017 | Hogan et al. |
| 9,752,375 | B2 | 9/2017 | Jones |
| 9,776,910 | B2 | 10/2017 | Dennis |
| 9,822,580 | B2 | 11/2017 | Cooper |
| 9,908,811 | B2 | 3/2018 | Gross et al. |
| 9,988,302 | B2 | 6/2018 | Hogan et al. |
| 10,011,525 | B2 | 7/2018 | Logunov et al. |
| 10,017,417 | B2 | 7/2018 | Dejneka et al. |
| 10,077,204 | B2 | 9/2018 | Maschmeyer et al. |
| 10,087,676 | B2 | 10/2018 | Dennis |
| 10,107,028 | B2 | 10/2018 | Dennis |
| 10,125,045 | B2 | 11/2018 | Dennis |
| 10,153,389 | B2 | 12/2018 | Godeke et al. |
| 10,267,085 | B2 | 4/2019 | Dennis et al. |
| 10,280,680 | B2 | 5/2019 | Veerasamy et al. |
| 10,421,684 | B2 | 9/2019 | Hogan et al. |
| 10,435,938 | B2 | 10/2019 | Dennis et al. |
| 10,465,433 | B2 | 11/2019 | Hogan et al. |
| 10,611,664 | B2 | 4/2020 | Lezzi et al. |
| 10,731,403 | B2 | 8/2020 | Krisko et al. |
| 10,745,317 | B2 | 8/2020 | Godeke et al. |
| 10,752,535 | B2 | 8/2020 | Dennis |
| 10,759,693 | B2 | 9/2020 | Xu et al. |
| 10,829,984 | B2 | 11/2020 | Dennis et al. |
| 10,858,880 | B2 | 12/2020 | Dennis |
| 10,954,160 | B2 | 3/2021 | Streltsov et al. |
| 11,014,847 | B2 | 5/2021 | Dennis |
| 11,028,009 | B2 | 6/2021 | Dennis |
| 11,028,637 | B2 | 6/2021 | Abe et al. |
| 11,124,450 | B2 | 9/2021 | Miki et al. |
| 11,285,703 | B2 | 3/2022 | Jorgensen et al. |
| 12,338,677 | B2 | 6/2025 | Thomsen et al. |
| 12,365,164 | B2 | 7/2025 | Thomsen et al. |
| 12,377,639 | B2 | 8/2025 | Thomsen |
| 12,377,640 | B2 | 8/2025 | Thomsen et al. |
| 12,391,026 | B2 | 8/2025 | Thomsen |
| 12,409,634 | B2 | 9/2025 | Thomsen |
| 12,410,654 | B2 | 9/2025 | Thomsen et al. |
| 12,434,994 | B2 | 10/2025 | Thomsen |
| 12,442,243 | B2 | 10/2025 | Thomsen |
| 12,442,244 | B2 | 10/2025 | Thomsen et al. |
| 12,460,467 | B2 | 11/2025 | Thomsen et al. |
| 12,460,468 | B2 | 11/2025 | Thomsen |
| 12,460,469 | B2 | 11/2025 | Thomsen |
| 12,467,308 | B2 | 11/2025 | Thomsen |
| 12,529,257 | B2 | 1/2026 | Thomsen et al. |
| 12,612,821 | B2 | 4/2026 | Thomsen et al. |
| 2009/0142669 | A1 | 6/2009 | Shinohara et al. |
| 2009/0155500 | A1* | 6/2009 | Cooper ................. E06B 3/6612 428/34 |
| 2009/0155555 | A1 | 6/2009 | Botelho et al. |
| 2009/0266015 | A1 | 10/2009 | Schield |
| 2009/0324858 | A1 | 12/2009 | Jaeger |
| 2010/0139195 | A1 | 6/2010 | Tinianov et al. |
| 2010/0330308 | A1 | 12/2010 | Cooper et al. |
| 2012/0055553 | A1 | 3/2012 | Logunov et al. |
| 2012/0131959 | A1 | 5/2012 | No et al. |
| 2012/0202049 | A1 | 8/2012 | Valladeau et al. |
| 2013/0101759 | A1 | 4/2013 | Jones |
| 2013/0111953 | A1 | 5/2013 | Maloney |
| 2014/0037870 | A1 | 2/2014 | Petrmichl et al. |
| 2014/0196502 | A1 | 7/2014 | Masuda et al. |
| 2014/0299256 | A1 | 10/2014 | Sridharan et al. |
| 2015/0218042 | A1 | 8/2015 | Hogan et al. |
| 2015/0357489 | A1 | 12/2015 | Konig et al. |
| 2015/0380330 | A1 | 12/2015 | Mitsui et al. |
| 2016/0008919 | A1 | 1/2016 | Bostanjoglo et al. |
| 2016/0297706 | A1 | 10/2016 | Naito et al. |
| 2017/0016270 | A1 | 1/2017 | Kayaba et al. |
| 2017/0138115 | A1 | 5/2017 | Hogan et al. |
| 2017/0203997 | A1 | 7/2017 | Miyake et al. |
| 2017/0243995 | A1 | 8/2017 | Godeke et al. |
| 2017/0283318 | A1 | 10/2017 | Yokota et al. |
| 2018/0094475 | A1 | 4/2018 | Naito et al. |
| 2018/0238104 | A1 | 8/2018 | Mikkelsen et al. |
| 2019/0035951 | A1 | 1/2019 | Lee et al. |
| 2019/0106931 | A1 | 4/2019 | Krisko et al. |
| 2019/0177208 | A1* | 6/2019 | Gödeke ..................... C03C 8/24 |
| 2019/0367405 | A1 | 12/2019 | Naito et al. |
| 2020/0325723 | A1 | 10/2020 | Caliaro et al. |
| 2020/0392036 | A1 | 12/2020 | Naito et al. |
| 2021/0147281 | A1 | 5/2021 | Currie et al. |
| 2021/0199367 | A1 | 7/2021 | Kim et al. |
| 2021/0254395 | A1 | 8/2021 | Nielsen et al. |
| 2021/0254398 | A1 | 8/2021 | Andersen et al. |
| 2021/0262279 | A1 | 8/2021 | Hedeby et al. |
| 2021/0270084 | A1 | 9/2021 | Abe et al. |
| 2022/0025697 | A1 | 1/2022 | Nielsen |
| 2022/0074258 | A1 | 3/2022 | Andersen et al. |
| 2022/0235601 | A1 | 7/2022 | Krisko et al. |
| 2023/0038053 | A1 | 2/2023 | Fei et al. |
| 2024/0026729 | A1 | 1/2024 | Gong et al. |

FOREIGN PATENT DOCUMENTS

| | | | |
|---|---|---|---|
| EP | 1 563 952 | B1 | 6/2013 |
| EP | 3 757 079 | A1 | 12/2020 |
| JP | 2011-84437 | | 4/2011 |
| KR | 10-2019-0024313 | | 3/2019 |
| WO | WO 2013/109456 | | 7/2013 |
| WO | WO 2014/052178 | | 4/2014 |
| WO | WO 2016/123273 | | 8/2016 |
| WO | WO 2020/002134 | | 1/2020 |
| WO | WO 2020/094197 | | 5/2020 |
| WO | WO 2021/010960 | | 1/2021 |
| WO | WO 2021/038907 | | 3/2021 |
| WO | WO 2021/224228 | | 11/2021 |

OTHER PUBLICATIONS

Glass forming region and bonding mechanism of low-melting V2O5—TeO2—Bi2O3 glass applied in vacuum glazing sealin , Li et a1., Journal of American Ceramic Socie (May 2021).

Laser Assisted Frit Sealing for High Thermal Expansion Glasses; *JLMN-Journal of Laser Micro/Nanoengineering* vol. 7, No. 3, 2012, by Logunov et al.; 8 pgs (Dec. 2012).

Vacuum Insulated Glazing under the Influence of a Thermal Load; 2 pgs; by Aronen et al. (Jul. 2020).

Edge Conduction in Vacuum Glazing; Presented at Thermal Performance of the Exterior Envelopes of Buildings VI, Clearwater Beach, FL, Dec. 4-8, 1995, by Simko et al.; 14pgs (Dec. 1995).

(56) References Cited

OTHER PUBLICATIONS

U.S. Appl. No. 18/376,897, filed Oct. 5, 2023.
U.S. Appl. No. 18/376,473, filed Oct. 4, 2023.
U.S. Appl. No. 18/376,900, filed Oct. 5, 2023.
U.S. Appl. No. 18/376,907, filed Oct. 5, 2023.
U.S. Appl. No. 18/376,479, filed Oct. 4, 2023.
U.S. Appl. No. 18/376,483, filed Oct. 4, 2023.
U.S. Appl. No. 18/376,490, filed Oct. 4, 2023.
U.S. Appl. No. 18/376,495, filed Oct. 4, 2023.
U.S. Appl. No. 18/376,926, filed Oct. 5, 2023.
U.S. Appl. No. 18/376,914, filed Oct. 5, 2023.
U.S. Appl. No. 18/376,503, filed Oct. 4, 2023.
U.S. Appl. No. 18/379,275, filed Oct. 12, 2023.
U.S. Appl. No. 18/379,285, filed Oct. 12, 2023.
U.S. Appl. No. 18/376,932, filed Oct. 5, 2023.
U.S. Appl. No. 18/377,328, filed Oct. 6, 2023.
U.S. Appl. No. 18/377,335, filed Oct. 6, 2023.
U.S. Appl. No. 18/517,044, filed Nov. 22, 2023.
U.S. Appl. No. 18/513,944, filed Nov. 20, 2023.
U.S. Appl. No. 18/510,777, filed Nov. 16, 2023.
U.S. Appl. No. 18/616,420, filed Mar. 26, 2024.
U.S. Appl. No. 18/636,472, filed Apr. 16, 2024.
U.S. Appl. No. 18/632,364, filed Apr. 11, 2024.
U.S. Appl. No. 18/617,736, filed Mar. 27, 2024.
U.S. Appl. No. 18/619,266, filed Mar. 28, 2024.
U.S. Appl. No. 18/623,109, filed Apr. 1, 2024.
U.S. Appl. No. 18/626,359, filed Apr. 4, 2024.
U.S. Appl. No. 18/633,733, filed Apr. 12, 2024.
U.S. Appl. No. 18/629,996, filed Apr. 9, 2024.
U.S. Appl. No. 18/650,204, filed Apr. 30, 2024.
U.S. Appl. No. 18/654,040, filed May 3, 2024.
U.S. Appl. No. 18/664,462, filed May 15, 2024.
U.S. Appl. No. 18/668,374, filed May 20, 2024.
International Search Report and Written Opinion dated Nov. 27, 2024 for PCT/US2024/029888.
Moawad et al. "Electrical Conductivity of Silver Vanadium Tellurite Glasses", J. Am. Ceram. Soc, 85 [11] 2655-59 (2002), 5 pages.
Marple et al., "Structure of TeO2 Glass: Results from 2D Te NMR Spectroscopy", Dept. of Materials Science & Engineering, Univ. of Calif at Davis (2019).
Wang et al., "Tellurite Glass and Its Application in Lasers" (Apr. 2020).
XPS and magnetic studies of vanadium tellurite glasses, Mekki et al. (Aug. 2009).
Neutron Diffraction Study of 2 $TeO_2$ $V_2O_5$ Glass, Neov et al. (1983).
Structure of vanadium tellurite glasses studied by neutron and X-ray diffraction, Hoppe et al. (Jun. 2002).
Structure of zinc and niobium tellurite glasses by neutron and x-ray diffraction, Hoppe et al. (Feb. 2004).
Structure and low melting property of vanadate tellurite glass, Luo et al. (2011).
Effect of the mode formation on the structure of tellurite glasses, Dimitriev et al., Journal of Non-Crystalline Solids 95&96 (1987).
Characterization of soda-lime silicate glass bottles to support recycling efforts, Gerace et al., Ceramic Engineering & Science (2024).

* cited by examiner

De-Tempering of Glass is a Function of Temperature and Time

| Temp (C) | Temp (F) | Exposure (hrs) | De-Temper (%) | Exposure (hrs) | De-Temper (%) |
|---|---|---|---|---|---|
| 315 | 600 | 1.0 | 5 | 0.1 | 0 |
| 371 | 700 | 1.0 | 12 | 0.1 | 0 |
| 427 | 800 | 1.0 | 30 | 0.1 | 5 |
| 482 | 900 | 1.0 | 82 | 0.1 | 40 |

Example Main Seal Material (Weight % and Mol %)

(non-carbon detecting XRF)

| Oxide | Mol % (Avg) | Wt % (Avg) |
|---|---|---|
| Te oxide | 35.84% | 46.65% |
| V oxide | 17.83% | 26.45% |
| Al oxide | 14.37% | 11.95% |
| SiO2 | 19.23% | 9.43% |
| MgO | 9.45% | 3.11% |
| MnO | 2.06% | 1.19% |
| BaO | 0.46% | 0.57% |
| ZrO2 | 8.05% | 0.08% |
| K2O | 0.06% | 0.05% |
| Na2O | 0.17% | 0.09% |
| CaO | 0.18% | 0.08% |
| Fe2O3 | 0.07% | 0.09% |
| P2O5 | 0.02% | 0.05% |
| Bi2O3 | 0.01% | 0.06% |
| SO3 | 0.05% | 0.03% |
| PbO | 0.01% | 0.03% |
| CuO | 0.01% | 0.01% |
| ZnO | 0.02% | 0.01% |
| SnO2 | 0.05% | 0.07% |

Fig. 11

Example Main Seal Material (Weight % and Mol %)

(XRF)

| | Main Powder (wt%) | Main Post Laser (wt%) |
|---|---|---|
| $TeO_4$ | 28.10 | 8.50 |
| $TeO_3$ | 20.30 | 47.26 |
| $TeO_{3+1}$ | 0.70 | 2.81 |
| $V_2O_5$ | 17.57 | 3.40 |
| $VO_2$ | 4.40 | 23.80 |
| $V_2O_3$ | 0.35 | 0.95 |
| $Al_2O_3$ | 13.93 | 7.18 |
| $SiO_2$ | 9.73 | 2.39 |
| MgO | 3.22 | 0.33 |
| BaO | 0.57 | - |
| MnO | 1.03 | 1.32 |
| $Fe_2O_3$ | 0.10 | - |
| $ZrO_2$ | - | 0.28 |
| $Bi_2O_3$ | - | 1.77 |

| | Main Powder (Mol%) | Main Post Laser (Mol%) |
|---|---|---|
| $TeO_4$ | 21.23 | 7.95 |
| $TeO_3$ | 15.39 | 44.57 |
| $TeO_{3+1}$ | 0.54 | 2.65 |
| $V_2O_5$ | 12.40 | 5.82 |
| $VO_2$ | 2.20 | 14.67 |
| $V_2O_3$ | 0.24 | 2.80 |
| $Al_2O_3$ | 16.51 | 10.59 |
| $SiO_2$ | 19.57 | 5.99 |
| MgO | 9.65 | 1.25 |
| BaO | 0.45 | - |
| MnO | 1.75 | 2.81 |
| $Fe_2O_3$ | 0.08 | - |
| $ZrO_2$ | - | 0.35 |
| $Bi_2O_3$ | - | 0.57 |

Fig. 12

Example Primer Material (Weight % and Mol %)

(carbon detecting XRF)

| | Primer As-Received (wt%) | Primer Post-Laser (wt%) |
|---|---|---|
| $Bi_2O_3$ | 20.00 | 34.50 |
| $SiO_2$ | 17.76 | 18.81 |
| $B_2O_3$ | 27.74 | 17.80 |
| $TiO_2$ | 5.42 | 8.32 |
| ZnO | 1.59 | 2.43 |
| $Na_2O$ | 4.21 | 2.54 |
| $Al_2O_3$ | 0.34 | 0.18 |
| $ZrO_2$ | 0.69 | 1.16 |
| $Cr_2O_3$ | 0.17 | 0.33 |
| MnO | 0.09 | 0.13 |
| $Fe_2O_3$ | 0.32 | 0.44 |
| NiO | 0.20 | 0.30 |
| $SO_3$ | 0.21 | - |
| $CO_2$ | 21.26 | 13.05 |

| | Primer As-Received (Mol%) | Primer Post-Laser (Mol%) |
|---|---|---|
| $Bi_2O_3$ | 3.08 | 6.52 |
| $SiO_2$ | 21.20 | 27.56 |
| $B_2O_3$ | 28.59 | 22.51 |
| $TiO_2$ | 4.87 | 9.17 |
| ZnO | 1.40 | 2.63 |
| $Na_2O$ | 4.88 | 3.61 |
| $Al_2O_3$ | 0.24 | 0.16 |
| $ZrO_2$ | 0.40 | 0.83 |
| $Cr_2O_3$ | 0.08 | 0.19 |
| MnO | 0.09 | 0.17 |
| $Fe_2O_3$ | 0.14 | 0.24 |
| NiO | 0.19 | 0.35 |
| $SO_3$ | 0.19 | - |
| $CO_2$ | 34.65 | 26.10 |

Fig. 13a

Example Primer Material for Layer(s) 31 and/or 32 (Wt.% & Mol.%)
[Measured via Fused Bead XRF]

| | PRIMER As-Received (Normalized) Weight % | PRIMER As-Received Mole % | PRIMER Post-Laser (Normalized) Weight% | PRIMER Post - Laser Mole % |
|---|---|---|---|---|
| B2O3 | 37.55 | 48.20% | 37.47 | 48.07% |
| Bi2O3 | 27.25 | 5.226% | 27.19 | 5.21% |
| SiO2 | 18.50 | 27.52% | 18.75 | 27.88% |
| TiO2 | 7.75 | 8.67% | 7.69 | 8.60% |
| Na2O | 4.11 | 5.921% | 4.01 | 5.77% |
| ZnO | 1.84 | 2.02% | 1.83 | 2.01% |
| ZrO2 | 1.19 | 0.86% | 1.19 | 0.87% |
| Al2O3 | 0.31 | 0.27% | 0.31 | 0.27% |
| P2O5 | 0.03 | 0.02% | 0.03 | 0.02% |
| SO3 | 0.14 | 0.15% | 0.16 | 0.17% |
| K2O | 0.04 | 0.04% | 0.05 | 0.04% |
| CaO | 0.06 | 0.10% | 0.06 | 0.10% |
| Cr2O3 | 0.26 | 0.15% | 0.26 | 0.15% |
| MnO | 0.14 | 0.18% | 0.14 | 0.17% |
| Fe2O3 | 0.40 | 0.22% | 0.41 | 0.23% |
| Co2O3 | 0.09 | 0.05% | 0.10 | 0.05% |
| NiO | 0.31 | 0.37% | 0.31 | 0.37% |
| CuO | 0.01 | 0.01% | 0.00 | 0.00% |
| Nb2O5 | 0.00 | 0.00% | 0.02 | 0.01% |
| HfO2 | 0.03 | 0.01% | 0.02 | 0.01% |
| | **100.00** | **100%** | **100.00** | **100%** |

Fig. 13b

Main Seal

| | Main Powder Weight % | Main Powder Mol% | Main Post-Laser Weight % | Main Post-Laser Mol % |
|---|---|---|---|---|
| Te | 44.90 | 13.05 | 60.30 | 27.30 |
| V | 14.30 | 10.41 | 20.30 | 23.02 |
| O | 23.20 | 53.77 | 9.28 | 33.51 |
| Al | 8.43 | 11.58 | 4.89 | 10.47 |
| Si | 5.20 | 6.87 | 1.44 | 2.96 |
| Mg | 2.22 | 3.40 | 0.26 | 0.62 |
| Ba | 0.58 | 0.16 | - | - |
| Na | 0.03 | 0.05 | - | - |
| P | 0.00 | 0.00 | - | - |
| S | 0.01 | 0.01 | - | - |
| Cl | - | - | - | - |
| K | - | - | - | - |
| Ca | 0.04 | 0.04 | - | - |
| Mn | 0.91 | 0.61 | 1.32 | 1.39 |
| Fe | 0.08 | 0.05 | - | - |
| Ni | 0.01 | 0.00 | - | - |
| Cu | 0.01 | 0.00 | - | - |
| Zn | - | - | 0.04 | 0.04 |
| Zr | 0.01 | 0.00 | - | - |
| Ge | - | - | - | - |
| Sr | - | - | - | - |
| Mo | - | - | - | - |
| Pb | 0.01 | 0.00 | - | - |
| Bi | 0.01 | 0.00 | 1.91 | 0.53 |

Pump-out Tube Seal

| | Preform Weight % | Preform Mol % | Preform Post-Laser (Weight %) | Preform Post Laser (Mol%) |
|---|---|---|---|---|
| Te | 52.20 | 16.78 | 51.10 | 16.64 |
| V | 11.60 | 9.34 | 9.35 | 7.63 |
| O | 18.90 | 48.45 | 18.70 | 48.56 |
| Al | 7.29 | 11.08 | 4.63 | 7.13 |
| Si | 4.93 | 7.20 | 7.22 | 10.68 |
| Mg | 2.38 | 4.03 | 0.77 | 1.32 |
| Ba | 0.56 | 0.17 | 2.25 | 0.68 |
| Na | 0.57 | 1.02 | 1.55 | 2.80 |
| P | 0.06 | 0.08 | 0.11 | 0.15 |
| S | 1.32 | 1.69 | 1.73 | 2.24 |
| Cl | 0.04 | 0.05 | 0.14 | 0.16 |
| K | - | - | 0.52 | 0.55 |
| Ca | 0.07 | 0.07 | 0.16 | 0.17 |
| Mn | - | - | - | - |
| Fe | 0.06 | 0.04 | 1.69 | 1.26 |
| Ni | - | - | - | - |
| Cu | - | - | - | - |
| Zn | - | - | - | - |
| Ge | - | - | 0.06 | 0.04 |
| Sr | - | - | 0.03 | 0.01 |
| Zr | 0.01 | 0.00 | - | - |
| Mo | 0.01 | 0.00 | - | - |
| Pb | - | - | - | - |
| Bi | - | - | - | - |

Primer

| | Primer Powder (Weight %) | Primer Powder (Mol%) | Primer Tempered (Weight %) | Primer Tempered (Mol%) |
|---|---|---|---|---|
| Bi | 19.70 | 1.92 | 33.30 | 4.15 |
| Si | 9.73 | 7.06 | 10.10 | 9.37 |
| B | 10.10 | 19.03 | 6.35 | 15.30 |
| Ti | 3.81 | 1.62 | 5.73 | 3.12 |
| Zn | 1.50 | 0.47 | 2.24 | 0.89 |
| C | 6.80 | 11.53 | 4.09 | 8.87 |
| O | 42.80 | 54.48 | 33.80 | 55.02 |
| Na | 3.66 | 3.24 | 2.16 | 2.45 |
| Al | 0.21 | 0.16 | 0.11 | 0.11 |
| Zr | 0.60 | 0.13 | 0.99 | 0.28 |
| Cr | 0.14 | 0.05 | 0.26 | 0.13 |
| Mn | 0.08 | 0.03 | 0.12 | 0.06 |
| Fe | 0.26 | 0.09 | 0.35 | 0.16 |
| Co | 0.04 | 0.01 | 0.06 | 0.03 |
| Ni | 0.18 | 0.06 | 0.27 | 0.12 |
| P | 0.02 | 0.01 | - | - |
| S | 0.10 | 0.06 | - | - |
| Cl | 0.03 | 0.02 | - | - |
| K | 0.04 | 0.02 | - | - |
| Ca | 0.01 | 0.01 | - | - |
| Nb | 0.01 | 0.00 | 0.01 | 0.00 |
| Cu | 0.003 | 0.00 | - | - |
| Y | 0.001 | 0.00 | - | - |

Example Materials for Main Seal, Primer(s), and Pump-out Tube Seal (Wt. % & Mol %) Based on Elemental Analysis (non-oxide analysis) [WDXRF]

Fig. 14

Example Pump-Out Tube Seal Material Pre and Post Sintered (Weight % and Mol %) (carbon detecting XRF)

| | Preform Pre-Laser (wt%) | Preform Post-Laser (wt%) |
|---|---|---|
| $TeO_4$ | 6.00 | 8.30 |
| $TeO_3$ | 46.20 | 43.10 |
| $TeO_{3+1}$ | 2.50 | 2.50 |
| $V_2O_5$ | 5.90 | 2.92 |
| $VO_2$ | 11.00 | 10.04 |
| $V_2O_3$ | 0.50 | 1.08 |
| $Al_2O_3$ | 11.55 | 7.38 |
| $SiO_2$ | 8.85 | 13.02 |
| MgO | 3.31 | 1.08 |
| BaO | 0.52 | 2.12 |
| $Na_2O$ | 0.64 | 1.76 |
| $P_2O_5$ | 0.12 | 0.21 |
| SO3 | 2.76 | 3.64 |
| Cl | - | - |
| $K_2O$ | - | 0.54 |
| CaO | 0.08 | 0.19 |
| $Fe_2O_3$ | 0.07 | 2.04 |
| $GeO_2$ | - | 0.08 |

| | Pre-Laser (Mol%) | Preform Post-Laser (Mol%) |
|---|---|---|
| $TeO_4$ | 4.60 | 6.17 |
| $TeO_3$ | 34.80 | 32.07 |
| $TeO_{3+1}$ | 1.86 | 1.83 |
| $V_2O_5$ | 5.05 | 2.48 |
| $VO_2$ | 5.85 | 5.97 |
| $V_2O_3$ | 0.57 | 0.74 |
| $Al_2O_3$ | 13.62 | 8.59 |
| $SiO_2$ | 17.70 | 25.75 |
| MgO | 9.88 | 3.17 |
| BaO | 0.41 | 1.64 |
| $Na_2O$ | 1.25 | 3.38 |
| $P_2O_5$ | 0.05 | 0.09 |
| SO3 | 4.15 | 5.41 |
| Cl | - | - |
| $K_2O$ | - | 0.69 |
| CaO | 0.18 | 0.40 |
| $Fe_2O_3$ | 0.05 | 1.52 |
| $GeO_2$ | - | 0.09 |

Fig. 19

VACUUM INSULATED PANEL WITH LOW TEMPERATURE SEAL HAVING LOW CARBON CONTENT

FIELD

Certain example embodiments are generally related to vacuum insulated devices such as vacuum insulating panels that may be used for windows or the like, and/or methods of making same.

BACKGROUND AND SUMMARY

Vacuum insulated panels are known in the art. For example, and without limitation, vacuum insulating panels are disclosed in U.S. Pat. Nos. 5,124,185, 5,657,607, 5,664,395, 7,045,181, 7,115,308, 8,821,999, 10,153,389, and 11,124,450, the disclosures of which are all hereby incorporated herein by reference in their entireties.

As discussed and/or shown in one or more of the above patent documents, a vacuum insulating panel typically includes an outboard substrate, an inboard substrate, a hermetic edge seal, a sorption getter, a pump-out port, and spacers (e.g., pillars) sandwiched between at least the two substrates. The gap between the substrates may be at a pressure less than atmospheric pressure to provide insulating properties. Providing a vacuum in the space between the substrates reduces conduction and convection heat transport, and thus provides insulating properties. For example, a vacuum insulating panel provides thermal insulation resistance by reducing convective energy between the two substrates, reducing conductive energy between the two transparent substrates, and reducing radiative energy with a low-emissivity (low-E) coating provided on one of the substrates. Vacuum insulating panels may be used in window applications (e.g., for commercial and/or residential windows), and/or for other applications such as commercial refrigeration and consumer appliance applications.

It is known that edge seals in vacuum insulating panels have been made from either high temperature material (e.g., solder glass) with a high melting point, or from low temperature material with a low melting point. It is sometimes desirable to use low-temperature edge seal material (e.g., edge seal material having a low melting point) in a vacuum insulating panel so that the edge seal material can be heated to a lesser extent during manufacturing when forming the edge seal, so as to reduce de-tempering of glass substrates.

However, it has unfortunately been found that vacuum insulating panels having edge seals comprising low temperature material (at least one edge seal layer having a low melting point) outgas carbon monoxide, carbon dioxide, oxygen, and/or hydrogen rather quickly upon exposure to ultraviolet (UV) radiation. For example, seals tend to outgas carbon monoxide, carbon dioxide, oxygen, and/or hydrogen when exposed to high levels of UV radiation or prolonged exposure to ambient UV radiation, and vacuum getters contained internal to the vacuum cavity cannot adsorb all outgassed species emitted over a period of time from the low temperature seal material as a result of UV exposure. Thus, the vacuum insulating panel u-factors increase in an undesirable manner upon exposure to UV due to vacuum cavity contamination which increases the effective pressure in the cavity. The increase in u-factor reduces the useful life of the vacuum insulated panel making it challenging to achieve a desirable, e.g., twenty to thirty year product life.

The instant inventors have found a solution to this problem. The instant inventors have found that a cause of such UV induced degradation of vacuum insulating panels is high amounts of residual carbon remaining in low-temperature edge seal material after formation of the seal. Residual carbon is present in the edge seal material due to its presence in organic solvent(s) and binders such as polyalkylene carbonate, polypropylene (PP) carbonate, ethyl cellulose, methyl cellulose, or hydroxypropyl methyl cellulose used in the initial application of the edge seal material in the form of a paste. Such carbon containing solvent(s) and/or binder(s) are used in all ceramic edge seals for vacuum insulating panels as far as the instant inventors are aware. It has been found that high amounts of residual carbon remaining in the ceramic edge seal, after formation of the seal, leads to rather quick outgassing problems and increasing u-factors of the panel upon significant or prolonged UV exposure. In other words, the instant inventors have found that too much residual carbon remaining in the ceramic edge seal material of the final panel is problematic in these respects, especially upon UV exposure.

In certain example embodiments, processing has been improved in order to remove more carbon from low temperature edge seal material, so that less residual carbon remains in the ceramic edge seal of the final manufactured vacuum insulating panel. De-tempering of glass can be reduced by using low temperature edge seal material having a low melting point (possibly in combination with high temperature material for other seal layer(s) such as primer(s)), and by reducing residual carbon content in such low temperature edge seal material the manufactured panel is less susceptible to degradation upon UV exposure, and may in certain example embodiments be capable of one or more of approximately a twenty, twenty-five, and/or a thirty year product lifetime.

In certain example embodiments, there may be provided a vacuum insulating panel includes may include: a first substrate; a second substrate; a plurality of spacers provided in a gap between at least the first and second substrates, wherein the gap is at a pressure less than atmospheric pressure; a seal provided between at least the first and second substrates, the seal comprising a first seal layer, and optionally second and/or third seal layer(s). The first seal layer may be a low-temperature seal layer which has a low melting point to reduce de-tempering of glass substrate(s) during panel manufacturing. For example, the first seal layer may include tellurium oxide and/or vanadium oxide. The first seal layer may be processed in manner to reduce carbon content thereof so as to improve stability of the panel upon UV exposure.

In certain example embodiments, there may be provided a vacuum insulating panel comprising: a first substrate; a second substrate; a plurality of spacers provided in a gap between at least the first and second substrates, wherein the gap is at pressure less than atmospheric pressure; a seal provided at least partially between at least the first and second substrates, the seal comprising a ceramic first seal layer; and wherein the first seal layer has a melting point of no greater than about 450 degrees C (more preferably no greater than about 430 degrees C, more preferably no greater than about 420 degrees C, for example no more than about 400 degrees C) and comprises from about 5 to 70 ppm carbon (more preferably from about 5 to 43 ppm carbon).

In certain example embodiments, there may be provided a vacuum insulating panel comprising: a first glass substrate; a second glass substrate; a plurality of spacers provided in a gap between at least the first and second substrates, wherein the gap is at pressure less than atmospheric pressure; a seal provided at least partially between at least the first and second substrates, the seal comprising a first seal layer; wherein the first seal layer comprises tellurium oxide and/or vanadium oxide, and wherein on an elemental basis in terms of wt. % either Te or V has the largest content of any metal in the first seal layer; and wherein the first seal layer comprises from about 5 to 70 ppm carbon, more preferably from about 5-50 ppm carbon, more preferably from about 5 to 43 ppm carbon.

In certain example embodiments, there may be provided a vacuum insulating panel comprising: a first glass substrate; a second glass substrate; a plurality of spacers provided in a gap between at least the first and second substrates, wherein the gap is at pressure less than atmospheric pressure; a seal provided at least partially between at least the first and second substrates, the seal comprising a first seal layer; wherein the first seal layer comprises tellurium oxide and/or vanadium oxide, and wherein on an elemental basis in terms of wt. % either Te or V has the largest content of any metal in the first seal layer; and wherein the first seal layer comprises no more than about 70 ppm carbon, more preferably no more than about 50 ppm carbon, more preferably no more than about 45 ppm carbon, more preferably no more than about 40 ppm carbon, more preferably no more than about 35 ppm carbon, and most preferably no more than about 30 ppm carbon.

In certain example embodiments, there may be provided a vacuum insulating panel comprising: a first glass substrate; a second glass substrate; a plurality of spacers provided in a gap between at least the first and second substrates, wherein the gap is at pressure less than atmospheric pressure; a seal provided at least partially between at least the first and second substrates, the seal comprising a first seal layer and a second seal layer contacting each other; wherein the first seal layer comprises tellurium oxide and/or vanadium oxide; wherein the second seal layer comprises bismuth oxide and/or boron oxide, and wherein the second seal layer has a melting point at least 100 degrees higher than does the first seal layer; and wherein the first seal layer comprises no more than about 50 ppm carbon, and wherein the first seal layer on a ppm basis contains more carbon than does the second seal layer.

These features are technically advantageous, for example, providing for one or more of the following advantages: reduced de-tempering of glass substrate(s), higher seal density which improves the seal, improved seal hermiticity, improved seal moisture resistance, reduced panel degradation upon exposure to UV, increased panel lifetime, improved retention of panel u-factors upon exposure to UV, and/or improved seal durability.

BRIEF DESCRIPTION OF THE DRAWINGS

These and/or other aspects, features, and/or advantages will become apparent and more readily appreciated from the following description of various example embodiments, taken in conjunction with the accompanying drawings. Thicknesses of layers/elements, and sizes of components/elements, are not necessarily drawn to scale or in actual proportion to one another, but rather are shown as example representations. Like reference numerals may refer to like parts throughout the several views. Each embodiment herein may be used in combination with any other embodiment(s) described herein.

FIG. *8a* is a top view of a ceramic preform to be used for a pump-out tube seal according to an example embodiment, which may be used in combination with any embodiment herein including those of FIGS. 1-20.

FIG. *8b* is a cross-sectional view of a ceramic preform seal of FIG. *8a*, surrounding a pump-out tube, according to an example embodiment, which may be used in combination with any embodiment herein including those of FIGS. 1-20.

FIG. *8c* is a schematic cross-sectional diagram of the seal preform of FIGS. *8a-8b* being laser sintered, according to an example embodiment, which may be used in combination with any embodiment herein including those of FIGS. 1-20.

Figure 8A:
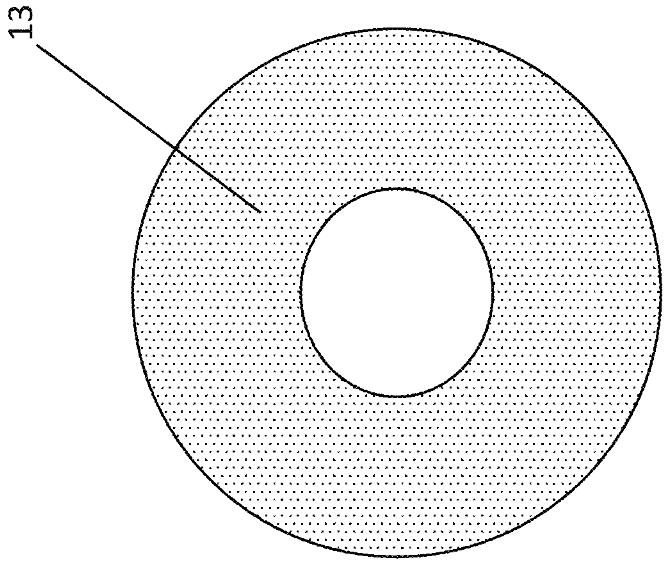
Figure 8C:
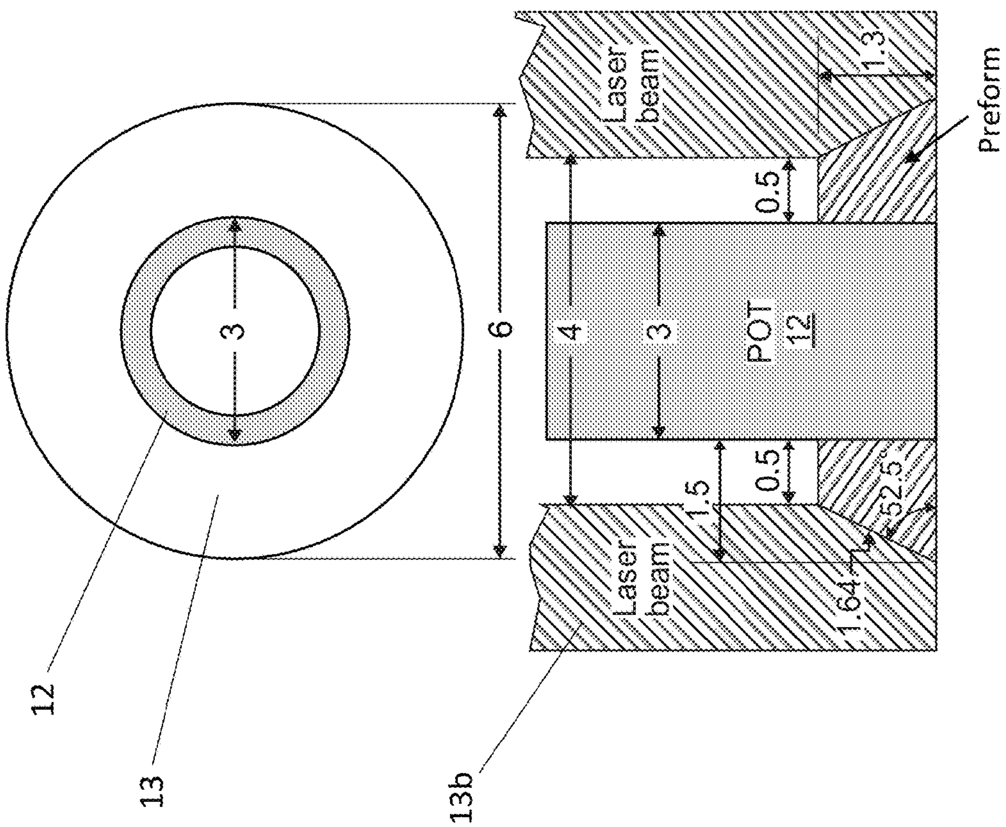
Figure 8B:
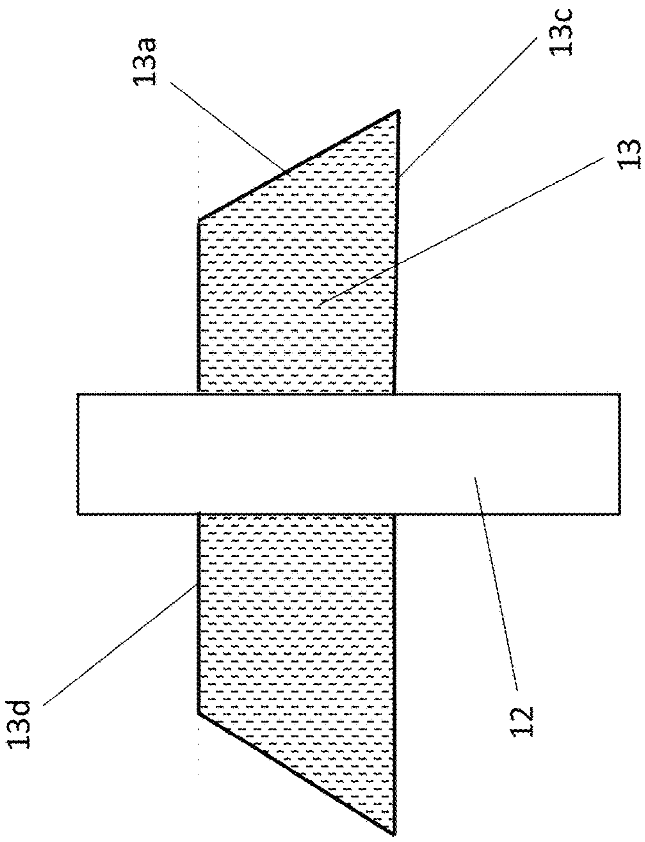
Figure 9:
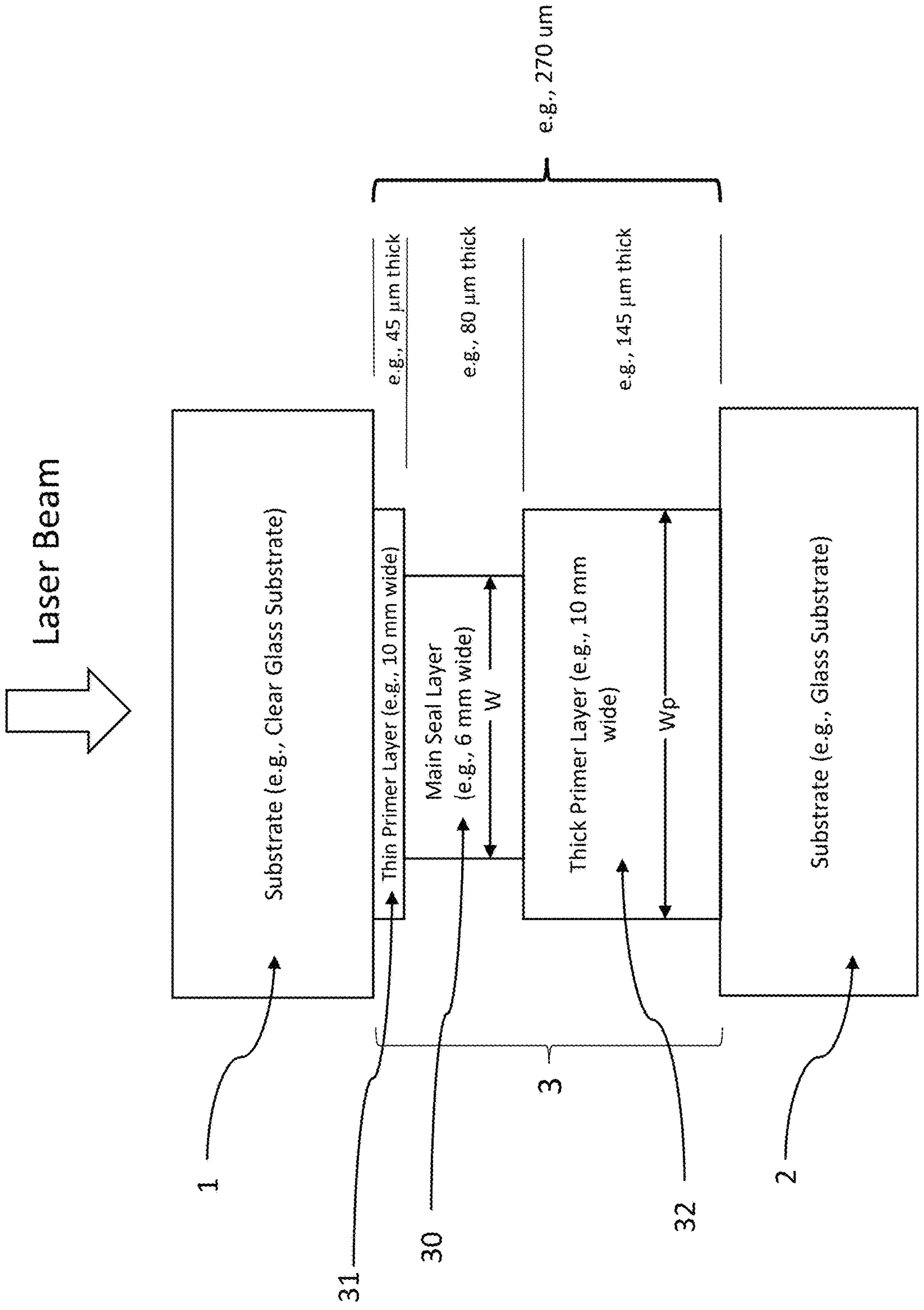

FIG. 9 is a side cross sectional view of an example edge seal for a vacuum insulating unit/panel according to an example embodiment, taken at the edge of a panel, with example layer thicknesses, which may be used in combination with any embodiment herein including those of FIGS. 1-20.

Figure 10:
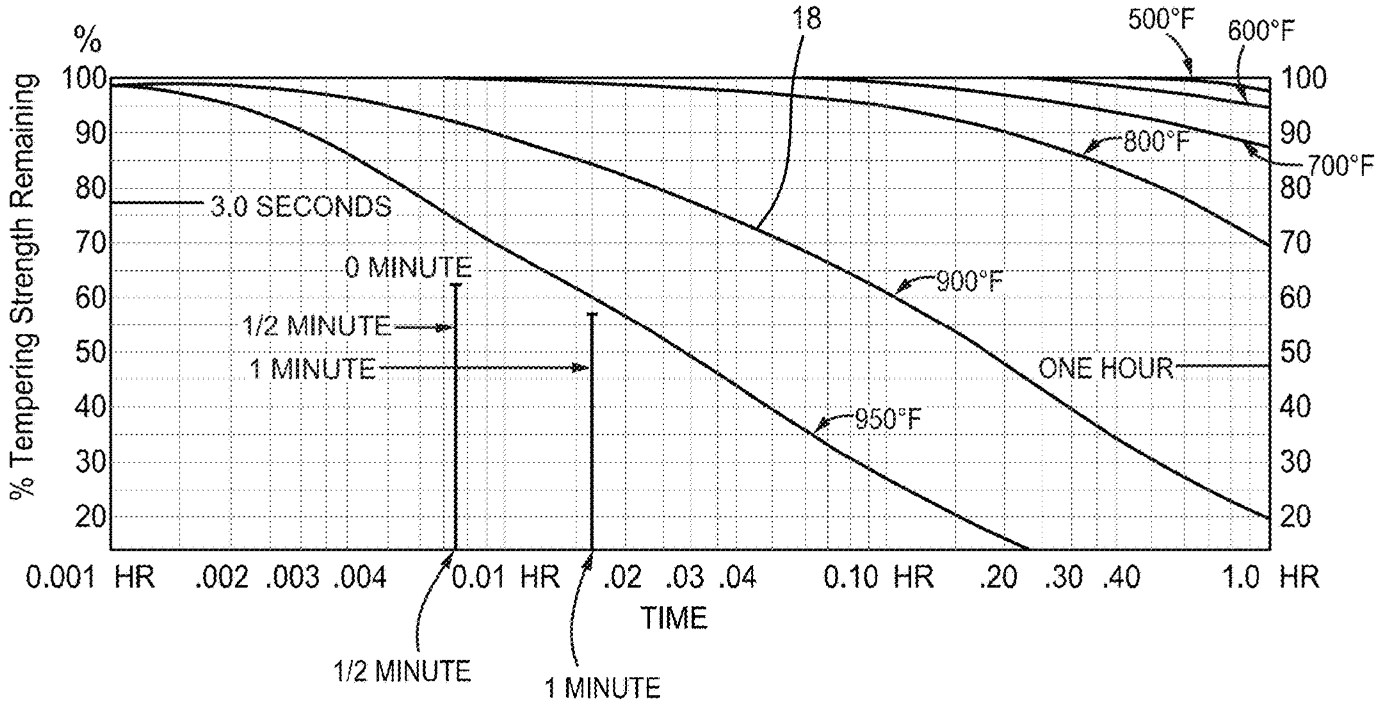

FIG. 10 is a % Tempering Strength Remaining vs. Time graph illustrating that de-tempering of glass is a function of temperature and time.

FIG. 11 is a table/graph showing weight % and mol % of various compounds/elements in a main seal material according to an example embodiment (measured via non-carbon detecting XRF), which main seal material may be used in combination with any embodiment herein including those of FIGS. 1-20.

FIG. 12 is a table/graph showing weight % and mol % of various compounds/elements in a main seal material according to an example embodiment (measured via carbon detecting XRF), before and after laser treatment using an 808 or 810 nm continuous wave laser for edge seal formation, which main seal material may be used in combination with any embodiment herein including those of FIGS. 1-20.

FIG. *13a* is a table/graph showing weight % and mol % of various compounds/elements in a primer seal material according to an example embodiment (measured via carbon detecting XRF), before and after substrate tempering, which primer material may be used in combination with any embodiment herein (e.g., for one or both primer layers) including those of FIGS. 1-20.

FIG. *13b* is a table/graph showing weight % and mol % of various compounds/elements in a primer seal material according to an example embodiment (measured via fused bead XRF), before and after substrate tempering, which primer material may be used in combination with any embodiment herein (e.g., for one or both primer layers) including those of FIGS. 1-20.

FIG. 14 is a table/graph showing an elemental analysis (non-oxide analysis) of weight % and mol % of various elements in each of a main seal material (left side in the figure), a pump-out tube seal material (center in the figure), and a primer seal material (right side in the figure), according to an example embodiment(s) (measured via WDXRF), before and after laser treatment using an 808 or 810 nm continuous wave laser to fire/sinter the main seal layer for seal formation, which various seal materials may be used in combination with any embodiment herein including those of FIGS. 1-20.

Figure 15:
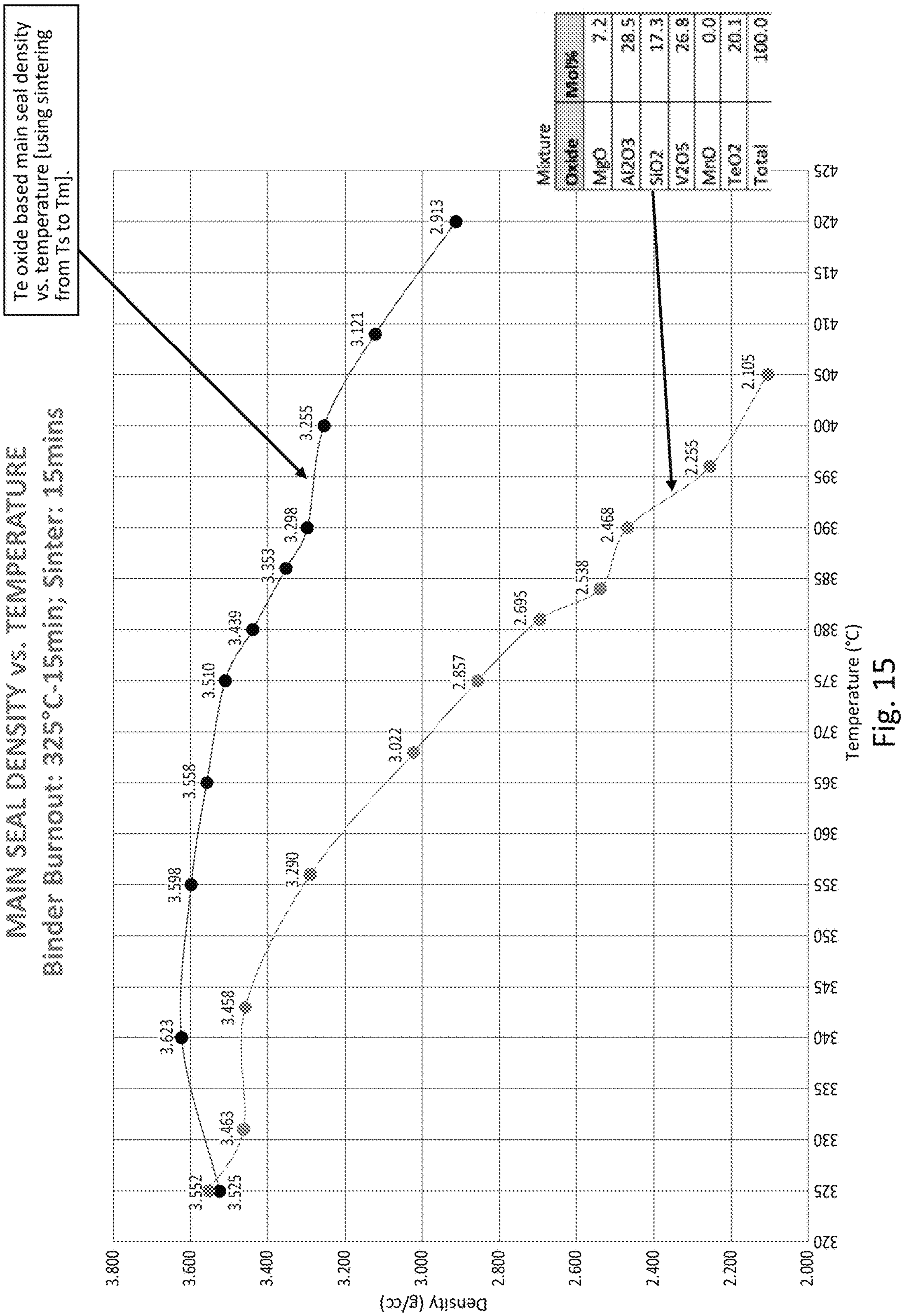

FIG. 15 is a table/graph showing density (g/cm$^3$) vs. temperature (degrees C) for two different example main seal materials according to example embodiments, which seal material(s) may be used in combination with any embodiment herein including those of FIGS. 1-20.

Figure 16:
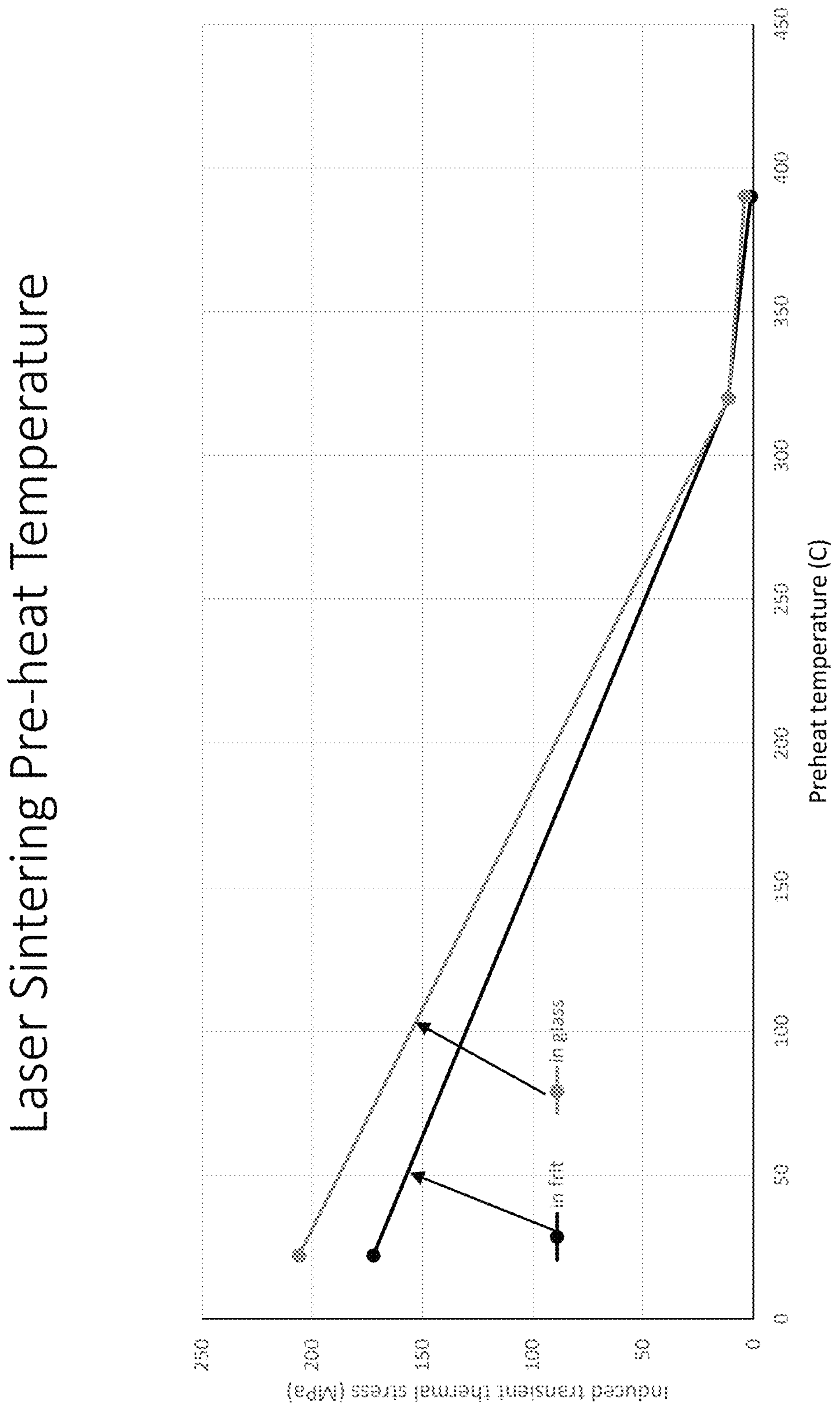

FIG. 16 is a pre-heat temperature (degrees C) vs. induced transient thermal stress (MPa) graph plotting curves for induced transient thermal stress in both the main seal layer and glass substrate(s) as a function of this pre-heat temperature, which may be used in combination with any embodiment herein including those of FIGS. 1-20.

Figure 17:
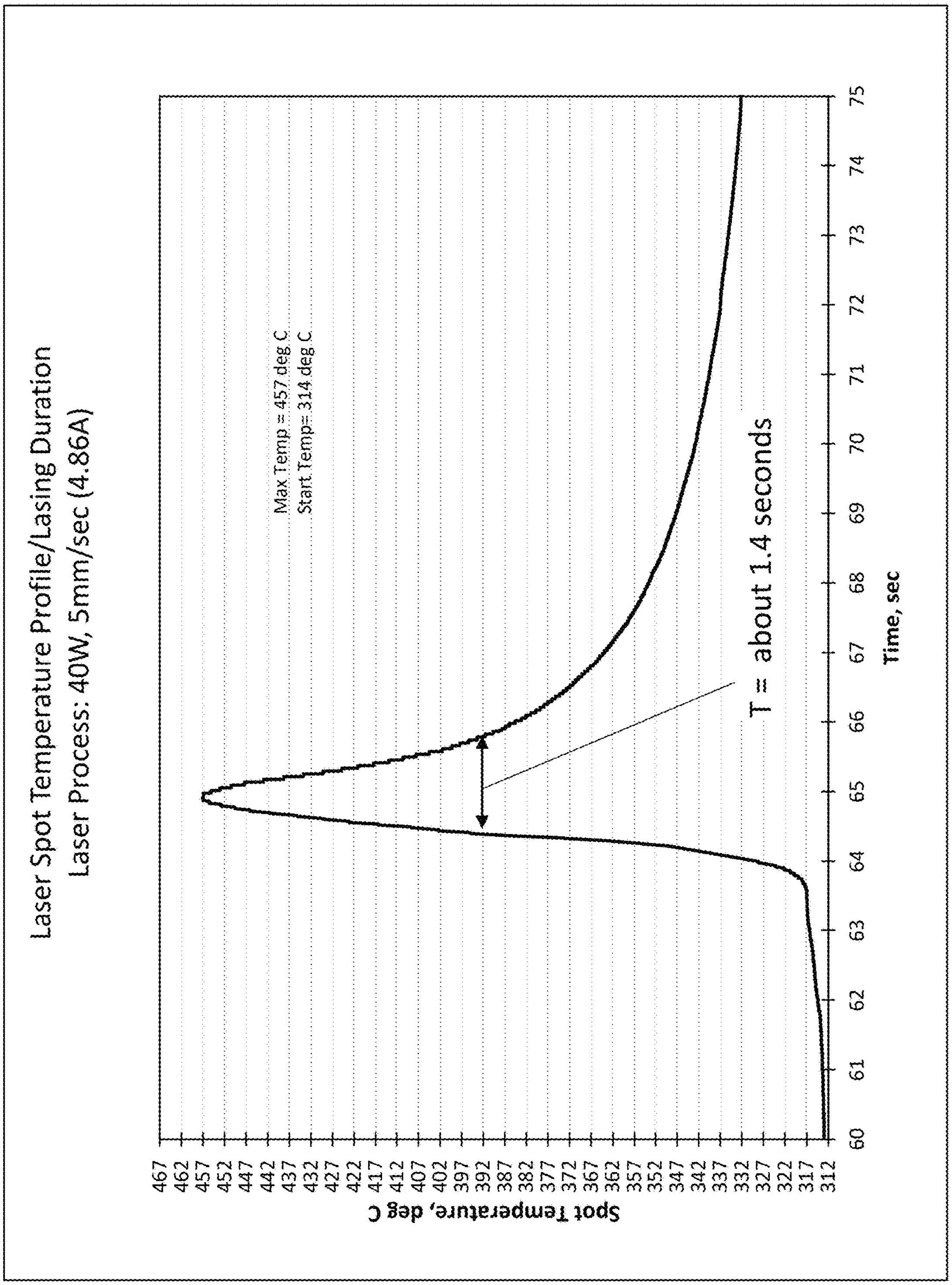

FIG. 17 is a Time (seconds) vs. Spot Temperature (degrees C) graph plotting the temperature of a spot on the main seal layer during laser treatment thereof via an 808 nm or 810 nm continuous wave laser beam moving laterally at 5 mm/s when the main seal layer is being fired/sintered to form the edge seal, which may be used in combination with any embodiment herein including those of FIGS. 1-20.

Figure 18:
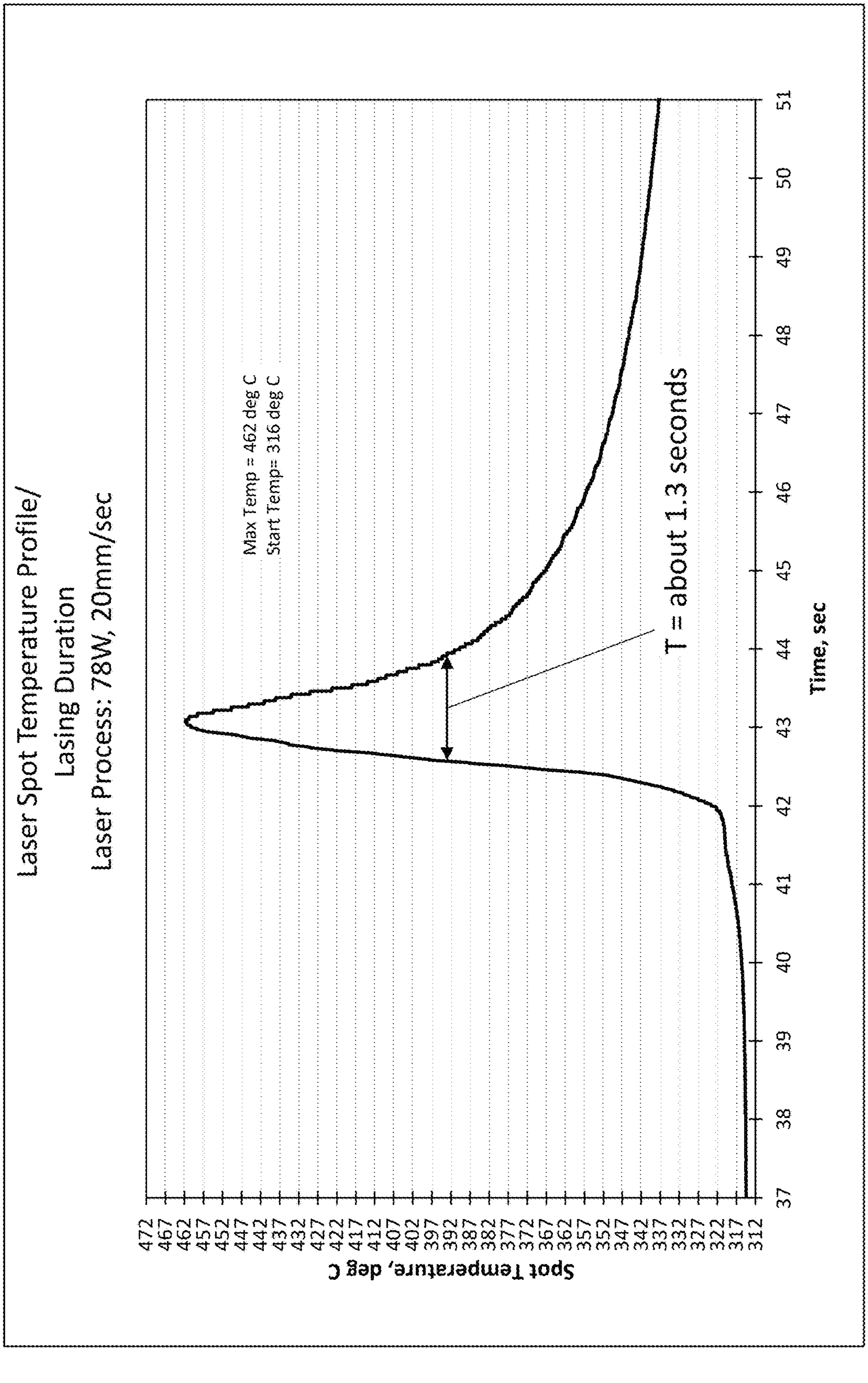

FIG. 18 is a Time (seconds) vs. Spot Temperature (degrees C) graph plotting the temperature of a spot on the main seal layer during laser treatment thereof via an 808 nm or 810 nm continuous wave laser beam moving laterally at 20 mm/s when the main seal layer is being fired/sintered to form the edge seal, which may be used in combination with any embodiment herein including those of FIGS. 1-20.

FIG. 19 is a table/graph showing weight % and mol % of various compounds/elements in a pump-out tube seal material according to an example embodiment (measured via carbon detecting XRF), before and after laser sintering/firing, which pump-out tube seal material may be used in combination with any embodiment herein including those of FIGS. 1-20.

Figure 20:
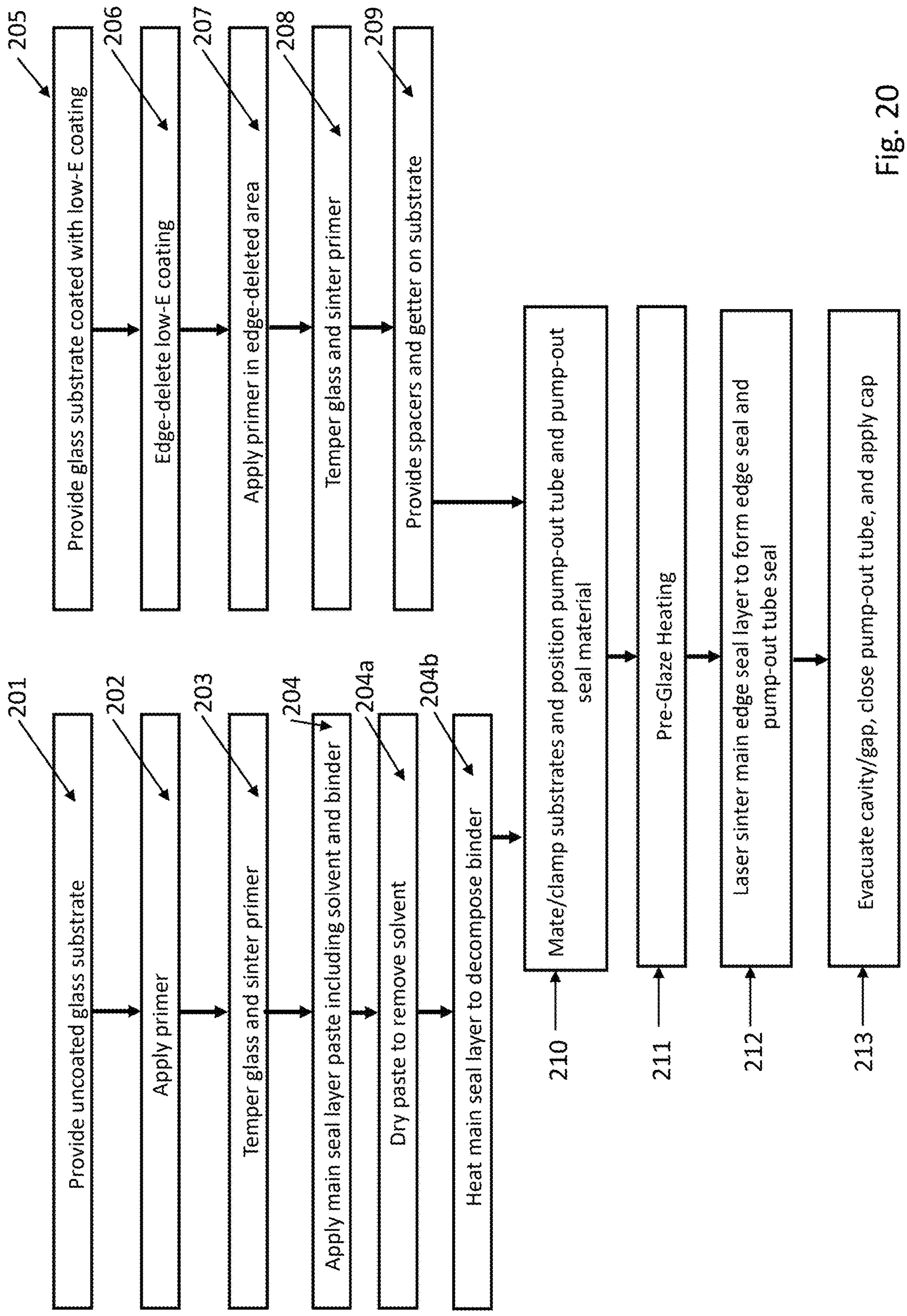

FIG. 20 is a flowchart illustrating example steps in making a vacuum insulating panel according to various example embodiments, which may be used in combination with any embodiment herein including those of FIGS. 1-19.

DETAILED DESCRIPTION

The following detailed structural and/or functional description(s) is/are provided as examples only, and various alterations and modifications may be made. The example embodiments herein do not limit the disclosure and should be understood to include all changes, equivalents, and replacements within ideas and the technical scope herein. Hereinafter, certain examples will be described in detail with reference to the accompanying drawings. When describing various example embodiments with reference to the accompanying drawings, like reference numerals may refer to like components and a repeated description related thereto may be omitted.

Figure 4:
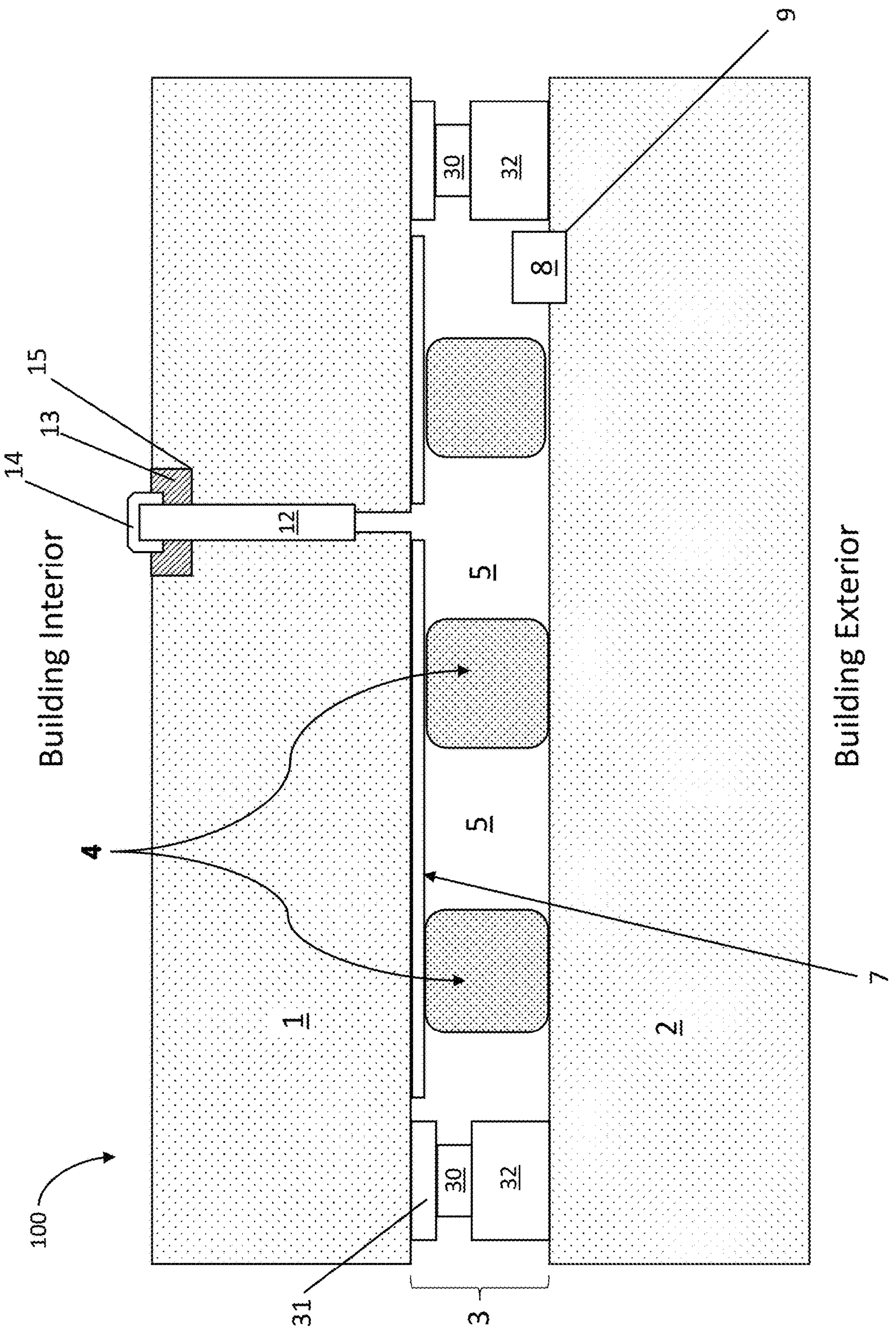
FIG. 4 is a side cross sectional view of a vacuum insulating unit/panel according to an example embodiment.
Figure 5:
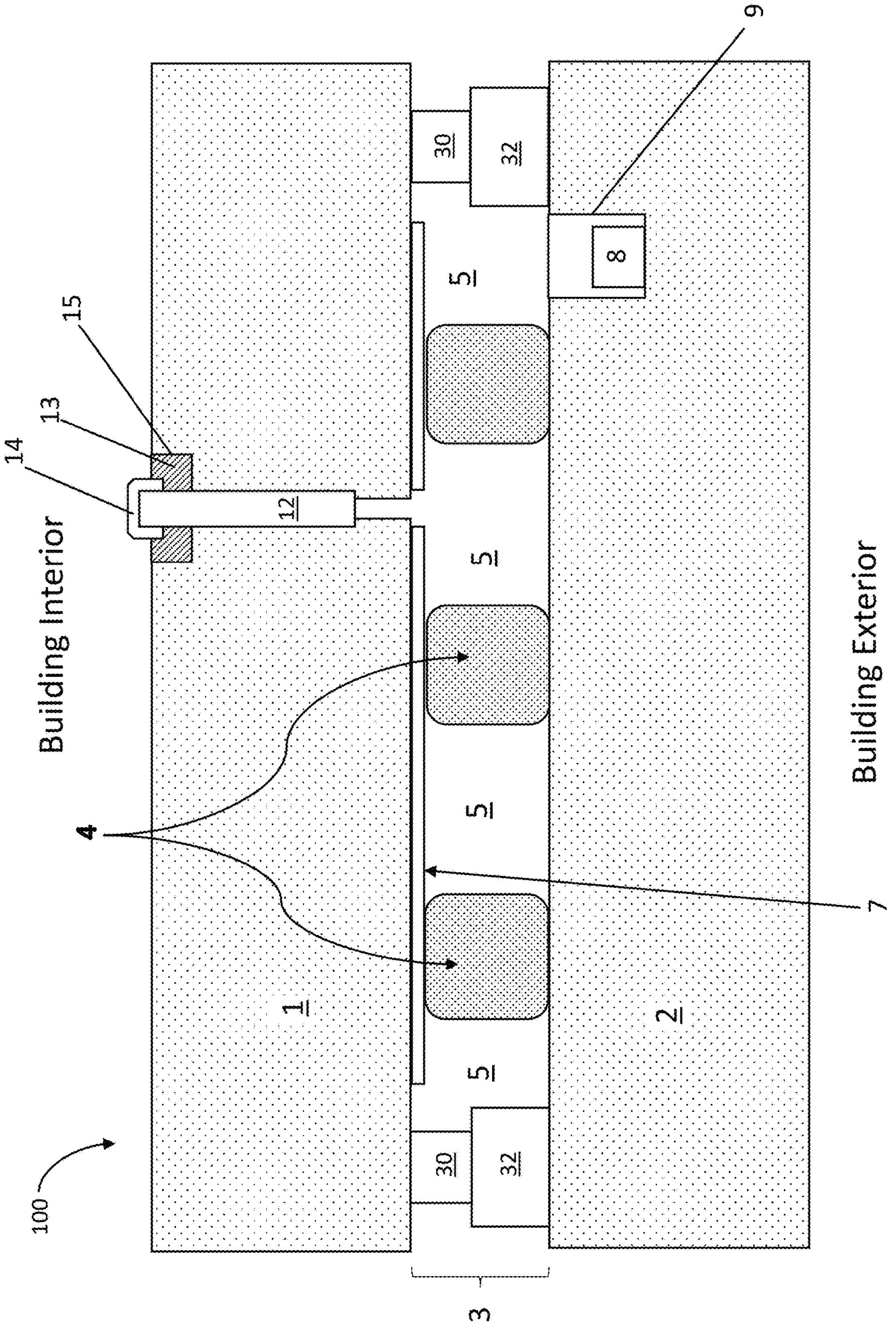
FIG. 5 is a side cross sectional view of a vacuum insulating unit/panel according to an example embodiment.
Figure 6:
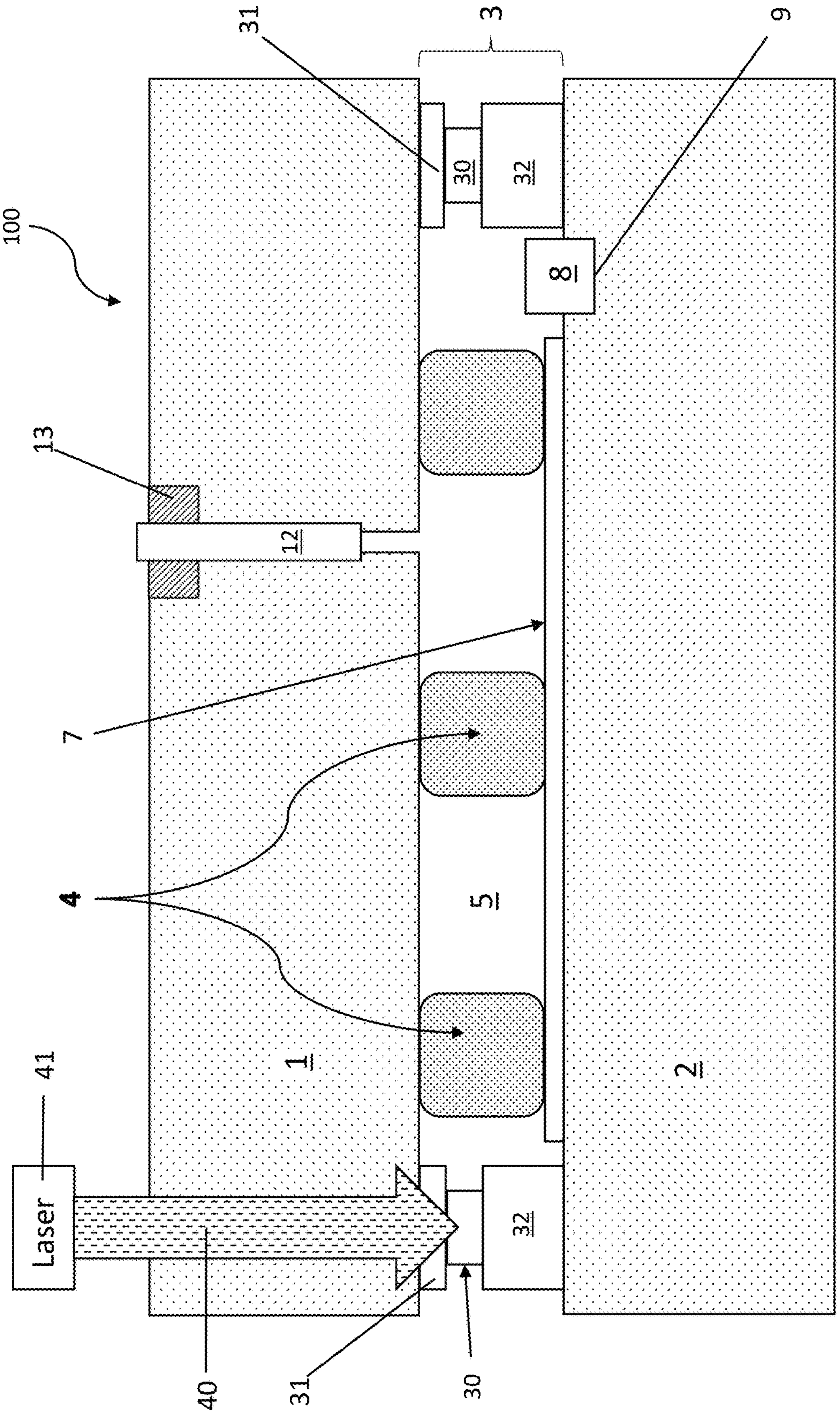
FIG. 6 is a side cross sectional schematic view of a vacuum insulating unit/panel according to an example embodiment, showing a laser being used in forming the edge seal during manufacturing, which may be used in combination with any embodiment herein including those of FIGS. 1-20.
Figure 7:
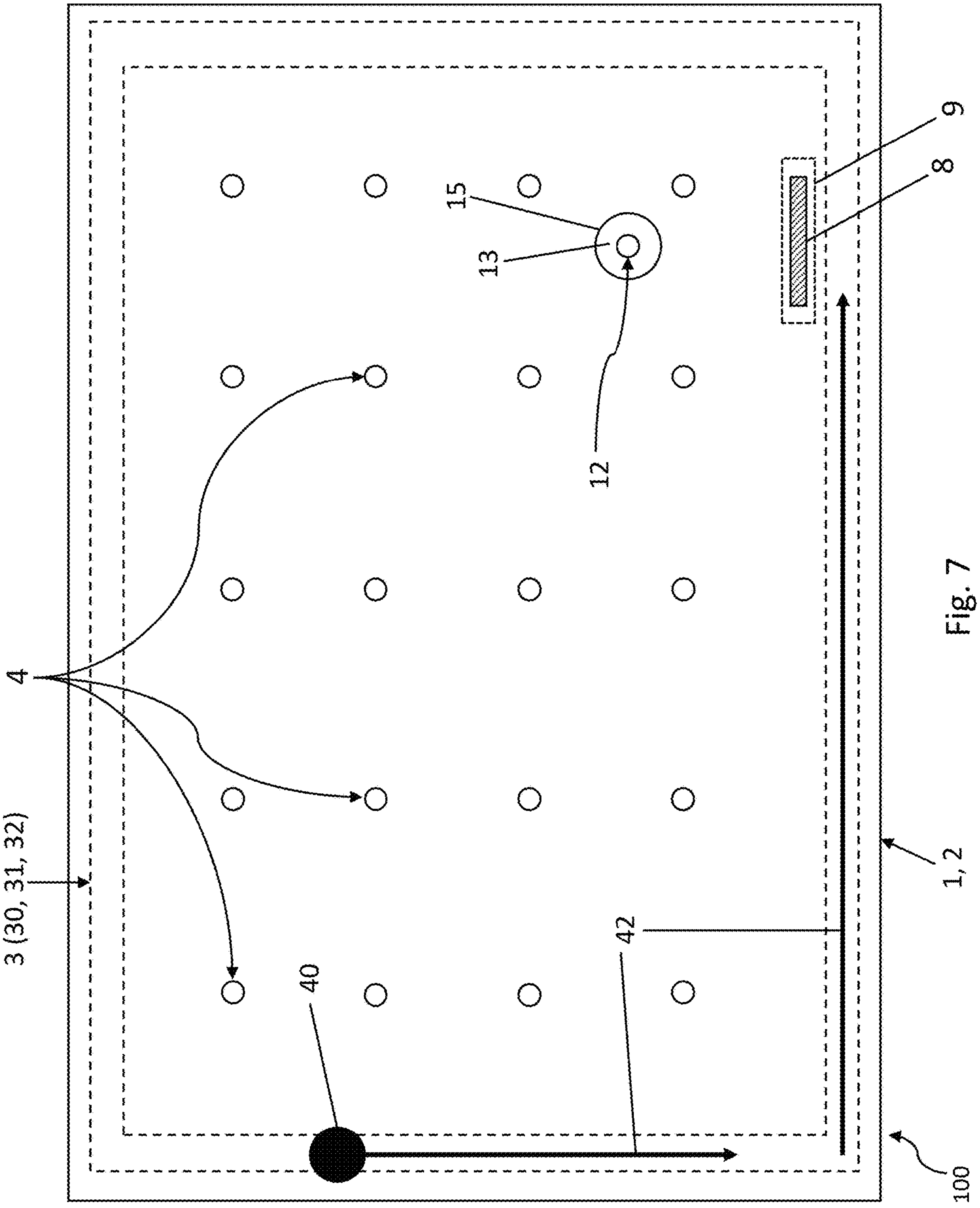
FIG. 7 is a schematic top view of a vacuum insulating unit/panel according to an example embodiment, showing a laser used in forming the edge seal during manufacturing, which may be used in combination with any embodiment herein including those of FIGS. 1-20.

FIGS. 1-5 are side cross sectional views each illustrating a vacuum insulating panel 100 according to various example embodiments, FIG. 6 is a side cross sectional view of an example vacuum insulating unit/panel 100 showing a laser used in sintering/firing the main seal layer 30 when forming the edge seal 3 during manufacturing (which may be used in combination with any embodiment herein, and FIG. 7 is a schematic top view of an example vacuum insulating unit/panel 100 showing a laser used in sintering/firing the main seal layer 30 when forming the edge seal 3 during manufacturing (which may be used in combination with any embodiment herein). It should be noted that, in practice, such vacuum insulating panels/units may be oriented upside down or sideways from the orientations illustrated in FIGS. 1-7. Vacuum insulating panel 100 may be used in window applications (e.g., for commercial and/or residential windows), and/or for other applications such as commercial refrigeration and consumer appliance applications.

Figure 2:
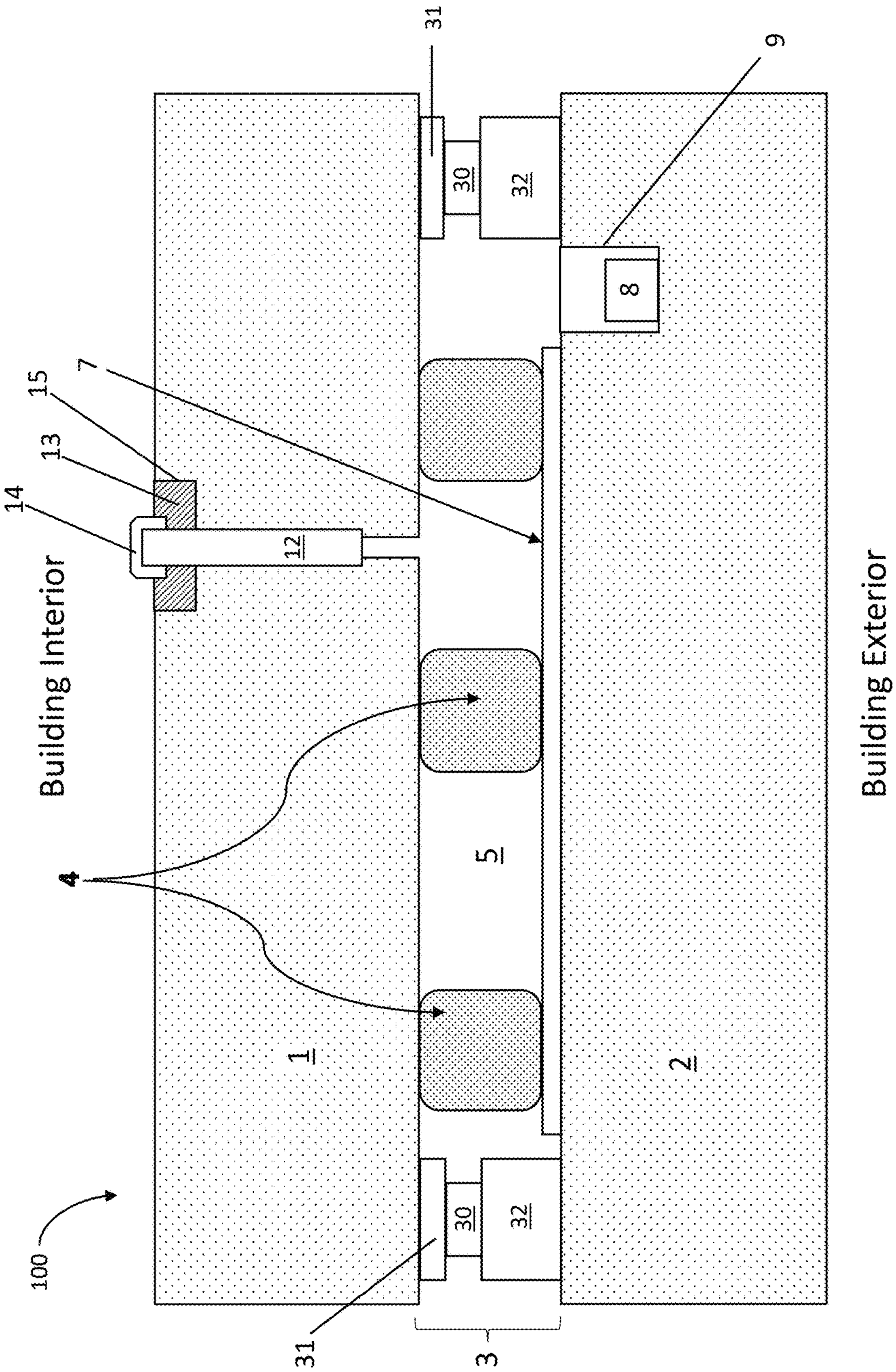
FIG. 2 is a side cross sectional view of a vacuum insulating unit/panel according to an example embodiment.
Figure 3:
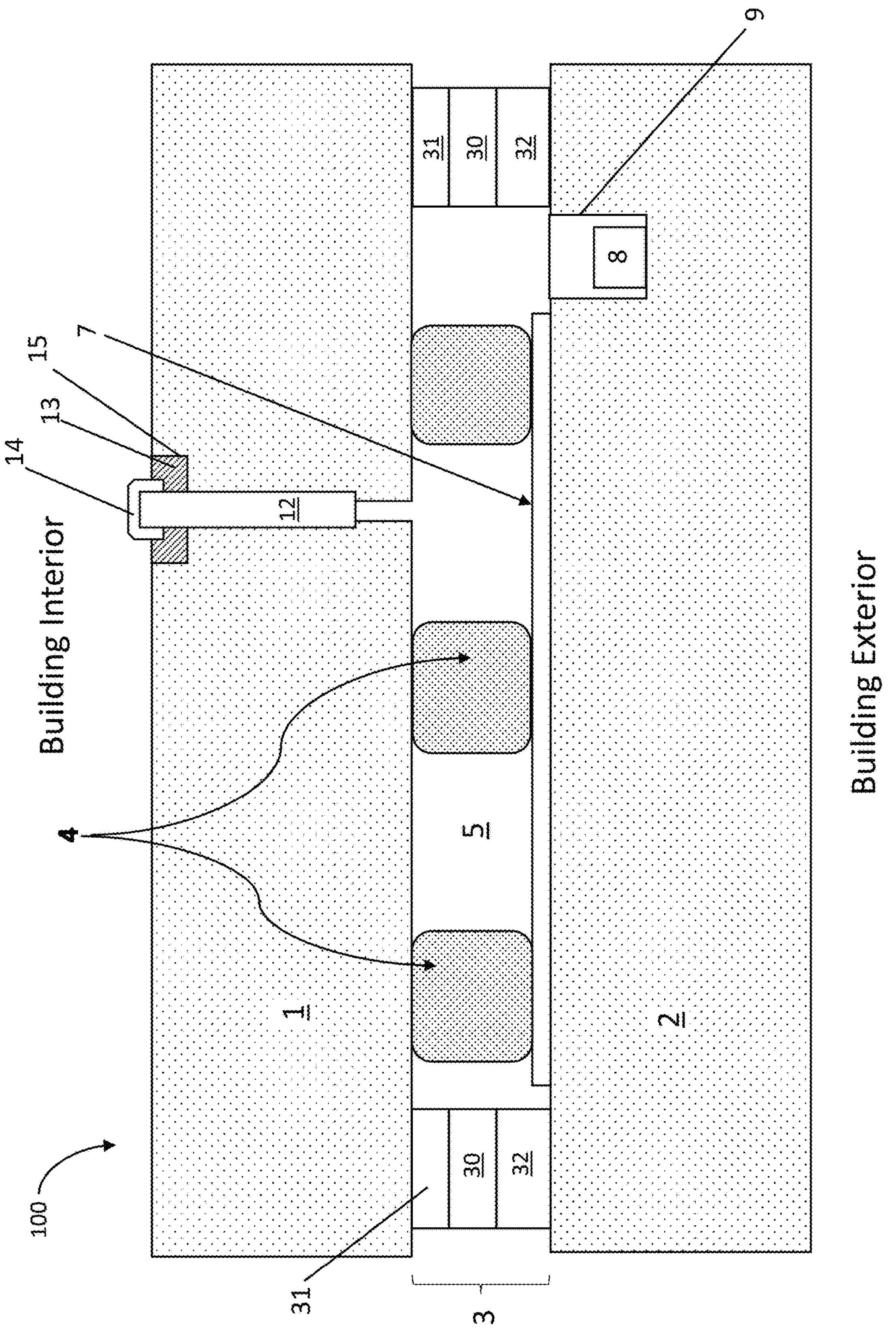
FIG. 3 is a side cross sectional view of a vacuum insulating unit/panel according to an example embodiment.

Referring to FIGS. 1-7, each vacuum insulating panel 100 may include a first substrate 1 (e.g., glass substrate), a second substrate 2 (e.g., glass substrate), a hermetic edge seal 3 at least partially provided proximate the edge of the panel 100, and a plurality (e.g., an array) of spacers 4 provided between at least the substrates 1 and 2 for spacing the substrates from each other and so as to help provide low-pressure space/gap 5 between at least the substrates. Each glass substrate 1, 2 may be flat, or substantially flat, in certain example embodiments. Support spacers 4, sometimes referred to as pillars, may be of any suitable shape (e.g., round, oval, disc-shaped, square, rectangular, rod-shaped, etc.) and may be of or include any suitable material such as stainless steel, aluminum, ceramic, solder glass, metal, and/or glass. Certain example support spacers 4 shown in the figures are substantially circular as viewed from above and substantially rectangular as viewed in cross section, and may have rounded edges. The hermetic edge seal 3 may include one or more of main seal layer 30, upper primer layer 31, and lower primer layer 32. Each "layer" herein may comprise one or more layers. At least one thermal control and/or solar control coating 7, such as a multi-layer low-emittance (low-E) coating, may be provided on at least one of the substrates 1 and 2 in order to further improve insulating properties of the panel. The solar control coating 7 may be provided on substrate 1 or substrate 2, or such a solar control coating may be provided on both substrates 1 and 2. For example, FIGS. 1-3 and 6 illustrate such a coating 7 (e.g., low-E coating) provided on substrate 2, whereas FIGS. 4-5 illustrate the coating 7 provided on substrate 1. Each substrate 1 and 2 is preferably of or including glass, but may instead be of other material such as plastic or quartz. For example, one or both glass substrates 1 and 2 may be soda-lime-silica based glass substrates, borosilicate glass substrates, lithia aluminosilicate glass substrates, or the like, and may be clear or otherwise tinted/colored such as green, grey, bronze, or blue tinted. Substrates 1 and 2, in certain example embodiments, may each have a visible transmission of at least about 40%, more preferably of at least about 50%, and most preferably of from about 60-80%. The vacuum insulating panel 100, in certain example embodiments, may have a visible transmission of at least 40%, more preferably of at least 50%, and most preferably of at least 60%. The substrates 1 and 2 may be substantially parallel (parallel plus/minus ten degrees, more preferably plus/minus five degrees) to each other in certain example embodiments. Substrates 1 and 2 may or may not have the same thickness, and may or may not be of the same size and/or same material, in various example embodiments. When glass is used for substrates 1 and 2, each of the glass substrates may be from about 2-12 mm thick, more preferably from about 3-8 mm thick, and most preferably from about 4-6 mm thick. When glass is used for substrates 1 and 2, the glass may or may not be tempered (e.g., thermally tempered). Although thermally tempered glass substrates are desirable in certain environments, the glass substrate(s) may be heat strengthened. As known in the art, thermal tempering of glass typically involves heating the glass to a temperature of at least 585 degrees C, more preferably to at least 600 degrees C, more preferably to at least 620 degrees C (e.g., to a temperature of from about 620-650 degrees C), and then rapidly cooling the heated glass so as to compress surface regions of the glass to make it stronger. The glass substrates may be thermally tempered to increase compressive surface stress and to impart safety glass properties including small fragmentation upon breakage. When tempered glass substrates 1 and/or 2 are used, the substrate(s) may be tempered (e.g., thermally or chemically tempered) prior to firing/sintering of main edge seal material 30 (e.g., via laser) to form the edge seal 3.

When heat strengthened glass substrates 1 and/or 2 are used, the substrate(s) may be heat strengthened prior to firing/sintering of the main edge seal material 30 (e.g., via laser) to form the edge seal 3. When a vacuum insulated glass panel/unit has one tempered glass substrate and one heat strengthened substrate, the substrate(s) may be tempered (e.g., thermally or chemically tempered) and heat strengthened prior to firing/sintering of the main edge seal material 30 (e.g., via laser) to form the edge seal 3.

In various example embodiments, each vacuum insulating panel 100, still referring to FIGS. 1-7, optionally may also include at least one sorption getter 8 (e.g., at least one thin film getter) for helping to maintain the vacuum in low pressure space 5 by using reactive material for soaking up and/or bonding to gas molecules that remain in space 5, thus providing for sorption of gas molecules in low pressure space 5. The getter 8 may be provided directly on either glass substrate 1 or 2, or may be provided on a low-E coating 7 in certain example embodiments. In certain example embodiments, the getter 8 may be laser-activated and/or activated using inductive heating techniques, and/or may be positioned in a trough/recess 9 that may be formed in the supporting substrate (e.g., substrate 2) via laser etching, laser ablating, and/or mechanical drilling.

A vacuum insulating panel 100 may also include a pump-out tube 12 used for evacuating the space 5 to a pressure(s) less than atmospheric pressure, where the elongated pump-out tube 12 may be closed/sealed after evacuation of the space 5. Pump-out seal 13 may be provided around tube 12, and a cap 14 may be provided over the top of the tube 12 after it is sealed. Tube 12 may extend part way through the substrate 1, for example part way through a double countersink hole drilled in the substrate as shown in FIGS. 1-6. However, tube 12 may extend all the way through the substrate 1 in alternative example embodiments. Pump-out tube 12 may be of any suitable material, such as glass, metal, ceramic, or the like. In certain example embodiments, the pump-out tube 12 may be located on the side of the vacuum insulating panel 100 configured to face the interior of the building when the panel is used in a commercial and/or residential window. In certain example embodiments, the pump-out tube 12 may instead be located on the side of the vacuum insulating panel 100 configured to face the exterior of the building. The pump-out tube 12 may be provided in an aperture defined in either substrate 1 or 2 in various example embodiments. Pump-out seal 13 may be of any suitable material. In certain example embodiments, the pump-out seal 13 may be provided in the form of a substantially donut-shaped pre-form which may be positioned in a recess 15 formed in a surface of the substrate 1 or 2, so as to surround an upper portion of the tube 12, so that the pre-form can be laser treated/fired/sintered (e.g., after formation of the edge seal 3) to provide a seal around the pump-out tube 12. Alternatively, the pump-out seal 13 may be of any suitable material and/or may be dispensed in paste and/or liquid form to surround at least part of the tube 12 and may be sealed before and/or after evacuation of space 5. The pump-out seal material 13 may be directly applied to the glass substrate material or to a primer layer applied to the glass substrate surface prior to the pump-out seal material being applied to the substrate, in certain example embodiments. After evacuation of space 5, the tip of the tube 15 may be melted via laser to seal same, and hermetic sealing of the space 5 in the panel 100 can be provided both by the edge seal 3 and by the sealed upper portion of the pump-out tube 12 together with seal 13 and/or cap 14. In certain example embodiments, as shown in FIGS. 1-7 for example, the elongated pump-out tube 12 may be substantially perpendicular (perpendicular plus/minus ten degrees, more preferably plus/minus five degrees) to the substrates 1 and 2. Any of the elements/components shown in FIGS. 1-7 may be omitted in various example embodiments.

The evacuated gap/space 5 between the substrates 1 and 2, in the vacuum insulating panel 100, is at a pressure less than atmospheric pressure. For example, after the edge seal 3 has been formed, the cavity 5 evacuated to a pressure less than atmospheric pressure, and the pump-out tube 12 closed/sealed, the gap 5 between at least the substrates 1 and 2 may be at a pressure no greater than about $1.0\times10^{-2}$ Torr, more preferably no greater than about $1.0\times10^{-3}$ Torr, more preferably no greater than about $1.0\times10^{-4}$ Torr, and for example may be evacuated to a pressure no greater than about $1.0\times10^{-6}$ Torr. The gap 5 may be at least partially filled with an inert gas in various example embodiments. In certain example embodiments, the evacuated vacuum gap/space 5 may have a thickness (in a direction perpendicular to planes of the substrates 1 and 2) of from about 100-1,000 μm, more preferably from about 200-500 μm, and most preferably from about 230-350 μm. Providing a vacuum in the gap/space 5 is advantageous as it reduces conduction and convection heat transport, so as to reduce temperature fluctuations inside buildings and the like, thereby reducing energy costs and needs to heat and/or cool buildings. Thus, panels 100 can provide high levels of thermal insulation.

Example low-emittance (low-E) coatings 7 which may be used in the vacuum insulating panel 100 are described in U.S. Pat. Nos. 5,935,702, 6,042,934, 6,322,881, 7,314,668, 7,342,716, 7,632,571, 7,858,193, 7,910,229, 8,951,617, 9,215,760, and 10,759,693, the disclosures of which are all hereby incorporated herein by reference in their entireties. Other low-E coatings may also, or instead, be used. A low-E coating 7 typically includes at least one IR reflecting layer (e.g., of or including silver, gold, or the like) sandwiched between at least first and second dielectric layer(s) of or including materials such as silicon nitride, zinc oxide, zinc stannate, and/or the like. A low-E coating 7 may have one or more of: (i) a hemispherical emissivity/emittance of no greater than about 0.20, more preferably no greater than about 0.04, more preferably no greater than about 0.028, and most preferably no greater than about 0.015, and/or (ii) a sheet resistance ($R_s$) of no greater than about 15 ohms/square, more preferably no greater than about 2 ohms/square, and most preferably no greater than about 0.7 ohms/square, so as to provide for solar control. In certain example embodiments, the low-E coating 7 may be provided on the interior surface of the glass substrate to be closest to the building exterior, which is considered surface two (e.g., see FIGS. 2-3), whereas in other example embodiments the low-E coating 7 may be provided on the interior surface of the glass substrate to be closest to the building interior, which is considered surface three (e.g., see FIGS. 4-5).

Figure 1:
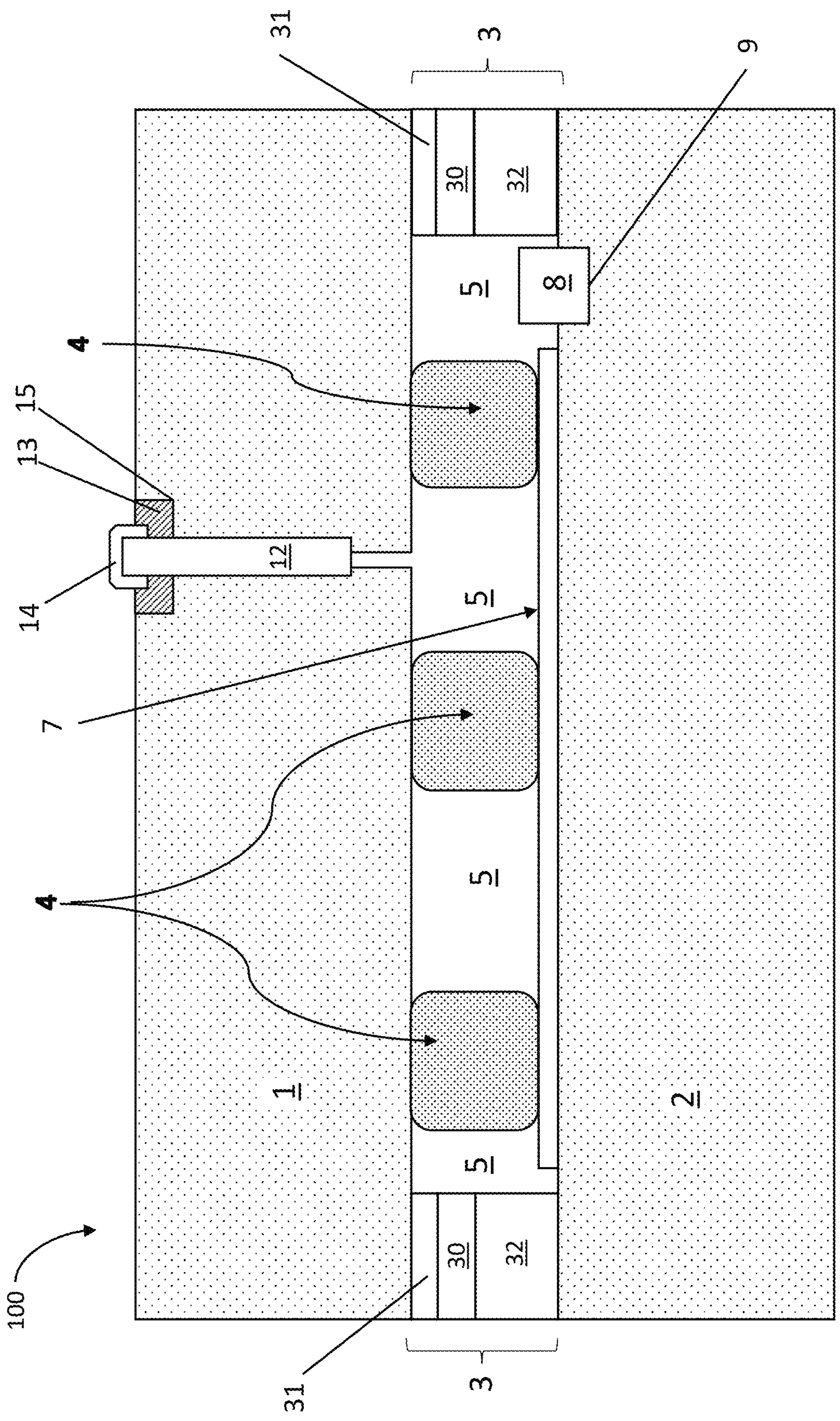
FIG. 1 is a side cross sectional view of a vacuum insulating unit/panel according to an example embodiment.

FIG. 1 illustrates an embodiment where the edge seal 3 is provided in the vacuum insulated glass panel 100 at the absolute edge, the seal layers 30, 31 and 32 all have substantially the same width (e.g., between about 6 mm and 12 mm), and a thickness of the main seal layer 30 is less than a thickness of primer layer 31 but greater than a thickness of the other primer layer 32. FIG. 2 illustrates an embodiment where the edge seal 3 is spaced inwardly from the absolute edge of the panel 100, the width of the main seal layer 30 is less than a width(s) of the primer layers 31 and 32, and a thickness of the main seal layer 30 is greater than a thickness of primer layer 31 but less than a thickness of the other primer layer 32. FIG. 3 illustrates an embodiment where the edge seal 3 is spaced inwardly from the absolute edge of the panel 100, the seal layers 30, 31 and 32 all have substantially the same width (e.g., between about 6 mm and 12 mm), and the seal layers 30, 31 and 32 all have substantially the same thickness. FIG. 4 illustrates an embodiment where the edge seal 3 is spaced inwardly from the absolute edge of the panel 100, the width of the main seal layer 30 is less than a width(s) of the primer layers 31 and 32, a thickness of the main seal layer 30 is greater than a thickness of primer layer 31 but less than a thickness of primer layer 32, and the low-E coating 7 is provided on substrate 1 (as opposed to the low-E coating being on substrate 2 in FIGS. 1-3). FIG. 5 illustrates an embodiment similar to FIG. 4, except that primer layer 31 is omitted in the FIG. 5 embodiment. FIG. 6 provides an example where a laser beam 40 from laser 41 is being used to heat the edge seal structure for sintering/firing the main seal layer 30 to form the hermetic edge seal 3, and FIG. 7 is a top view illustrating the laser beam 40 proceeding around the entire periphery of the panel along path 42 over the edge seal layers 30-32 to fire/sinter the main edge seal layer 30 in forming the hermetic edge seal 3. The laser beam 40 performs localized heating of the edge seal area, so as to not unduly heat certain other areas of the panel thereby reducing chances of significant de-tempering of the glass substrates. Each of these embodiments may be used in combination with any other embodiment described herein, in whole or in part.

Edge seal 3, which may include one or more of ceramic layers 30-32, may be located proximate the periphery or edge of the vacuum insulated panel 100 as shown in FIGS. 1-7. Edge seal 3 may be a ceramic edge seal in certain example embodiments. Referring to FIGS. 1-6, in certain example embodiments, layer 30 of the edge seal may be considered a main or primary seal layer, and layers 31 and 32 may be considered primer layers. One or more of seal layers 30-32, of the edge seal 3, may be of or include ceramic frit in certain example embodiments, and/or may be lead-free or substantially lead-free (e.g., no more than about 15 ppm Pb, more preferably no more than about 5 ppm Pb, even more preferably no more than about 2 ppm Pb) in certain example embodiments. In certain example embodiments, each primer layer 31 and 32 may be of a material having a coefficient of thermal expansion (CTE) that is between that of the main seal layer 30 and the closest glass substrate 1, 2. For example, referring to FIGS. 1-4, primer layers 31 and 32 may each have a CTE (e.g., from about 8.0 to $8.8\times10^{-6}$ mm/(mm*deg. C), more preferably from about 8.3 to $8.6\times10^{-6}$ mm/(mm*deg. C)) which is between a CTE (e.g., from about 8.7 to $9.3\times10^{-6}$ mm/(mm*deg. C), more preferably from about 8.8 to $9.2\times10^{-6}$ mm/(mm*deg. C)) of the adjacent float glass substrate 1 and a CTE (e.g., from about 7.0 to $7.9\times10^{-6}$ mm/(mm*deg. C), more preferably from about 7.2 to $7.9\times10^{-6}$ mm/(mm*deg. C), with an example being about $7.6\times10^{-6}$ mm/(mm*deg. C)) of the main seal layer 30. The main seal layer 30 may have a CTE of at least 15% less than CTE(s) of the glass substrate(s) 1 and/or 2 in certain example embodiments. Thus, the multi-layer edge seal 3, via primer(s) 31 and/or 32, may provide for a graded CTE from the main seal 30 moving toward each glass substrate 1, 2, which provides for improved bonding of the edge seal to the glass and a more durable resulting vacuum insulating panel 100 such as capable of surviving exposure to asymmetric thermal loading and/or wind loads in the end application. The main seal layer 30, in certain example embodiments, need not contain significant amounts of CTE filler material (although it may contain significant amounts of filler in other example embodiments), which can result in an improved hermetic edge seal 3 and durability. A primer(s) 31 and/or 32 may be omitted in certain example embodiments. In certain example embodiments, primer layers 31 and 32 may be of or include different material(s) compared to the main seal layer 30.

In certain example embodiments, in the edge seal 3, edge seal layer 30 may be of or include a low temperature material having a relatively low melting point (Tm), and one or both of seal layers 31 and/or 32 may be of or include a high temperature material having a relatively high melting point (Tm). Thus, in certain example embodiments, at least one of the edge seal 3 layers may have a low melting point (e.g., layer 30). In certain example embodiments, one or both primer layers 31 and/or 32 of the edge seal may have a high melting point (Tm) of at least about 500 degrees C, more preferably of at least about 600 degrees, C, whereas the main seal layer 30 may have a melting point (Tm) of no greater than about 450 degrees C, more preferably no greater than about 430 degrees C, more preferably no greater than about 420 degrees C, and most preferably no greater than about 410 degrees C.

In certain example embodiments, before and/or after sintering/firing, one or both primer layer(s) 31 and/or 32 may have a melting point (Tm) higher than the melting point of the main seal layer 30. For example, in certain example embodiments, one or both primer layers 31 and/or 32 may have a melting point (Tm) of from about 500-750 degrees C (more preferably from about 575-680 degrees C, and most preferably from about 600-650 degrees C), whereas the main seal layer 30 may have a lower melting point (Tm) of from about 300 to 450 degrees C (more preferably from about 350-430 degrees C, and most preferably from about 380-420 degrees C or from about 390-410 degrees C). In certain example embodiments, one or both of the primer layers 31 and/or 32 may have a melting point (Tm) at least 100 degrees C higher, more preferably at least 150 degrees C higher, and most preferably at least 200 degrees C higher, than the melting point of the main seal material 30. For purposes of example, in an example embodiment the main seal layer 30 may have a melting point of from about 390-410 degrees C or from about 390-395 degrees C, whereas the primer layers 31 and 32 may each have a melting point of from about 585-625 degrees C or from about 610-625 degrees C. In certain example embodiments, before and/or after sintering/firing, one or both primer layer(s) 31 and/or 32 may have a transition point (Tg) higher than the transition point of the main seal layer 30. For example, in certain example embodiments, before and/or after sintering/firing, one or both primer layer(s) 31 and/or 32 may have a transition point of from about 400-600 degrees C (more preferably from about 425-550 degrees C, and most preferably from about 450 to 510 degrees C), whereas the main seal layer 30 may have a lower transition point of from about 200 to 350 degrees C (more preferably from about 230-330 degrees C, and most preferably from about 260 to 310 degrees C). In a similar manner, in certain example embodiments, before and/or after sintering/firing, one or both primer layer(s) 31 and/or 32 may have a softening point (Ts) higher than the softening point of the main seal layer 30. For example, in certain example embodiments, one or both primer layer(s) 31 and/or 32 may have a softening point of from about 425-650 degrees C (more preferably from about 475-620 degrees C, and most preferably from about 520 to 590 degrees C), whereas the main seal layer 30 may have a lower softening point of from about 220 to 410 degrees C (more preferably from about 270-380 degrees C, and most preferably from about 300 to 340 degrees C). In certain example embodiments, before and/or after sintering/firing, one or both of the primer layer(s) 31 and/or 32 may have a softening point (Ts) at least 100 degrees C higher, more preferably at least about 150 degrees C higher, and most preferably at least about 150 or 200 degrees C higher, than the softening point (Ts) of the main seal layer material 30. For purposes of example, in an example embodiment the main seal layer 30 may have a softening point of from about 310-330 degrees C, whereas the primer layers 31 and 32 may each have a softening point of from about 540-560 degrees C. For purposes of example, in an example embodiment the main seal layer 30 may have a melting point of from about 390-395 degrees C, whereas the primer layers 31 and 32 may each have a melting point of from about 610-625 degrees C. These feature(s) advantageously may allow each high melting point primer layers 31 and 32 to provide strong mechanical bonding with the supporting glass substrate (1 and/or 2) via sintering/firing in a first bulk heating step in an oven or other heater (e.g., heating above the melting point and/or softening point of the primer(s) while thermally tempering the glass substrate 1, 2 on which the primer is provided), and thereafter sintering/firing the lower melting point main seal material 30 in a different second heating step (e.g., via laser) to bond the main seal layer 30 to the previously sintered/fired primers 31 and 32 and form the edge seal 3 without significantly de-tempering the glass substrates. Thus, the main seal layer 30 and primers 31 and 32 can be sintered/fired in different heating steps, in a manner which allows thermal tempering of the glass substrates 1 and 2 when sintering/heating the primers on the respective glass substrates, and which allows the main seal layer 30 to thereafter be sintered and bonded to the primers 31 and 32 without significantly de-tempering the glass substrates 1 and 2. This advantageously results in more efficient processing, reduction in damage, and a more durable and longer lasting vacuum insulating panel with much of its temper strength retained allowing for example compliance with industry safety testing for bag impact and/or point impact fragmentation.

The edge seal 3, in certain example embodiments, may be located at an edge-deleted area (where the solar control coating 7 has been removed) of the substrate as shown in FIGS. 1-6. Thus, the edge seal 3 may be positioned so that it does not overlap the low-E coating 7 in certain example embodiments. The edge seal 3 may be located at the absolute edge of the panel 100 (e.g., FIG. 1), or may be spaced inwardly from the absolute edge of the panel 100 as shown in FIGS. 2-7 and 9, in different example embodiments. An outer edge of the hermetic edge seal 3 may be located within about 50 mm, more preferably within about 25 mm, and more preferably within about 15 mm, of an outer edge of at least one of the substrates 1 and/or 2. Thus, an "edge" seal does not necessarily mean that the edge seal 3 is located at the absolute edge or absolute periphery of a substrate(s) or overall panel 100.

The low-E coating 7 may be edge deleted around the periphery of the entire unit so as to remove the low-e coating material from the coated glass substrate. The low-E coating 7 edge deletion width (edge of glass to edge of low-E coating 7), in certain example embodiments, in at least one area may be from about 0-100 mm, with examples being no greater than about 6 mm, no greater than about 10 mm, no greater than about 13 mm, no greater than about 25 mm, with an example being about 16 mm. In certain example embodiments, there may be a gap between the primer seal layers 31 and 32 and/or main layer 30, and the low-E coating 7, of at least about 0.5 mm, more preferably a gap of at least about 1.0 mm, and for example a gap of at least about 5 mm so that the low-E coating 7 is not contiguous with the main seal layer 30 and/or the primer seal layers 31 and 32.

It has been found that adjusting the width (as viewed from above and/or in cross-section) of the main seal layer 30, of the edge seal, can be technically advantageous. It has been found that when the main seal layer 30 is too wide, this results in undesirably high induced transient thermal stress in the main seal layer 30 which can lead to seal issues and/or a non-durable product. Reduced width of the main seal layer 30 can also improve U-value/U-factor performance of panel 100. FIGS. 2, 4, 7 and 9, for example, illustrate that the main edge seal layer 30 may have a width less than the width of one or both of the adjacent primer layers 31 and 32. For example, see the width "W" of the main seal layer 30 in FIG. 9. In an example embodiment, the width of the main seal layer 30 may be about 6 mm. Moreover, if the primer layer(s) 31 and/or 32 is/are made too narrow, this can reduce the bonding area resulting in edge seal issues. FIGS. 2, 4, 7 and 9, for example, illustrate that the main edge seal layer 30 has a width "W" less than the width (e.g., "Wp") of the adjacent primer layers 31 and 32. In an example embodiment, the width of the main seal layer 30 may be about 6 mm and the width of the primer layers 31 and 32 may be about 10 mm, so that the width of one or both of the primer layers is greater than the width of the main seal layer (e.g., see FIGS. 2, 4, 5, 7 and 9). In certain example embodiments, the width of the ceramic sealing glass primer layer 31 may be about 8 mm, the width of the ceramic sealing glass primer layer 32 may be about 8 mm, and the width of the ceramic main seal layer 30 may be about 6 mm or about 3-4 mm. Thus, in certain example embodiments and referring to FIGS. 1-7 and 9 for example, in the manufactured vacuum insulating panel 100, the main seal layer 30 of the edge seal 3 may have an average width W of from about 2-20 mm, more preferably from about 4-10 mm, more preferably from about 3-9 mm or from about 4-8 mm, still more preferably from about 5-7 mm, and with an example main seal layer 30 average width being about 6 mm; and/or one or both of the primer layers 31 and 32 may have an average width Wp of from about 2-20 mm, more preferably from about 6-14 mm, more preferably from about 8-12 mm, still more preferably from about 9-11 mm, and with an example primer average width being about 10 mm. In certain example embodiments, the respective width(s) of each layer 30, 31, and 32 may be substantially the same (the same plus/minus 10%, more preferably plus/minus 5%) along the length of the edge seal 3 around the periphery of the entire panel 100. In certain example embodiments, the ratio Wp/W of the width Wp of one or both primer layers 31, 32 to the width W of the main seal layer 30 may be from about 1.2 to 2.2, more preferably from about 1.4 to 1.9, and most preferably from about 1.5 to 1.8 (e.g., the ratio Wp/W is 1.67 when a primer layer 31 and/or 32 is 10 mm wide and the main seal layer 30 is 6 mm wide: 10/6=1.67). In certain example embodiments, one or both primer layers 31 and/or 32 is/are at least about 1 mm wider, more preferably at least about 2 mm wider, and most preferably at least about 3 mm wider, than the main seal layer 30 at one or more locations around the periphery of the panel 100 and possibly around the entire periphery of the panel. These desirable widths for ceramic seal layers 30-32 in the panel 100 may be appropriate when using the materials for seal layers 30-32 discussed herein (e.g., see FIGS. 11-14), and may be adjusted in an appropriate manner if different seal materials are instead used which is possible in certain example embodiments. Other widths for one or more of seal layers 30-32, not discussed herein, may be used in various other example embodiments. In certain example embodiments, as viewed from above and/or in cross-section as shown in FIG. 9 for example, the lateral edge(s) **30*a* and/or 30*b* of the main seal layer 30 may be spaced inwardly an offset distance "D" from the respective lateral edges of the primer seal layer 31 and/or the primer seal layer 32 on each side of the main seal layer. In certain example embodiments, the offset distance "D" on one or both sides of the main seal layer 30 may be from about 0.5 to 6.0 mm, more preferably from about 0.5 to 3.0 mm, more preferably from about 0.5 to 2.5 mm, more preferably from about 1.0 to 2.5 mm, and most preferably from about 1.5 to 2.5 mm, with an example being about 2.0 mm on each side, although the offset distance "D" may be different on the left and right sides of the main seal layer as viewed in FIG. 9 for example. In certain example embodiments, the offset distance "D" on one or both sides of the main seal layer 30 may be at least about 0.5 mm, more preferably at least about 1.0 mm, and most preferably at least about 1.5 mm, as shown in FIG. 9 for example. See also FIGS. 2, 4 and 6. In certain example embodiments and referring to FIGS. 1-7 and 9 for example, in the manufactured vacuum insulating panel 100, the main seal layer 30 of the edge seal 3 may have an average thickness of from about 30-120 μm, more preferably from about 40-100 μm, and most preferably from about 50-85 μm, with an example main seal layer 30 average thickness being from about 60-80 μm as shown in FIG. 9. In certain example embodiments, in the manufactured vacuum insulating panel 100, the primer layer 31 of the edge seal 3 may have an average thickness of from about 10-80 μm, more preferably from about 20-70 μm, and most preferably from about 20-55 μm, with an example primer layer 31 average thickness being about 45 μm as shown in FIG. 9. In certain example embodiments, in the manufactured vacuum insulating panel 100, the primer layer 32 (opposite the side from which the laser beam 40 is directed) of the edge seal 3 may have an average thickness of from about 100-220 μm, more preferably from about 120-200 μm, and most preferably from about 120-170 μm, with an example primer layer 32 average thickness being about 145 μm as shown in FIG. 9. In certain example embodiments, the thickness of the main seal layer 30 may be at least about 30 μm thinner (more preferably at least about 45 μm thinner) than the thickness of the primer seal layer 32, and may be at least about 10 μm thicker (more preferably at least about 20 μm, and more preferably at least about 30 μm thicker) than the thickness of the primer seal layer 31. In certain example embodiments, in the manufactured vacuum insulating panel 100, the overall average thickness of the edge seal 3 may be from about 150-330 μm, more preferably from about 200-310 μm, and most preferably from about 240-290 μm, with an example overall edge seal 3 average thickness being about 270 μm as shown in FIG. 9. In certain example embodiments, the respective thicknesses of each layer 30, 31, and 32 are substantially the same (the same plus/minus 10%, more preferably plus/minus 5%) along the length of the edge seal 3 around the periphery of the entire panel 100**. Further details of the edge seal structure, dimensions of the edge seal and other components, characteristics of the edge seal and other components, materials, and the manufacture of the overall panel may be provided in one or more of U.S. patent application Ser. Nos. 18/376,914, 18/376,473, 18/376,479, 18/376,483, 18/379,275, and 18/510,777, the disclosures of which are all hereby incorporated herein by reference in their entireties.

In various example embodiments, laser 41 may be selected to emit a laser beam 40 having a wavelength (λ) of from about 550 nm to 1064 nm, more preferably from about 780-1064 nm. Laser 41 may be a near IR laser in certain example embodiments. Laser 41 may be a continuous wave laser, a pulsed laser, and/or other suitable laser in various example embodiments. In various example embodiments, the laser 41 may be a scanning laser system comprising diode, ND:YAG, $CO_2$ and/or other laser devices/sources. In certain example embodiments, laser 41 may emit a laser beam 40 at or having a wavelength of about 800 nm, 808 nm, 810 nm, 940 nm, or 1090 nm (e.g., YVO4 laser). In certain example embodiments, more than one laser may be utilized to increase the sealing speed, lower effective laser power levels and/or reduce laser spot size. Two lasers operating in a serial, overlapping manner can increase the effective irradiation spot time to achieve for example 0.5 seconds while achieving for example a 20 mm per second linear laser rate, as an example. Two 9-mm laser diameter beams 40, for example, can operate in a serial fashion for a 0.5 second to 1.0 second irradiation time.

FIGS. 11-12 and 14 illustrate an example material(s) that may be used for the main seal layer 30 in various example embodiments, including for example in any of the embodiments of FIGS. 1-9. However, other suitable materials (vanadium oxide based ceramic materials with little or no Te oxide, solder glass, or the like) may instead be used for layer 30 in various example embodiments. FIG. 11 is a table/graph showing weight % and mol % of various compounds/elements in an example main seal 30 material, prior to sintering of layer 30, according to an example embodiment (measured via non-carbon detecting XRF); FIG. 12 is a table/graph showing weight % and mol % of various compounds/elements in an example main seal 30 material according to an example embodiment (measured via carbon detecting XRF), before and after laser treatment/sintering of the main seal layer 30 for edge seal formation; and the left side of FIG. 14 sets forth a table/graph showing an elemental analysis (non-oxide analysis) of weight % and mol % of various elements in an example main seal 30 material, before and after laser treatment for edge seal formation. Regarding FIG. 14, X-ray Fluorescence (XRF) is a non-destructive technique that can identify and quantify the elemental constituents of a sample using the secondary fluorescence signal produced by irradiation with high energy x-rays, and wavelength dispersive spectrometer (WDXRF) is capable of detecting elements from atomic number (Z) 4 (beryllium) through atomic number 92 (uranium) at concentrations from the low parts per million (ppm) range up to 100% by weight.

This ceramic tellurium (Te) oxide based main seal material, shown in FIGS. 11-12 and 14, was used for main seal layer 30 in examples tested for obtaining data herein for various figures/tables unless otherwise specified. This ceramic tellurium (Te) oxide based main seal material, shown in FIGS. 11-12 and 14, for example may be considered to have a melting point (Tm) of 390 or 395 degrees C, a softening point (Ts) of 320 degrees C, and a glass transition point (Tg) of 290 degrees C.

Table 1A sets forth example ranges for various elements and/or compounds for this example tellurium (Te) oxide based main seal 30 material according to various example embodiments, for both mol % and weight %, prior to firing/sintering thereof and thus prior to hermetic edge seal 3 formation. The carbon (C) content in Table 1A was measured between steps 204*b* and 210 in FIG. 20, namely after the material for seal layer 30 was applied in paste form including organic solvent and binder and after the paste was dried to substantially remove the solvent and heated to remove significant amounts of residual carbon—but prior to pre-glaze heating in step 211 and prior to laser sintering in step 212. Unlike the other elements and/or compounds in Table 1A, the carbon content is in units of ppm. In certain example embodiments, the main seal layer 30 may comprise mol % and/or wt. % of the following compounds in one or more of the following orders of magnitude: tellurium oxide>vanadium oxide>aluminum oxide, tellurium oxide>vanadium oxide>silicon oxide, tellurium oxide>vanadium oxide>aluminum oxide>magnesium oxide, and/or tellurium oxide>vanadium oxide>silicon oxide>magnesium oxide, before and/or after firing/sintering of the layer 30. It will be appreciated that other materials may be used together, or in place of, those shown below, and that the example percentages may be different in alternate embodiments.

TABLE 1A (example material for main seal layer 30 prior to firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Tellurium oxide (e.g., $TeO_4$ and/or other stoichiometry) | 20-60% or 40-90% | 25-50% or 40-70% | 30-42% | 20-70% | 30-65% | 40-55% |
| Vanadium oxide (e.g., $VO_2$ and/or other stoichiometry) | 5-45% or 5-58% | 10-30% or 5-37% | 15-21% | 5-50% | 8-38% | 18-28% |
| Aluminum oxide (e.g., $Al_2O_3$ and/or other stoichiometry) | 0-45% or 1-25% | 5-30% or 6-25% | 10-20% | 0-45% | 5-30% | 10-20% |
| Silicon oxide (e.g., $SiO_2$ and/or other stoichiometry) | 0-50% or 0-5% | 10-30% | 15-25% | 0-50% | 3-30% | 5-20% |
| Magnesium oxide (e.g., MgO and/or other stoichiometry) | 0-50% or 0-10% | 3-30% | 5-15% | 0-50% | 1-12% | 2-7% |
| Barium oxide (e.g., BaO and/or other stoichiometry) | 0-20% | 0-10% | 0.10-5% | 0-20% | 0-10% | 0.10-5% |
| Manganese oxide (e.g., MnO and/or other stoichiometry) | 0-20% | 0-10% | 0.50-5% | 0-20% | 0-10% | 0.50-5% |
| Carbon (C) [in units of ppm] | 20-100 ppm | 25-70 ppm | 30-60 ppm | n/a | n/a | n/a |

Tellurium Vanadate based and/or inclusive glasses (including tellurium oxide and/or vanadium oxide), such as those in Table 1A, in certain example embodiments are ideally suited for the main seal layer 30 functionality when utilizing laser irradiation for the firing/sintering of the main seal layer 30. The base main seal material may comprise tellurium oxide (e.g., a combination of $TeO_3$, $TeO_{3+1}$, and $TeO_4$) and vanadium oxide (e.g., a combination of $V_2O_5$, $VO_2$, and $V_2O_3$) per the weight % and/or mol % described in Table 1A. In certain example embodiments, it may be desirable to have a higher amount of tellurium oxide compared to vanadium oxide, in order to increase the material density in the sintered state and thus improve hermiticity of the seal. Other low-temperature materials, with relatively low melting point, may instead and/or also be used for seal layer 30. With respect to example main seal material(s) in Table 1A for the main seal layer 30, the Te oxide (e.g., one or more of $TeO_4$, $TeO_3$, $TeO_{3+1}$, and/or other stoichiometry (ies) involving Te and O) and V oxide (e.g., one or more of $VO_2$, $V_2O_5$, $V_2O_3$, and/or other stoichiometry(ies) involving V and O) in the material may be made up of about the following stoichiometries before/after sintering as shown below in Table 1B (tellurium oxide stoichiometries prior to firing/sintering), Table 1C (tellurium oxide stoichiometries after firing/sintering), Table 1D (vanadium oxide stoichiometries prior to firing/sintering), Table 1E (vanadium oxide stoichiometries after firing/sintering), respectively, measured via XPS.

TABLE 1B (example stoichiometries of Te oxide in material for main seal layer 30 prior to laser firing/sintering)

| | General | More Preferred | Most Preferred | Example |
|---|---|---|---|---|
| $TeO_4$ | 35-85% | 45-70% | 55-60% | 57% |
| $TeO_3$ | 20-65% | 30-55% | 35-45% | 42% |
| $TeO_{3+1}$ | 0-15% | 0.2-7% | 0.5-3% | 1% |

TABLE 1C (example stoichiometries of Te oxide in material for main seal layer 30 after laser firing/sintering)

| | General | More Preferred | Most Preferred | Example |
|---|---|---|---|---|
| $TeO_4$ | 3-35% | 5-25% | 10-20% | 14% |
| $TeO_3$ | 60-95% or 50-95% | 70-90% | 78-85% | 81% |
| $TeO_{3+1}$ | 0-15% | 1-9% | 3-7% | 5% |

TABLE 1D (example stoichiometries of V oxide in material for main seal layer 30 prior to laser firing/sintering)

| | General | More Preferred | Most Preferred | Example |
|---|---|---|---|---|
| $V_2O_5$ | 50-97% | 70-95% | 80-90% | 84% |
| $VO_2$ | 5-35% | 10-20% | 12-18% | 15% |
| $V_2O_3$ | 0-15% | 0.2-7% | 0.5-3% | 1% |

TABLE 1E (example stoichiometries of V oxide in material for main seal layer 30 after laser firing/sintering)

| | General | More Preferred | Most Preferred | Example |
|---|---|---|---|---|
| $V_2O_5$ | 5-45% | 10-35% | 20-30% | 25% |
| $VO_2$ | 35-85% | 50-75% | 58-67% | 63% |
| $V_2O_3$ | 2-30% | 6-20% | 9-15% | 12% |

For example, the "Example" column in Table 1B indicates that 57% of the Te present in the material prior to sintering/firing was in an oxidation state of $TeO_4$, 42% of the Te present in the material prior to sintering/firing was in an oxidation state of $TeO_3$, and 1% of the Te present in the material prior to sintering/firing was in an oxidation state of $TeO_{3+1}$. And the "Example" column in Table 1C indicates that after the laser firing/sintering of the main seal layer 30 just 14% of the Te present in the main seal layer 30 material was in an oxidation state of $TeO_4$, but 81% of the Te present in the material was in an oxidation state of $TeO_3$, and 5% of the Te present in the material prior to sintering/firing was in an oxidation state of $TeO_{3+1}$. Accordingly, in certain example embodiments, it will be appreciated that the laser firing/sintering of the main seal layer 30 may cause much of the $TeO_4$ to transform/convert into $TeO_3$ and $TeO_{3+1}$, which is advantageous because it increases the material's absorption in the near infrared (e.g., 808 or 810 nm for example, which may be used for the laser during sintering/firing) which provides for increased heating efficiency and reducing the chances of significantly de-tempering the glass substrate(s) due to improved heating efficiency during the firing/sintering.

Regarding Tables 1B-1C, there may be a shift in binding energy for Te in the main seal layer 30 caused by laser sintering/firing thereof according to an example embodiment. In certain example embodiments, laser sintering/firing may cause a distinct shift in binding energy associated with Te in main seal layer 30. A binding energy shift toward depolymerized tellurite structures. The laser sintering/firing of the main seal layer 30 may also cause the binding energy peak for V to shift in a distinct manner, corresponding to a reduction of $V^{5+}$ to $V^{4+}/V^{3+}$ in the main seal layer 30. For example, in certain example embodiments, the laser sintering/firing of the main seal layer 30 in step 212 may cause at least one of in the main seal layer 30: (a) a binding energy shift of the Te peak of at least about 0.15 eV, more preferably of at least about 0.20 eV, and most preferably of at least about 0.25 or 0.30 eV, which resulted in the stoichiometry changes discussed in Tables 1B-1C and the related advantages discussed above, and/or (b) a binding energy shift of the V peak of at least about 0.10 eV, more preferably of at least about 0.15 eV, which resulted in the stoichiometry changes discussed in Tables 1D-1E and the related advantages discussed above. In contrast, in certain example embodiments, the laser sintering/firing of the preform seal 13 for the pump-out tube seal did not result in a distinct binding energy shift of the Te peak or the V peak for preform 13, demonstrating that not all laser sintering/firing techniques have such an effect.

In certain example embodiments, prior to firing/sintering, the material for the main seal layer 30 may include tellurium oxide with the following stoichiometry/oxidation state ratio(s) in terms of what oxidation state(s) are used by the Te in the material (e.g., see Table 1B): $TeO_4>TeO_3>TeO_{3+1}$. But the laser sintering/firing of the main seal layer may then cause the Te stoichiometry ratios/states to change to the following during/after sintering/firing: $TeO_3>TeO_4>TeO_{3+1}$, which is advantageous in vacuum insulating panels as discussed above. The $TeO_4$ is a trigonal bipyramid structure, $TeO_3$ is a trigonal pyramid structure, and $TeO_{3+1}$ is a polyhedral structure. In certain example embodiments, due to optimized laser treatment for firing/sintering of the main seal layer as discussed herein, the $TeO_4$ largely converts to $TeO_3$ and marginally to $TeO_{3+1}$ with increasing temperature with a concurrent increase in the number of Te=O sites resulting from cleavage within the network structure. Tellurium oxide may have, for example, a Tg of about 305 degrees C, a crystallization temperature (Tx) of about 348 degrees C, and a Tm about 733 degrees C.

For example, the "Example" column in Table 1D indicates that 84% of the V present in the material prior to sintering/firing was in an oxidation state of $V_2O_5$, 15% of the V present in the material prior to sintering/firing was in an oxidation state of $VO_2$, and 1% of the V present in the material prior to sintering/firing was in an oxidation state of $V_2O_3$. And the "Example" column in Table 1E indicates that after the laser firing/sintering of the main seal layer just 25% of the V present in the main seal layer 30 material was in an oxidation state of $V_2O$, but 63% of the V present in the material was in an oxidation state of $VO_2$, and 12% of the V present in the material prior to sintering/firing was in an oxidation state of $V_2O_3$. The other columns in Tables 1B-1E represent the same, with different values as shown. Accordingly, in certain example embodiments, it will be appreciated that the laser firing/sintering of the main seal layer 30 may cause much of the $V_2O_5$ to transform/convert into $VO_2$ and $V_2O_3$, which is advantageous because it increases the material's density and thus the hermiticity and durability of the seal (e.g., $VO_2$ results in a more dense layer than does $V_2O_5$). In certain example embodiments, it is desirable to reduce the $V_2O_5$ content in the final sintered/fired state of the main seal 30 because the glass network becomes more closed with decreasing $V_2O_5$ concentration, e.g., due to the reduction of non-bridging oxygen resulting in a higher density seal which improves water/moisture resistance, mechanical strength (adhesive and cohesive), and/or hermeticity. The Tg of the main seal 30 material may also slightly increase with a reduction in $V_2O_5$.

In certain example embodiments, the vanadium oxide in the main seal layer material, before firing/sintering of the main seal layer 30, may include the following stoichiometry/oxidation state ratio(s): $V_2O_5>VO_2>V_2O_3$. But the laser sintering/firing of the main seal layer 30 may then cause the V stoichiometry ratios/states to change to the following during/after sintering/firing: $VO_2>V_2O_5>V_2O_3$, which is advantageous in vacuum insulating panels as discussed at least because it allows for higher density in the final seal layer. The $V_2O_5$ is an orthorhombic structure, $VO_2$ is a tetragonal structure, and $V_2O_3$ is corundum structured in the monoclinic C2/c space group. Vanadium is an insulator in a base form due to empty d-bands and acts as a network former/network modifier in the presence of tellurium oxide in the main seal material for layer 30 and/or the pump-out tube seal in certain example embodiments. Vanadium oxide may have, for example, a Tg about 250 degrees C, a crystallization temperature (Tx) about 300 degrees C, and a Tm about 690 degrees C.

Thus, from Tables 1B-1E and FIG. 12, it will be appreciated that in certain example embodiments an optimized type of laser processing (e.g., 808 or 810 nm continuous wave laser using the process in FIG. 18 and a laser beam size of about 6 mm, following a pre-heat to about 300-320 degrees C) may be used to sinter/fire the main seal layer 30 in a manner that causes one or more, or any combination, of the following to occur during and/or as a result of the sintering/firing: (a) stoichiometry values/oxidation states of Te in the layer to change from $TeO_4>TeO_3>TeO_{3+1}$ prior to laser firing/sintering, to $TeO_3>TeO_4>TeO_{3+1}$ following laser firing/sintering of the layer 30; (b) stoichiometry values/oxidation states of Te in the layer to change from $TeO_4>TeO_3$ prior to laser firing/sintering, to $TeO_3>TeO_4$ following laser firing/sintering of the layer 30; (c) stoichiometry values/oxidation states of vanadium (V) in the layer to change from $V_2O_5>VO_2>V_2O_3$ prior to laser firing/sintering, to $VO_2>V_2O_5>V_2O_3$ after laser firing/sintering of the layer 30; (d) stoichiometry values/oxidation states of V in the layer to change from $V_2O_5>VO_2$ prior to laser firing/sintering, to $VO_2>V_2O_5$ after laser firing/sintering of the layer 30; (e) the ratio $TeO_4:TeO_3$ to change from about 1.0 to 2.0 (more preferably from about 1.2 to 1.6, more preferably from about 1.3 to 1.5) prior to sintering/firing to from about 0.05 to 0.40 (more preferably from about 0.10 to 0.30, more preferably from about 0.13 to 0.22) after the laser sintering/firing of the layer 30; (f) the ratio $V_2O_5:VO_2$ to change from about 1.0 to 10.0 (more preferably from about 3.0 to 8.0, more preferably from about 4.5 to 7.0, with an example being 84:15=5.66) prior to sintering/firing to from about 0.10 to 0.90 (more preferably from about 0.20 to 0.80, more preferably from about 0.25 to 0.50, with an example being 25:63=0.39) after the laser sintering/firing of the layer 30; (g) a binding energy shift of the Te peak of at least about 0.15 eV, more preferably of at least about 0.20 eV, and most preferably of at least about 0.25 or 0.30 eV; and/or (h) a binding energy shift of the V peak of at least about 0.10 eV, more preferably of at least about 0.15 eV.

This main seal material(s) from Table 1 and FIGS. 11-12, 14, or substantially the same material, may also be used for the pump-out tube seal 13, with or without a primer, in certain example embodiments, although other types of seals may also be used such as vanadium oxide based ceramic sealing glass or solder glass. Other compounds may also be provided in this main seal 30 material, including but not limited to, on a weight and/or mol basis, for example one or more of: 0-15% (more preferably 1-10%) tungsten oxide; 0-15% (more preferably 1-10%) molybdenum oxide; 0-60% (or 38-52%) zinc oxide; 0-15% (more preferably 0-10%) copper oxide, and/or other elements shown in the figures.

Table 2 sets forth example ranges for various elements and/or compounds for this example tellurium oxide-based material for main seal layer 30 according to various example embodiments, for both mol % and weight %, after firing/sintering thereof and thus after hermetic edge seal 3 formation. The carbon (C) content in Table 2 was of course measured after step(s) 211 and/or 212 in FIG. 20, namely after at least pre-glaze heating in step 211. Unlike the other elements and/or compounds in Table 2, the carbon content is in units of ppm due to the small amounts involved. It will be appreciated that other materials may be used together, or in place of, those shown below, and that the example percentages may be different in alternate embodiments.

TABLE 2

(example material for main seal layer 30 after laser firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Tellurium oxide (e.g., $TeO_3$ and/or other stoichiometry) | 20-60% or 40-90% | 38-70% | 50-60% | 20-80% | 40-70% | 50-65% |
| Vanadium oxide (e.g., $VO_2$ and/or other stoichiometry) | 5-45% or 5-58% | 8-30% or 5-37% | 20-25% | 10-50% | 12-40% | 25-30% |
| Aluminum oxide (e.g., $Al_2O_3$ and/or other stoichiometry) | 0-45% or 1-25% | 5-30% or 6-25% | 8-20% | 0-45% | 3-30% | 5-15% |

TABLE 2-continued

| (example material for main seal layer 30 after laser firing/sintering) | General (Mol %) | More Preferred (Mol %) | Most Preferred (Mol %) | General (Wt. %) | More Preferred (Wt. %) | Most Preferred (Wt. %) |
|---|---|---|---|---|---|---|
| Silicon oxide (e.g., $SiO_2$ and/or other stoichiometry) | 0-50% or 0-5% | 3-30% | 5-20% | 0-50% | 1-25% | 1-10% |
| Magnesium oxide (e.g., MgO and/or other stoichiometry) | 0-50% or 0-10% | 0.1-20% | 0.5-5% | 0-50% | 0.1-12% | 0.2-5% |
| Barium oxide (e.g., BaO and/or other stoichiometry) | 0-20% | 0-10% | 0-5% | 0-20% | 0-10% | 0-5% |
| Manganese oxide (e.g., MnO and/or other stoichiometry) | 0-20% | 0-10% | 0.50-5% | 0-20% | 0-10% | 0.50-5% |
| Carbon (C) [in units of ppm] | 15-50 ppm | 15-40 ppm | 15-35 ppm, 15-30 ppm, 15-27 ppm | n/a | n/a | n/a |

This material from Tables 1-2 and FIGS. 11-12, 14 may also be used for the pump-out tube seal 13, with or without a primer, in certain example embodiments, although other types of seals may also be used such as vanadium oxide based ceramic sealing glass or solder glass. Other compounds may also be provided in or for this main seal 30 material, including but not limited to, on a weight or mol basis, for example one or more of: 0-15% (more preferably 1-10%) tungsten oxide; 0-15% (more preferably 1-10%) molybdenum oxide; 0-60% (or 38-52%) zinc oxide; 0-15% (more preferably 0-10%) copper oxide, and/or other elements shown in the figures. Certain elements may change during firing/sintering, and certain elements may at least partially burn off during processing prior to formation of the final edges seal 3.

In certain example embodiments, particle size for the material of the main seal layer 30 may be optimized for reduced particle size (e.g., for the D50 distribution) to improve material density and moisture resistance, and/or to improve thermal diffusivity. Traditional ceramic sealing glass materials have a D50 in the range of about 60.0 um to about 90.0 um which is acceptable for a thermal oven sintering process as an example, but has been found to experience some issues for laser processing. For laser processing, it has been found that improved results can be achieved by reducing particle size of the main seal layer 30. In certain example embodiments, the average D50 particle size and PSD mean may be significantly lower than traditional ceramic sealing glasses, as particle size is related to a thermal diffusivity rate of the ceramic sealing glass materials. Moreover, it has surprisingly been found that if the particle size is too large, then the density of the layer 30 tends to decrease and porosity tends to increase, and the layer becomes more susceptible to water and/or air leakage. It has also been found that too large of a particle size may contribute to significant de-tempering of the glass during edge seal formation, e.g., due to increasing lasing temperature and/or duration. Thus, small particle size may be used for layer 30 (and one or more of layers 31-32) in certain example embodiments. In certain example embodiments, before and/or after edge seal formation, the main seal layer 30 may have an average particle/grain size (D50) of from about 5-25 μm, more preferably from about 5-20 μm, more preferably from about 5-15 μm, and most preferably from about 10-15 μm. These same particle sizes may also be used for one or both primer layers 31 and/or 32, and/or tube seal material 13, before and/or after firing/sintering.

In certain example embodiments, the material for the main seal layer 30 may include filler. The amount of filler may, for example, be from 1-25 wt. % and may have an average grain size (d50) of 5-30 μm, for example an average d50 grain size from about 5-20 μm, more preferably from about 5-15 μm, and most preferably less than about 10 μm. Mixtures of two or more grain size distributions (e.g., coarse: d50=15-25 μm and fine: d50=1-10 μm) may be used. The filler may, for example, comprise one or more of zirconyl phosphates, dizirconium diorthophosphates, zirconium tungstates, zirconium vanadates, aluminum phosphate, cordierite, eucryptite, ekanite, alkaline earth zirconium phosphates such as (Mg,Ca,Ba,Sr) $Zr_4$ $P_5O_{24}$, either alone or in combination. Filler in a range of 20-25 wt. % may be used in layer 30 in certain example embodiments. Seal layer 30 may also include residual elements, such as carbon, from solvent(s) and binder (e.g., polypropylene carbonate is an example binder) that were present in the material as originally applied to the substrate in paste form. While polypropylene carbonate and/or poly(propylene carbonate) may be used as a binder in layers 30, 31 and/or 32 when initially applied in paste form, other binders may also and/or instead be used such as ethyl cellulose in various example embodiments. Main seal layer 30, and/or the primer layer(s) 31 and/or 32, is/are lead-free and/or substantially lead-free in certain example embodiments.

Table 3 sets forth example ranges for various elements for this example tellurium oxide based main seal 30 material according to various example embodiments, using elemental analysis (non-oxide analysis) for both mol % and weight %, prior to firing/sintering thereof and thus prior to hermetic edge seal 3 formation. FIG. 14 also provides an elemental analysis for various example seal materials, including for Te oxide based main seal and/or pump-out tube seal layers 30 and 13. Carbon is not included in Tables 3-4 or FIGS. 12, 14, for purposes of simplicity. In certain example embodiments, the main seal layer 30 and/or the pump-out seal layer 13 may comprise mol % and/or wt. % of the following elements in one or more of the following orders of magnitude: Te>V>Al, Te>V>Si, Te>V>Al>Mg, Te>0>V, Te>0>V>Al, and/or Te>V>Si>Mg, before and/or after firing/sintering of the layer (e.g., see also FIG. 14). It will be appreciated that other materials may be used together, or in place of, those shown below, and that the example percentages may be different in alternate embodiments. The elemental Te/V ratio in the main seal layer 30 and/or seal layer 13, after sintering/firing and in terms of weight %, may be from about 1.5:1 to 5:1, more preferably from about 2:1 to 4:1, and most preferably from about 2.5:1 to 3.5:1. The elemental Te/Al ratio in the main seal layer 30 and/or seal layer 13, after firing/sintering thereof and in terms of weight %, may be from about 5:1 to 35:1, more preferably from about 8:1 to 20:1, and most preferably from about 9:1 to 15:1. The elemental Si/Mg ratio in the main seal layer 30 and/or seal layer 13, after firing/sintering thereof and in terms of weight %, may be from about 1:1 to 35:1, more preferably from about 2:1 to 10:1, and most preferably from about 3:1 to 7:1. It has been found that one or more of these ratios is technically advantageous for achieving desirable melting points, softening points, and/or thermal diffusivity.

TABLE 3

(elemental analysis - example main seal 30 material prior to firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Te | 5-40% | 8-25% | 10-20% | 20-70% | 30-60% | 40-50% |
| O | 30-75% | 40-70% | 50-60% | 10-40% | 15-35% | 20-30% |
| V | 3-30% | 5-15% | 7-13% | 5-40% | 10-25% | 12-17% |
| Al | 5-40% | 8-25% | 10-15% | 2-30% | 3-20% | 5-11% |
| Si | 2-30% | 3-15% | 5-10% | 1-20% | 2-10% | 3-7% |
| Mg | 0-15% | 1-7% | 1-5% | 20-70% | 30-60% | 40-50% |
| Mn | 0-20% | 0.1-5% | 0.5-2% | 0-20% | 0.1-5% | 0.5-2% |

This material may also be used for the pump-out seal 13, with or without a primer, in certain example embodiments, although other types of seals may also be used such as vanadium oxide based ceramic sealing glass or solder glass. Other compounds may also be provided in this material (e.g., see FIG. 14).

Table 4 sets forth example ranges for various elements for this example tellurium oxide based main seal 30 material according to various example embodiments, using elemental analysis (non-oxide analysis) for both mol % and weight %, after firing/sintering thereof and thus after formation of the hermetic edge seal 3 (e.g., see also FIG. 14). It will be appreciated that other materials may be used together, or in place of, those shown below, and that the example percentages may be different in alternate embodiments.

TABLE 4

(elemental analysis - example main seal 30 material after firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Te | 10-60% | 20-40% | 25-30% | 20-90% | 40-80% | 50-70% |
| O | 20-60% | 25-50% | 30-40% | 3-22% | 5-16% | 7-12% |
| V | 3-30% | 5-15% | 7-13% | 5-40% | 10-25% | 12-17% |
| Al | 3-40% | 6-25% | 8-15% | 1-20% | 2-12% | 4-8% |
| Si | 0.5-10% | 1-6% | 2-4% | 0.5-10% | 1-6% | 1-3% |
| Mg | 0-10% | 0.1-5% | 0.5-3% | 0-10% | 0.01-5% | 0.1-3% |
| Mn | 0-20% | 0.5-6% | 1-3% | 0-20% | 0.5-6% | 1-3% |

This material may also be used for the pump-out seal 13, with or without a primer, in certain example embodiments, although other types of seals may also be used such as vanadium oxide based ceramic sealing glass or solder glass. Other compounds may also be provided in this material (e.g., see FIG. 14).

As explained above, it has been found that vacuum insulating panels having edge seals comprising low temperature material (at least one edge seal layer having a low melting point, such as edge seal material for layer 30 based on an oxide of Te and/or V) outgas contaminants into the vacuum cavity 5 including carbon monoxide, carbon dioxide, oxygen, and/or hydrogen upon exposure to high and/or prolonged levels of ultraviolet (UV) radiation. For example, edge seals tend to outgas carbon monoxide, carbon dioxide, oxygen, and/or hydrogen when exposed to high levels of UV radiation or prolonged exposure to ambient UV radiation, and vacuum getters contained internal to the vacuum cavity cannot adsorb all outgassed species emitted over a period of time from the low temperature seal material as a result of UV exposure. Thus, vacuum quality in the cavity/gap 5 is reduced and the vacuum insulating panel u-factors increase in an undesirable manner upon exposure to UV due to vacuum cavity contamination which increases the effective pressure in the cavity. The increase in u-factor reduces the useful life of the vacuum insulated panel making it challenging to achieve a desirable, e.g., twenty to thirty year product life. The cause for such UV induced degradation problems has heretofore been unknown.

Through experimentation, the instant inventors have found a solution to this problem. It has been found that a cause of such UV induced degradation of vacuum insulating panels is high amounts of residual carbon remaining in low-temperature edge seal material after formation of the seal edge seal. Residual carbon is present in the edge seal material 30 due to its presence in organic solvent(s) and binders such as one or more of polyalkylene carbonate, polypropylene (PP) carbonate, ethyl cellulose, methyl cellulose, and/or hydroxypropyl methyl cellulose used in the initial application of the edge seal material in the form of a paste (e.g., as applied in step 204 shown in FIG. 20). Such carbon containing solvent(s) and/or binder(s) are used in all ceramic edge seals for vacuum insulating panels as far as the instant inventors are aware. It has been found that high amounts of residual carbon remaining in the ceramic edge seal, such as in layer 30, after formation of the seal leads to outgassing problems and increasing u-factors of the panel upon significant and/or prolonged UV exposure. In other words, the instant inventors have found that too much residual carbon remaining in the ceramic edge seal material of the final panel is problematic in these respects, especially upon UV exposure, which prevents or reduces chances of the panel from attaining a useful product lifetime of at least about twenty years, more preferably of at least about twenty-five or thirty years.

In certain example embodiments, processing has been improved in order to remove more carbon from low temperature edge seal material (e.g., from layer 30), so that less residual carbon remains in the ceramic edge seal 3 of the final manufactured vacuum insulating panel. De-tempering of glass can be reduced by using low temperature edge seal material 30 having a low melting point (possibly in combination with high temperature material for other seal layer(s) such as primer(s)), and by reducing residual carbon content in such low temperature edge seal material 30 the manufactured panel is less susceptible to degradation upon UV exposure.

Edge seal material is typically initially applied to a substrate in the form of a paste, where the paste includes the edge seal material as well as solvent and binder. This is how the material for layer 30 is initially applied, in the form of a paste including organic solvent and binder such as PP carbonate, in step 204 in FIG. 20. The binder functions to structurally hold the edge seal material together before it is sintered such as being sintered using a laser, microwave, and/or localized IR hearting. Carbon content in the paste, due to the presence of carbon in the binder and solvent, is typically from about 100,000 to 200,000 ppm, more preferably from about 100,000 to 150,000 ppm. For example, PP carbonate is a known example binder which includes high amounts of carbon, which volatizes between about 240 and 320 degrees C. After the low temperature seal material for layer 30 is applied in the form of a paste in step 204 (including the carbon containing solvent and binder), the paste is dried at step 204*a* (e.g., at from about 130-230 degrees C, more preferably from about 170-200 degrees C, with an example being about 170-185 degrees C) to remove significant amounts of carbon from the solvent, but leaving the binder to hold the material together prior to sintering. It has been found that such drying/heating in step 204*a* does not remove all carbon from the paste, and that residual carbon at this point after the paste has been dried (i.e., after step 204*a*, but before step 204*b*) can be from about 200-600 ppm, or from about 180-400 ppm, e.g., as measured using combustion-based IR-spectrum carbon analysis for instance.

Accordingly, additional heating steps were added, namely steps 204*b* and 211 shown in FIG. 20. In step 204*b*, the material for the main seal layer 30 is again heated in order to decompose the binder therein, for example at temperature(s) of from about 240-350 degrees C, more preferably from about 250-340 degrees C. This causes significant amounts of the binder to decompose. Then, after cooling and mating of the two substrates in step 210, the coupled substrates with all seal layers thereon are heated in pre-glaze heating step 211, for example at temperature(s) of from about 300-400 degrees C, more preferably from about 340-380 degrees C. These heating steps have been found to sufficiently reduce the carbon content of the material for seal layer 30 so as to reduce residual carbon content in the low temperature edge seal material of the manufactured panel so that the panel is less susceptible to degradation upon UV exposure.

Thus, for example, carbon (C) content in the material for main seal layer 30 may be as follows in Table 4A at the following various points during the manufacturing process outlined in FIG. 20, in units of ppm. The Examples in the last three rows of the chart below were actual measurements taken via carbon combustion analysis of various samples of material for low temperature seal layer 30 according to various example embodiments. For taking these measurements, the analytical technique was based on the complete and instantaneous oxidation of the solid sample by combustion in oxygen above 1500 degrees C.—each sample was placed in a ceramic crucible in an RF induction furnace under an oxygen carrier stream—the combustion of the sample released carbon which bonded with the oxygen in the carrier flow to form $CO_2$—the carbon for each sample was then measured by four IR detectors, after dust and moisture removal. The data for the examples in the final row were taken from measurements of the material after step 211.

TABLE 4A

CARBON CONTENT IN MATERIAL FOR SEAL LAYER 30

| | General (ppm) | More Preferred (ppm) | Most Preferred (ppm) | Example(s) (ppm) |
|---|---|---|---|---|
| C in material for layer 30 between steps 204 and 204a | 50,000-250,000 | 100,000-200,000 | 120,000-150,000 | 130,000 |
| C in material for layer 30 between steps 204a and 204b | 100-800 | 180-600 | 220-400 | 180, 310 |
| C in material for layer 30 between steps 204b and 210 | 35-150 | 40-100 | 45-80 | 47, 65, 73, 75, 77 |
| C in material for layer 30 after step 211 and/or 212 (e.g., in final panel) | 5-70<br>5-50<br>5-43 | 10-40 | 20-35 | 22, 27, 31, 34, 38 |

In certain example embodiments, ceramic seal layer 30, after step 211 and/or 212 (e.g., in the final manufactured panel) comprises from about 5-70 ppm carbon, more preferably from about 5-50 ppm carbon, more preferably from about 5-43 ppm carbon, more preferably from about 10-40 ppm carbon, and for example from about 20-35 ppm carbon. In certain example embodiments, ceramic seal layer 30, after step 211 and/or 212 (e.g., in the final manufactured panel) comprises no more than about 50 ppm carbon, more preferably no more than about 45 ppm carbon, more preferably no more than about 40 ppm carbon, more preferably no more than about 35 ppm carbon, and even more preferably no more than about 30 ppm carbon.

In certain example embodiments, the carbon content of the primer layers 31 and 32 is no greater than the carbon content of layer 30. Primer layers 31 and 32 may be high temperature materials as discussed herein, with relatively high melting points, which materials are heated to very high temperatures during thermal tempering or heat strengthening (e.g., at least about 580 degrees C, more preferably at least about 600 degrees C) such as during steps 203, 208, which causes most of the carbon to burn off from the material for the primer layers 31 and 32. Thus, it has been found that carbon content is not a significant concern or issue in high temperature layers such as primer layers 31 and 32 which are processed at high temperatures.

FIGS. 13-14 illustrate an example material(s) that may be used for the primer layer(s) 31 and/or 32 in various example embodiments, including for example in any of the embodiments of FIGS. 1-9. However, other suitable materials, such as solder glass, other materials comprising bismuth oxide, and so forth, may be used for one or both primer layers 31 and/or 32 in various example embodiments. FIGS. 13*a*-13*b* are tables/graphs showing weight % and mol % of various compounds/elements in a primer seal 31 and/or 32 material according to an example embodiment (measured via carbon detecting XRF), before and after laser treatment for edge seal formation, which primer material may be used in combination with any embodiment herein (e.g., for one or both primer layers); and the right side of FIG. 14 sets forth a table/graph showing an elemental analysis (non-oxide analysis) of weight % and mol % of various elements in an example primer material, before and after laser treatment for edge seal formation. This primer material, shown in FIGS. 13-14, was used for primer layers 31 and 32 in examples tested for obtaining data herein for various figures/tables herein unless otherwise specified. This primer material, shown in FIGS. 13-14, for example may be considered to have a melting point (Tm) of 620 degrees C, a softening point (Ts) of 551 degrees C, and a glass transition point (Tg) of 486 degrees C.

Table 5 sets forth example ranges for various elements and/or compounds for this example primer material according to various example embodiments, for both mol % and weight %, prior to firing/sintering. In certain example embodiments, one or both of the primer layers 31 and/or 32 may comprise mol % and/or wt. % of the following compounds in one or more of the following orders of magnitude: boron oxide>bismuth oxide>silicon oxide, bismuth oxide>silicon oxide>boron, boron oxide>bismuth oxide>silicon oxide>titanium oxide, bismuth oxide>silicon oxide>boron oxide>titanium oxide, boron oxide>silicon oxide>titanium oxide>bismuth oxide, and/or silicon oxide>boron oxide>bismuth oxide, before and/or after formation of the hermetic edge seal 3. It will be appreciated that other materials may be used together, or in place of, those shown below, and that the example percentages may be different in alternate embodiments.

TABLE 5

(example primer material prior to firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| bismuth oxide (e.g., $Bi_2O_3$ and/or other stoichiometry) | 0.5-50% | 1-10% | 2-5% | 5-50% or 55-95% | 10-40% or 70-80% | 15-25% or 70-80% |
| boron oxide (e.g., $B_2O_3$ and/or other stoichiometry) | 10-50% | 20-40% | 25-35% | 10-50% | 20-40% | 25-35% |
| Silicon oxide (e.g., $SiO_2$ and/or other stoichiometry) | 0-50% or 0-15% | 5-30% or 5-15% | 15-25% | 0-50% | 5-30% | 15-25% |
| Titanium oxide (e.g., $TiO_2$ and/or other stoichiometry) | 0-20% | 1-10% | 3-7% | 0-20% | 1-10% | 3-7% |

It is noted that "stoichiometry" as used herein covers, for example, oxygen coordination and oxygen state. Other compounds may also be provided in the primer material (e.g., see FIGS. 13-14). For example, on a weight basis, the primer material for one or both layers 31 and/or 32 may further comprise one or more of: 2-20% (or 2-7%) zinc oxide; 0-15% (or 2-7%) aluminum oxide; 0-10% (or 0-5%) magnesium oxide; 0-10% (or 0-5%) chromium oxide; 0-10% (or 0-5%) iron oxide; carbon dioxide; and/or other elements shown in the figures.

Table 6 sets forth example ranges for various elements and/or compounds for this example primer layer 31 and/or 32 material according to various example embodiments, for both mol % and weight %, after firing/sintering thereof and after hermetic edge seal 3 formation. It will be appreciated that other materials may be used together, or in place of, those shown below, and that the example percentages may be different in alternate embodiments.

TABLE 6

(example primer material after edge seal formation)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| bismuth oxide (e.g., $Bi_2O_3$ and/or other stoichiometry) | 0.5-50% | 1-12% | 4-9% | 5-70% or 55-95% | 20-50% or 70-80% | 30-40% or 70-80% |
| boron oxide (e.g., $B_2O_3$ and/or other stoichiometry) | 10-50% | 15-40% | 20-30% | 5-50% | 10-35% | 15-25% |
| Silicon oxide (e.g., $SiO_2$ and/or other stoichiometry) | 0-50% or 0-15% | 15-35% or 5-15% | 22-30% | 0-50% | 5-35% | 15-30% |
| Titanium oxide (e.g., $TiO_2$ and/or other stoichiometry) | 0-20% | 3-12% | 4-11% | 0-20% | 3-12% | 4-11% |

Other compounds may also be provided in this primer material, as discussed above and/or shown in the figures. Certain elements may change during firing/sintering, and certain elements may at least partially burn off during processing prior to formation of the final edges seal 3. It will be appreciated that, as with other layers discussed herein, other materials may be used together, or in place of, those shown above and/or below, and that the example weight/mol percentages may be different in alternate embodiments. The ceramic sealing glass primer materials for layer(s) 31 and/or 32 are lead-free and/or substantially lead-free in certain example embodiments.

In various example embodiments, materials for the ceramic sealing glass primer layers 31 and/or 32 may be selected to produce a high degree of hermeticity on the order of, for example, $10^{-8}$ cc/$m^2$ per day for air penetration and/or $10^{-8}$ cc/m2 per day for water penetration. Such a high degree of hermeticity may in part be achieved by reducing the PSD mean particle size (e.g., to less than about 20 μm, more preferably less than about 15 μm) and selecting a binder resin that burns out substantially uniformly to create a primer layer with a high degree of homogeneity. In certain example embodiments, one or both of the primer layers 31 and/or 32 may have one or more of: an average D50 particle size from about 2-15 μm (more preferably from about 3-8 μm), an average D10 from about 0.10-4.0 μm, an average D90 particle size from about 15-25 μm and an example of about 25 μm, and/or an average D95 particle size less than about 30.0 μm.

Table 7 sets forth example ranges for various elements for the example primer material according to various example embodiments, using elemental analysis (non-oxide analysis) for both mol % and weight %, after firing/sintering thereof and thus after hermetic edge seal 3 formation. FIG. 14 also provides an elemental analysis for various example seal materials, including the primer material at the right side thereof. In certain example embodiments, one or both of primer layers 31 and/or 32 may comprise mol % of the following elements in one or more of the following orders of magnitude: B>Bi, O>B>Bi, O>B>C, O>B>Si>Bi, and/or B>Si>Bi>Ti, before and/or after firing/sintering of the layer and formation of the edge seal 3 (e.g., see also FIG. 14). It will be appreciated that other materials may be used together, or in place of, those shown below, and that the example percentages may be different in alternate embodiments.

TABLE 7

(elemental analysis - example primer material after firing/sintering and after edge seal formation)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Bi | 1-40% | 2-15% | 3-7% | 10-70% | 20-50% | 30-40% |
| Si | 3-40% | 4-20% | 6-13% | 3-40% | 4-20% | 6-13% |
| B | 3-40% | 5-30% | 10-20% | 1-30% | 2-20% | 4-10% |
| Ti | 0-20% | 1-10% | 2-5% | 1-30% | 3-20% | 4-9% |
| O | 30-80% | 40-70% | 50-60% | 10-55% | 20-45% | 30-40% |

The primer materials in FIGS. 13-14 and Table 7 may be considered to be boron-based, given that excluding oxygen, silicon, and carbon, boron has the largest magnitude in terms of mol % before and/or after firing/sintering. While other materials (e.g., bismuth based primers, solder glass, etc.) may be used for layer(s) 31 and/or 32 in certain example embodiments, boron-based material such as in FIGS. 13-14 and Table 7 may be desirable for use as primer layer(s) 31 and/or 32 in certain example embodiments, for example when laser heating is used for sintering/firing the main seal layer 30, as follows. Bismuth based primers, with little to no boron in terms of mol %, have been found to block large amounts of energy from the laser 41 so that it does not reach main seal layer 30 during firing/sintering of that layer. It has been found that by reducing Bi, and increasing B, in terms of mol %, the primer layer(s) 31 and/or 32 can be more transmissive of certain laser energy (e.g., from a near-IR laser, such as 808 or 810 nm) thereby allowing the main seal layer 30 to be more efficiently and quickly heated and sintered/fired without significantly de-tempering the glass substrate(s) 1 and/or 2. Thus, the boron-based (mol %)

material(s) of FIGS. 13-14 and Table 7 may be used for one or both primer layer 31 and/or 32 in certain example embodiments, for instance when laser heating is used that impinges upon a primer layer. In certain example embodiments, one or both primer layer(s) 31 and/or 32 may comprise, in terms of mol %, the material of Table 7. In certain example embodiments, on an elemental basis (not including oxides) and in terms of mol %, primer layer(s) 31 and/or 32 may have a ratio B/Bi, of boron (B) to bismuth (Bi), of from about 1.1 to 10.0, more preferably from about 2.0 to 6.0, and most preferably from about 2.5 to 4.5 (with an example being about 3.7), after firing/sintering of the main seal layer 30 and/or primer(s). In certain example embodiments, in terms of mol % after sintering/firing of layer 30, primer layer(s) 31 and/or 32 may comprise at least two times as much B as Bi, more preferably at least about three times as much B as Bi, and/or may comprise at least about two time as much B oxide as Bi oxide, more preferably at least about three times as much B oxide as Bi oxide. Such a primer (e.g., 31) is thus able to allow sufficient near-IR energy from the laser (e.g., at 808 or 810 nm) to pass so that the main seal layer 30 can be efficiently and quickly fired/sintered, without significantly de-tempering glass and/or inducing significant transient thermal stress.

FIG. 15 is a table/graph showing density (g/cm$^3$) vs. temperature (degrees C) for two different example low temperature ceramic frit main seal layer 30 materials according to example embodiments, which seal material(s) may be used in combination with any embodiment herein including those of FIGS. 1-9. The upper curve in FIG. 15 is for a Te oxide based main seal 30 material as shown in FIGS. 11-12 and 14, whereas the lower curve in FIG. 15 is for a vanadium oxide-based seal 30 material the composition of which is illustrated in FIG. 15. The data in FIG. 15, for these two different example main seal layers 30, was taken after a binder burnout at about 325 degrees C for about 15 minutes and sintering for about 15 minutes.

In certain example embodiments, main seal layer 30, after edge seal formation (e.g., via laser sintering), may have a density of at least about 2.75 g/cm$^3$, more preferably of at least about 2.80 g/cm$^3$, more preferably of at least about 2.90 g/cm$^3$, more preferably of at least about 3.00 g/cm$^3$, even more preferably of at least about 3.10 g/cm$^3$, and most preferably of at least about 3.20 g/cm$^3$. In certain example embodiments, the main seal layer 30, after edge seal formation (e.g., via laser sintering), may have a density of from about 2.80-4.00 g/cm$^3$, more preferably from about 2.90-3.90 g/cm$^3$, and most preferably from about 3.10-3.70 g/cm$^3$ or 3.15-3.40 g/cm$^3$. In certain example embodiments, these main seal layer 30 density ranges, preferably with a substantially lead-free ceramic material, may be in combination with a maximum processing temperature of the main seal layer 30 (e.g., during sintering and formation of the edge seal) during edge seal formation of no more than about 520 degrees C, more preferably no more than about 500 degrees C, and most preferably no greater than about 480 degrees C. For example, the main seal layer 30 may be of or include a material characterized by the above density ranges, after being processed at about 405 degrees C for about 15 minutes. As explained above, such high densities advantageously provide for less porosity, good water resistance, good mechanical adhesion strength, and good hermiticity for the edge seal.

In certain example embodiments, one or both primer layer(s) 31 and/or 32 may have, after edge seal formation (e.g., via laser sintering), a density of at least about 2.75 g/cm$^3$, more preferably of at least about 3.20 g/cm$^3$, more preferably of at least about 3.40 g/cm$^3$, more preferably of at least about 3.50 g/cm$^3$, even more preferably of at least about 3.60 g/cm$^3$. In certain example embodiments, one or both primer layers may have a density higher than the density of the main seal layer 30. The high density of the primer layer(s) is advantageous for improving hermiticity of the overall edge seal. In certain example embodiments, primer layer 31 and/or primer layer 32 may have a density of from about 3.0-4.2 g/cm$^3$, more preferably from about 3.3-4.0 g/cm$^3$, more preferably from about 3.5-3.8 g/cm$^3$, more preferably from about 3.6-3.7 g/cm$^3$. In certain example embodiments, primer layer 31 and/or primer layer 32 may have a density of at least about 0.20 g/cm$^3$ higher (more preferably at least about 0.30 higher, more preferably at least about 0.40 higher) than a density of the main seal layer 30. For example, the main seal layer 30 may have a density of about 3.22 g/cm$^3$ and the primer layers 31 and 32 may each have a density of about 3.66 g/cm$^3$.

In various example embodiments, sintering laser beam 40 size (e.g., diameter) may be from about 30-70% (e.g., about 50%) larger than a width of main seal layer 30. For example, for a main layer 30 width of 6 mm, a laser beam diameter may be about 8 or 9 mm. In certain example embodiments, the laser beam spot size may range from about 25% to about 100% larger than the width of the main seal layer 30 if the laser power is adjusted for desired irradiation time for a given spot in the main seal layer. In certain embodiments, laser beam size (e.g., diameter) may be from between 50% and 150% larger than the width of the main seal layer 30 by optimizing laser power and/or laser optics to create a desired beam shape to achieve an irradiation spot time of less than 1 second, with an example being no more than about 0.7 or 0.5 seconds. For example, a continuous wave 810 nm laser may be used with a laser beam size (e.g., diameter) of 9 mm for a main seal layer 30, an irradiation spot size of about 7.65 mm, a main seal layer width of about 6 mm, a laser power level of about 60 watts, main layer pre-heat temperature of about 320 degrees C, linear laser rate of from about 5-40 mm/s (e.g., 14 or 20 mm per second), and/or an irradiation spot time of about 0.4 or 0.5 seconds. An example vacuum insulated panel so produced may have, for example, one or more of: U-factor of about 0.41 W/mK, R-value of at least about R-13.7, and/or a cavity vacuum pressure of about $2.45\times10^{-6}$ torr. Such an example vacuum insulated panel when measured using SCALP, for example, exhibited a center of glass compressive surface stress of about 14,000 psi, a central tensile stress of about 6,500 psi, and an edge of glass compressive surface stress of about 12,500 psi, thereby demonstrating that the vacuum insulated panel was (remained) tempered to ASTM standards and satisfied an example criteria of less than or no more than 2,000 psi difference between the center of glass and edge of glass compressive surface stress.

It has surprisingly and unexpectedly been found that optimizing a temperature(s) to which the panel (e.g., glass substrate(s) and/or seal layer(s)) is/are pre-heated, prior to laser sintering of the main seal layer 30, can advantageously provide for improved durability of the final vacuum insulating panel, such as less de-tempering of the glass, reduced induced transient thermal stress in the main seal layer 30 and/or glass substrates, and so forth. FIG. 16 is a pre-heat temperature (degrees C) vs. induced transient thermal stress (MPa) graph plotting curves for induced stress in both the main seal layer 30 (referred to as “frit” in FIG. 16) and glass substrate(s) 1 and/or 2 as a function of this pre-heat temperature. For example, FIG. 16 illustrates that a pre-heat temperature to about 100 degrees C of at least the glass substrates 1 and/or 2, and/or the main seal layer 30, prior to laser sintering of the main seal layer 30, results in induced transient thermal stress of about 130 MPa in the main seal layer 30 and about 155 MPa in the glass substrate, whereas a pre-heat temperature of at least the glass substrate and/or the main seal layer 30, to about 320 degrees C, prior to laser sintering of the main seal layer 30, results in induced transient thermal stress of about 12 MPa in the main seal layer 30 and the glass substrate. However, if the pre-heat temperature is too high, this may result in too much de-tempering of thermally tempered glass substrates as compressive surface stress of the glass substrates may be significantly reduced for example.

Thus, in certain example embodiments, it has been found that pre-heating at least one of the glass substrates 1 and 2, and/or the main seal material 30, in step 211 in FIG. 20 to a temperature of from about 150-380 degrees C, more preferably from about 200-340 degrees C, more preferably from about 250-340 degrees C, more preferably from about 280-340 degrees C, more preferably from about 300-340 degrees C, more preferably from about 310-330 degrees C, with an example being about 320 degrees C (e.g., using the main seal 30 material shown in FIGS. 11-12), prior to laser sintering of the main seal layer 30, advantageously results in the glass substrates 1 and 2 retaining most of their original temper strength and the induced transient thermal stress in the glass substrates 1, 2 and the main seal layer 30 being kept relatively low during and/or following the edge seal 3 formation. See FIG. 16 for example. This can result in improved adhesion, a more durable vacuum insulating panel 100, and higher lasing speeds to reduce manufacturing costs. For example, this pre-glaze heating in step 211 may be carried out using radiation, convection and/or conduction type(s) of heating, for example with a bath oven, in-line oven, or using a precision hot plate incorporating convective heating to achieve the desired substantial thermal uniformity across the substrate surface and seal material. These temperature ranges may vary when other main seal materials are used.

When, for example, the laser beam 40 during step 212 heats the main edge seal 30 material during sintering/firing thereof to a maximum temperature of from about 440-500 degrees C, more preferably to about 460-490 degrees C, with an example being about 470 degrees C, this pre-glaze heating (e.g., to about 300-330 degrees C discussed above) reduces the thermal delta between the starting glass substrate/sealing material temperature and the maximum main edge seal material temperature achieved during the sintering/firing of the main seal layer 30 (e.g., see FIG. 18 which shows an example desirable delta of 462−316=146 degrees C), and reduces the thermal delta between the starting glass substrate temperature and the melting point (Tm) of the main seal layer 30 material which may be from about 390-410 degrees C for example, thereby reducing resulting thermal stress in the sealing glass material. Thus, for example, the laser during sintering/firing of the main seal layer 30 may only heat the main seal layer from about 320 degrees C to about 470 degrees C (a total of about 150 degrees C), whereas if there were no such pre-heating in step 211 the laser during sintering/firing of the main seal layer 30 may heat the main seal layer from about 25 degrees C to about 470 degrees C (a total of about 445 degrees C). The pre-heating significantly reduces the total heating of the main seal material 30 and/or the glass substrates by the laser 41 during sintering/firing of the main seal material, thereby for example reducing transient and residual stress in the main seal layer 30 and glass substrates 1, 2. For example, induced transient thermal stress in the main seal material and/or glass substrate(s) may be over 50 MPa without pre-heating to raise the ambient substrate temperature, versus no more than about 20 MPa (more preferably no more than about 10 MPa) with the glass substrate(s) and/or one or more of sealing layer(s) 30-32 being pre-heated to 320 degrees C. The example substrate pre-heat temperatures from about 280-340 degrees C, more preferably from about 300-340 degrees C, more preferably from about 310-330 degrees C, with an example being about 320 degrees C, are desirable because if the temperature is raised to high then significant de-tempering of the glass substrate(s) may occur. And if the pre-heat temperature is too low, then the thermal delta between the laser induced temperature and the pre-heat temperature becomes too large and the transient thermal stress will become too high and may result in micro-cracks, delamination, and/or other issues in the main seal layer 30 as shown in FIG. 16.

In certain example embodiments, based on the main seal material being used for main seal layer 30, pre-glaze heating in step 211 may be performed in a manner to cause at least one of the glass substrates 1 and 2, one or more of the primer layers 31-32, and/or the main seal material 30, to reach a temperature(s) prior to sintering/firing of the main seal layer 30, so that as a result of such sintering/firing the glass substrates 1 and 2 and/or the main seal layer are able to realize induced transient thermal stress of no more than about 20 MPa, more preferably no more than about 10 MPa. In certain example embodiments, based on the main seal material being used for main seal layer 30, pre-heating prior to sintering/firing of the main seal layer 30 may be performed in a manner to cause at least one of the glass substrates 1 and 2, one or more of the primer layer(s), and/or the main seal material 30, to reach a temperature(s) of from about 40-120 degrees C (more preferably from about 50-100 degrees C, even more preferably from about 60-90 degrees C, and most preferably from about 70-80 degrees C) less than the melting point (Tm) of the material for the main seal layer 30. In certain example embodiments, pre-heating prior to sintering/firing of the main seal layer 30 may be performed in a manner to cause at least one of the glass substrates 1 and 2, at least one of the primer layer(s), and/or the main seal material 30, to reach a temperature(s) of from about 150-450 degrees C (more preferably from about 200-400 degrees C, even more preferably from about 250-350 degrees C) less than the melting point (Tm) of the material for at least one of the primer layers 31 and/or 32. In certain example embodiments, based on the main seal material being used for main seal layer 30, pre-heating prior to sintering/firing of the main seal layer 30 may be performed in a manner to cause at least one of the glass substrates 1 and 2, at least one primer layer(s), and/or the main seal material 30, to reach a temperature(s) within about 70 degrees C, more preferably within about 50 degrees C, more preferably within about 30 degrees C, and more preferably within about 20 degrees C, of the softening point (Ts) of the material for the main seal layer 30. In certain example embodiments, based on the main seal material being used for main seal layer 30, pre-heating prior to sintering/firing of the main seal layer 30 may be performed in a manner to cause at least one of the glass substrates 1 and 2, at least one primer layer, and/or the main seal material 30, to reach a temperature(s) at least 5 degrees C greater than, more preferably at least 10 degrees greater than, and most preferably at least 20 degrees greater than, the transition temperature (Tg) of the material for the main seal layer 30. For example, the example main seal material shown in FIGS. 11-12 has a Tm of about 395 degrees C, a Ts of about 320 degrees C, and a Tg of about 290 degrees C. The main seal layer 30, in certain example embodiments, may realize one or more of: reduced particle size, a $TeO_3$ and/or $TeO_4$ based or inclusive composition that results in a low-melting point material; beta eucryptite comprising lithia alumino-silicate glass to optimize CTE, low thermal melting point, small particle size, or any combination thereof. Moreover, at least layer 30 may be designed to achieve an optimal rate of thermal diffusivity by optimizing the material mass density, specific heat capacity and thermal conductivity, in certain example embodiments.

FIGS. 17-18 illustrate different examples of heating the main seal layer 30 via laser beam 40 during step 212 in order to fire/sinter that layer 30 during formation of the edge seal 3, according to various example embodiments. Primer layer 31 and/or 32 may of course be heated along with the main seal layer 30. FIG. 17 is an example using a laser beam speed of 5 mm/s, whereas FIG. 18 is an example using a laser beam speed of 20 mm/s (e.g., along path 42 in FIG. 7). FIG. 17 is a Time (seconds) vs. Spot Temperature (degrees C) graph plotting the temperature of a spot on the main seal layer 30 and/or primer layer 31 during laser treatment thereof via an 808 nm or 810 nm continuous wave laser beam 41 moving laterally across the panel at 5 mm/s when the main seal layer 30 is being fired/sintered to form the edge seal 3. FIG. 18 is similar to FIG. 17, except that the lateral speed of the laser beam across the panel is 20 mm/s. In certain example embodiments, as the laser beam passes over the main seal material, a given point of the main seal material 30 and/or primer 31 may be irradiated by the laser beam 40 for an irradiation time of from about 0.15 to 4.0 seconds, more preferably from about 0.20 to 1.0 seconds, more preferably from about 0.4 to 0.6 seconds, to achieve the desired physical, chemical and/or mechanical properties including hermeticity while achieving an acceptable laser linear line rate.

Referring to FIGS. 17-18, it has been found that adjusting the time "T" that a given spot/point/location on the main seal layer 30 and/or the primer layer 31 is above the melting point (Tm) of the material for the main seal layer 30 during laser sintering/firing of the layer 30 is technically advantageous in that de-tempering of glass substrate(s) can be reduced, cracking of the seal and/or glass can be avoided or reduced, high density of the main seal layer 30 material can be achieved, and induced transient thermal stress in the main seal layer 30 can be kept to relatively low value(s). The laser beam passes through a glass substrate and primer layer 31 as shown in the figures, in certain example embodiments, so measurements of the temperature of primer layer 31 are also instructive and indicative of the temperature of layer 30. The spot temperatures of the seal in FIGS. 17-18 were measured via laser pyrometer positioned over the seal material 30-32, through the overlying glass substrate. FIGS. 17-18 illustrate that the laser heating of the main seal layer 30 and primer 31 begins at about 315-320 degrees C, after the pre-heating of the glass substrates 1, 2 and main seal 30 material discussed above. For example, the example main seal material shown in FIGS. 11-12 has a melting point (Tm) of about 395 degrees C. If the time "T" that the primer layer 31 and/or main seal layer 30 is above Tm is too long, this may result in one or more of: significant de-tempering of the glass substrate(s), cracks in the edge seal 3, a low density and thus a porous main seal layer 30 prone to leakage, large amounts of induced transient thermal stress in the main seal material 30 and/or glass substrate(s). On the other hand, if the time "T" is too short, this may result in inadequate sintering and/or inadequate bonding between the main seal layer 30 and primer(s) 31 and/or 32, or an adjacent glass substrate. In the example embodiment of FIG. 17, the time "T" that a given spot/point/location on the main seal layer 30 and/or the primer layer 31 is above the melting point (Tm) of the material for the main seal layer 30 during laser sintering/firing of the layer 30 is about 1.4 seconds, whereas in the example embodiment of FIG. 18 the time "T" is about 1.3 seconds due to the faster lateral laser beam speed in the FIG. 18 embodiment. Thus, in certain example embodiments, it is possible during sintering/firing of the main seal layer 30 to rapidly heat the main seal material in an economically efficient manner without cracking the seal material and/or glass substrate(s) based on optimizing one or more of laser beam speed, laser beam size, pre-heating temperature, temperature processing, main seal material, and/or seal width.

In certain example embodiments, laser treatment of the material for the main seal layer 30 is performed, during formation of the edge seal 3, in a manner so that the time "T" that a given spot/point/location on the main seal layer 30 and/or the primer layer 31 is above the melting point (Tm) of the material for the main seal layer 30 during laser sintering/firing of the layer 30 is no more than about 5 seconds, more preferably no more than about 3 seconds, more preferably no more than about 2 seconds, more preferably no more than about 1.5 seconds, and for example no more than about 0.75 seconds (e.g., see FIGS. 17-18). Thus, when the melting point (Tm) of the material for the main seal layer is 395 degrees C for purposes of example, during laser sintering/firing of the layer 30 the time "T" at which a spot/point/location on the main seal layer 30 and/or the primer layer 31 is above 395 degrees C is no more than about 3 seconds, more preferably no more than about 2 seconds, and most preferably no more than about 1.5 seconds, as shown in FIGS. 17-18.

In certain example embodiments, as shown in FIGS. 17-18 for example, in order to provide adequate sintering/firing of the main seal layer 30, the maximum temperature of the spot/point/location on the main seal layer 30 and/or the primer layer 31 (e.g., at the interface between the substrate 1 through which the laser beam passes and the adjacent seal material from layer 31 and/or 30) during laser sintering/firing of the layer 30 may be at least about 40 degrees C above the melting point (Tm) of the material for the main seal layer, more preferably at least about 50 degrees C above the melting point (Tm) of the material for the main seal layer, and most preferably at least about 55 or 60 degrees C above the melting point (Tm) of the material for the main seal layer 30. In certain example embodiments, as shown in FIGS. 17-18 for example, in order to reduce de-tempering and reduce chances of seal damage, the maximum temperature of the spot/point/location on the main seal layer 30 and/or the primer layer 31 during laser sintering/firing of the layer 30 may be no more than about 110 degrees C above the melting point (Tm) of the material for the main seal layer 30, and more preferably no more than about 100 degrees C or no more than about 80 degrees C above the melting point (Tm) of the material for the main seal layer 30. In certain example embodiments, this maximum temperature may be at least about 430 degrees C, more preferably at least about 440 degrees C, and most preferably at least about 450 degrees C, and/or this maximum temperature in certain example embodiments may be no greater than about 495 degrees C, more preferably no greater than about 480 degrees C, and sometimes no greater than about 470 degrees C. For example, FIG. 18 shows 462 degrees as the maximum temperature of the spot, which is 67 degrees C above Tm given an example Tm of 395 degrees C.

In certain example embodiments, laser 41 may heat the main seal layer 30 to a temperature from about 370-440, 390-440 or 390-410 degrees C, with an example being about 400 degrees C, which many indicate that the laser heats the glass substrate 1 to primer 31 interface to a temperature of from about 400-475 or 420-475 degrees C, possibly from about 420-450 degrees C, with an example being about 435 degrees C. One or more of the sealing layer(s) 30-32 may be designed to have thermodynamic properties to improve or increase/maximize thermal diffusivity. In certain example embodiments, thermal heat capacity of the sealing glass materials 30-32 may be about 0.792 J/gC, hemispherical emittance about 0.92, and/or thermal diffusivity from about 0.40 mm per second to 0.70 mm per second with an example thermal diffusivity being about 0.55 mm/s. In certain example embodiments, one or more of a laser type, laser power level, laser beam shape, laser beam size (e.g., diameter), thermal conductivity, thermal diffusivity, and/or pre-heat temperature(s) may be optimized for reducing or minimizing residual and transient stress in the fired/sintered main seal layer 30 and/or the glass substrate(s).

It has been found that designing the thermal diffusivity and/or thermal conductivity of primer layer 31 (through which the laser beam 40 passes) and/or main seal layer 30 can advantageously reduce de-tempering of the glass substrate(s) 1 and/or 2 due to laser sintering/firing of the main seal layer 30. For example, the primer layer 31 may be designed and optimized to have a high thermal diffusivity and/or high thermal conductivity to rapidly transfer heat from the laser source through the primer layer 31 to the main seal layer 30 to more quickly sinter/fire the main seal layer 30 and wet the interfaces between the main seal layer 30 and opposing primer layers 31-32, without significantly de-tempering the glass substrates 1 and 2. In certain example embodiments, main seal layer 30 may have one or more of: a lower thermal conductivity than traditional amorphous glass materials, e.g., 0.88 W/mK versus 1.10 W/mK, a lower specific heat capacity, e.g., 0.132 cal/gK versus 0.200 cal/gK, and/or higher mass density, e.g., 3.16 g/cm$^3$ versus 2.47 g/cm$^3$. If one knows thermal conductivity (k) and specific heat capacity of a material, an example relationship for determining thermal diffusivity is D*=k(T)/(100×p(T)×Cp (T)), where D* is thermal diffusivity, k is thermal conductivity, p is mass density, and Cp is specific heat capacity. Further example equations for thermal conductivity (TC=k) and thermal diffusivity (TD=D*) are as follows:

$$k = D^* pC_p \text{ (Thermal Conductivity)}$$

$$D^* = c_x(L^2/t_x) \text{ (Thermal Diffusivity)}$$

where k (TC) is thermal conductivity, D* (TD) is thermal diffusivity, p is mass density, $C_p$ is specific heat capacity, $c_x$ is constant (0.303520), L is material thickness, and $t_x$ is time.

According to certain example embodiments, as shown in Table 8 thermal conductivity (TC) and thermal diffusivity (TD) measurements were taken of components of example vacuum insulated panels at a reference temperature of about 25 degrees C by laser flash method ASTM E1461 for three examples each of main seal layers 30, primer layers 31, and glass substrates 1 in a vacuum insulating panel as shown in FIGS. 2, 6-7, 9, and 11-14, after laser sintering of the main seal layer 30 via laser beam 40 through primer layer 31 and substrate 1, and after disassembly of the panels for measurement purposes. For each sample/example, laser flash thermal diffusivity (TD) measurements involved pulse heating the front side of the sample surface with a short laser pulse, and then measuring the time evolution of the back surface temperature using an JR detector; the resulting temperature profile curve was tailored using a one-dimensional heat flow model, and the sample's TD was then extracted from the model and thermal conductivity (TC) calculated using the TD, average density, and specific heat.

TABLE 8

| | Thermal Conductivity (W/mK) | Thermal Diffusivity (cm$^2$/s) | Specific Heat (cal/gK) | Density (g/cc) |
|---|---|---|---|---|
| Main Seal 30 Ex. 1 | 0.8760 | 0.005432 | 0.132 | 2.918 |
| Main Seal 30 Ex. 2 | 0.8829 | 0.005475 | 0.132 | 2.918 |
| Main Seal 30 Ex. 3 | 0.8880 | 0.005506 | 0.132 | 2.918 |
| Primer 31 Ex. 1 | 1.1605 | 0.005611 | 0.135 | 3.659 |
| Primer 31 Ex. 2 | 1.1479 | 0.005550 | 0.135 | 3.659 |
| Primer 31 Ex. 3 | 1.1520 | 0.005570 | 0.135 | 3.659 |
| Glass Ex. 1 | 1.1178 | 0.005398 | 0.200 | 2.473 |
| Glass Ex. 2 | 1.1022 | 0.005323 | 0.200 | 2.473 |
| Glass Ex. 3 | 1.1135 | 0.005377 | 0.200 | 2.473 |

As shown in Table 8, for the main seal layers 30 the average thermal conductivity was 0.8823 W/mK and the average thermal diffusivity was 0.005471 cm$^2$/s; for the primer seal layers 31 the average thermal conductivity was 1.1535 W/mK and the average thermal diffusivity was 0.005577 cm$^2$/s; and for the soda-lime-silica based glass substrate 1 the average thermal conductivity was 1.1112 W/mK and the average thermal diffusivity was 0.005366 cm$^2$/s. Thus, it can be seen that in certain example embodiments the main seal layer 30 has a lower thermal conductivity than the glass substrates 1 and/or 2, e.g., 0.88 W/mK for the main seal layer 30 versus about 1.10 W/mK for the glass substrate(s); and that the following ratio may be met: TCml<TCg<TCpl, where TCml is the thermal conductivity of the main seal layer 30, TCg is the thermal conductivity of one or more of the glass substrates 1 and/or 2, and TCpl is the thermal conductivity of one or both primer layers 31 and/or 32.

In certain example embodiments, one or both of the ceramic sealing primer layers 31-32 of the edge seal 3, after firing/sintering, may have a thermal conductivity of from about 1.0 to 2.0 W/mK, more preferably from about 1.10 to 1.90 W/mK, more preferably from about 1.10 to 1.50 W/mK, more preferably from about 1.12 W/mK to 1.30 W/mK, even more preferably from about 1.14 W/mK to 1.25 W/mK, with other examples being from about 1.40 W/mK to 1.80 W/mK or about 1.60 W/mK. In certain example embodiments, primer layer(s) 31 and/or 32, after firing/sintering, may have a thermal conductivity of at least 1.00 W/mK, more preferably of at least 1.10 W/mK, more preferably of at least 1.12 W/mK, even more preferably of at least 1.13 W/mK, and most preferably of at least 1.14 or 1.15 W/mK. Many of these are higher than the thermal conductivity of the glass substrates 1 and 2. In certain example embodiments, main seal layer 30, after firing/sintering thereof, may have a thermal conductivity of from about 0.75 to 1.00 W/mK, more preferably from about 0.80 to 0.95 W/mK, more preferably from about 0.85 to 0.95 W/mK, even more preferably from about 0.86 to 0.90 W/mK. Thus, it will be appreciated, that in certain example embodiments the thermal conductivity of the glass substrate 1 and/or 2 is between the thermal conductivity of the main seal layer 30 and the thermal conductivity of the primer layer 31 (TCml<TCg<TCpl), with the primer layer 31 having the highest thermal conductivity of the three for more efficient heat transfer to layer 30 during edge seal formation. In certain example embodiments, the ratio TCpl/TCg of the thermal conductivity of the primer layer 31 (and/or 32) to the thermal conductivity of the glass substrate 1 and/or 2 may be at least 0.950, more preferably at least 1.00, more preferably at least 1.020, more preferably at least 1.030, even more preferably at least 1.035, with an example based on averages in Table 8 being 1.038. In certain example embodiments, the ratio TCpl/TCml of the thermal conductivity of the primer layer 31 (and/or 32) to the thermal conductivity of the main seal layer 30 may be from about 1.2 to 1.5, more preferably from about 1.25 to 1.40, and most preferably from about 1.28 to 1.33, with an example being 1.31 based on averages in Table 8.

In certain example embodiments, one or both of the ceramic sealing primer layers 31-32 of the edge seal 3, after firing/sintering, may have a thermal diffusivity of from 0.0050 to 0.0070 $cm^2/s$, more preferably from 0.0050 to 0.0065 $cm^2/s$, more preferably from 0.0054 to 0.0065 $cm^2/s$, more preferably from 0.0054 to 0.0058 $cm^2/s$, even more preferably from 0.0055 to 0.0057 $cm^2/s$, with an example being 0.0056 based on averages in Table 8. In certain example embodiments, main seal layer 30, after firing/sintering thereof, may have a thermal diffusivity of from 0.0050 to 0.0065 $cm^2/s$, more preferably from 0.0054 to 0.0058 $cm^2/s$, even more preferably from 0.0054 to 0.0056 $cm^2/s$, with an example being 0.0055 based on averages in Table 8. Glass substrate(s) 1 and/or 2 may have a thermal diffusivity of about 0.0053 to 0.0054 $cm^2/s$ in certain example embodiments. Thus, it will be appreciated, that in certain example embodiments the thermal diffusivity of the glass substrate 1 and/or 2 may be less than the thermal diffusivity of the main seal layer 30 (TDg<TDml) and/or less than the thermal diffusivity of the primer layer 31 (TDg<TDpl), where TDg is the thermal diffusivity of the glass substrate(s), TDpl is the thermal diffusivity of primer layer 31 and/or 32, and TDml is the thermal diffusivity of the main seal layer 30. In certain example embodiments, TDpl>TDml. In certain example embodiments, the ratio TDpl/TDg may be at least 1.020, more preferably at least 1.030, even more preferably at least 1.035, with an example based on averages in Table 8 being 1.039. In certain example embodiments, the ratio TDpl/TDml may be at least 1.000, more preferably at least 1.010, even more preferably at least 1.015, with an example based on averages in Table 8 being 1.019.

These thermal diffusivity and/or thermal conductivity ratios and values advantageously allow(s) rapid transfer of heat from the laser source through the primer layer 31 to the main seal layer 30 to quickly sinter/fire the main seal layer 30 and wet the interfaces between the main layer 30 and opposing primer layers 31-32, without significantly de-tempering the glass substrates 1 and 2 during edge seal formation. For instance, the higher the thermal diffusivity and/or thermal conductivity of the primer layer 31 and/or main seal layer 30, (a) the less laser power needed, (b) the less chance of significant de-tempering and/or cracking of the glass substrate 1 and/or 2, and/or (c) thermal stress can be reduced or minimized. Any of these ratio(s) and/or value(s) may be used in combination with any other of these ratio(s) and/or value(s), and may be used in combination with any embodiment(s) herein.

FIG. 8*a* is a top view of a ceramic substantially donut-shaped (or substantially ring-shaped) preform 13 to be used for a seal around pump-out tube 12 according to an example embodiment, which may be used in combination with any embodiment herein including those of FIGS. 1-7. FIG. 8*b* is a cross-sectional view of a ceramic preform seal of FIG. 8*a* according to an example embodiment, and FIG. 8*c* is a schematic cross-sectional diagram of the preform seal of FIGS. 8*a*-8*b* being laser fired/sintered around the pump-out tube, according to an example embodiment. The preform 13 may be formed substantially in a shape of a donut prior to being inserted into the countersunk recess 15 (e.g., double countersink drilled hole shown in FIGS. 1-6) surrounding the pump-out tube 12, as shown in FIGS. 1-8 for example. The donut shape is advantageous in that it increases irradiation surface area at a given geometric configuration, allowing for the preform to be quickly sintered/fired without exposing the adjacent glass to significant de-tempering. As shown in FIGS. 8*b*-8*c*, a sidewall 13*a* of the preform 13 may be angled to expose more surface area of the preform to impingement by a substantially donut-shaped (or substantially ring-shaped) laser beam 13*b* from above. Sidewall(s) 13*a* of the preform may or may not be angled relative to the vertical, in different example embodiments. In certain example embodiments, the acute angle which the sidewall 13*a* may form with the bottom surface 13*c* of the preform may be from about 10-85 degrees, more preferably from about 30-80 degrees, more preferably from about 40-70 degrees, and most preferably from about 45-60 degrees, with an example being 52.5 degrees as shown in FIGS. 8*b*-8*c*, to expose more seal material surface area to the laser beam 13*b* thereby allowing for the preform to be more quickly sintered/fired without exposing the surrounding glass to significant de-tempering. This allows heat from the laser to be more efficiently transferred to the interfaces between the tube and the preform, and between the preform and the substrate. Thus, in certain example embodiments, the size (e.g., outer diameter) of the top wall 13*d* of preform 13 may be smaller than the size (e.g., outer diameter) of the bottom wall 13*c* of the preform. Top wall 13*d* and bottom wall 13*c* are substantially parallel to each other in certain example embodiments. In certain example embodiments, the size (e.g., outer diameter) of the upper surface 13*d* or top wall may be from about 3-9 mm, more preferably from about 5-7 mm; an outer diameter of the pump-out tube 12 may be from about 2-6 mm, more preferably from about 2-4 mm; and/or the height/thickness of the preform 13 may be from about 0.5 to 12.0 mm, more preferably from about 0.5 to 3.0 mm, and most preferably from about 1.0 to 1.4 mm.

FIG. 20 is a flowchart illustrating example steps in making a vacuum insulating panel according to various example embodiments, which may be used in combination with any embodiment herein. Steps 201-204 apply to one of the two substrates, while steps 205-209 apply to the other one of the substrates, and steps 210-213 apply when the substrates are mated to each other via clamping, sealing, and/or the like.

A substrate (e.g., substrate 1 in FIG. 2) is provided in step 201, and another substrate (e.g., substrate 2 in FIG. 2) is provided in step 205. The substrate in step 205 may have a low-E coating 7 provided thereon, which may be edge-deleted in step 206. A primer layer (e.g., 31 in FIG. 2) may be applied to the corresponding substrate (e.g., substrate 1 in FIG. 2) in step 202, whereas the other primer layer (e.g., 32 in FIG. 2) may be applied to the other substrate (e.g., substrate 2 in FIG. 2) in step 207. In various example embodiments, one or both ceramic sealing glass primer layers 31-32 may be boron oxide inclusive and/or bismuth oxide inclusive, and may be applied using silk screen printing, digital printing, pad printing, extrusion coating, ceramic spray coating or nozzle dispense methods. The primer layer(s) 31 and/or 32 may be deposited to achieve a sintered width of about 10 mm around the periphery of the substrates. In certain example embodiments, one or both primer layers may be applied to the glass surface at a thickness from about 40% to 60% higher than the desired target thickness. In an example embodiment, each primer layer as initially deposited may have a solids content of about 75 wt %, solvent about 24 wt. %, and binder about 1 wt. %. The substrates, with respective primers thereon, may then be thermally heated to remove solvents in the material using one of the following substrate heating methods or a combination thereof: radiation, convection, induction, microwave or conduction. The substrates may be heated between 100 degrees C to 250 degrees C for 30 seconds to ten minutes to remove the solvents from the sealing glass material with an example temperature being 180 degrees C for about 4 minutes. Substrates may then be thermally heated to remove organic resin materials in the sealing glass primer material using one of the following substrate heating methods or a combination thereof; radiation, convection, induction, microwave or conduction, such as for example to from 275 degrees C to 400 degrees C for 30 seconds to ten minutes with an example temperature being about 320 degrees C for 6 minutes. The removal of the organic resin material from the primers may be referred to as ceramic sealing glass binder burnout. In steps 203 and 208, the substrates may then be thermally heated for thermally tempering the glass substrates and to sinter and fire the ceramic primer material to the desired physical thickness and material properties using one of the following substrate heating methods or a combination thereof: radiation, convection, induction, microwave or conduction. For example, the substrates 1 and 2 may be heated to from between 575 degrees C to 700 degrees C for 30 seconds to five minutes depending on the thickness of the substrates with an example temperature being 625 degrees C at a rate of 30 seconds per mm of uncoated glass thickness and 60 second per mm of Low-E coated glass thickness. Thus, the primer layers 31-32 are fired/sintered when the corresponding glass substrates 1 and 2 are thermally tempered, in certain example embodiments, in steps 203 and 208. When heat strengthen glass is used instead of tempered glass, in certain example embodiments, the primer layers 31 and/or 32 may be sintered in a step that does not involve tempering. Thus, the primer layers may be dried at a temperature of about 180 degrees C to substantially remove solvents in the sealing glass matrix using thermal heat, and then be thermally heated a temperature of about 320 degrees C to burn out the resin binders that provide the carrier vehicle for the sealing glass paste material, and then be sintered at 625 degrees C. while the glass substrates 1, 2 are thermally tempered to achieve desired properties.

In certain example embodiments, the sintered/fired primer layers 31-32 may be opaque or semi-opaque to visible light with an optical density>0.80 or >0.250. In an example embodiment, a sinter/fired primer may have a physical thickness between about 20 to 240 microns, more preferably from about 160 microns to about 240 microns, with an example thickness(es) of about 145 or 200 microns for primer layer 32, and about 45 microns for primer layer 31. The primer layer on one substrate may be deposited substantially thicker than the primer layer on the other substrate. The primer layer(s) may be opaque or substantially opaque to laser energy over the spectral range of 370 nm to 1500 nm above a minimum thickness, but may transmit a reasonable amount of laser energy at thicknesses below 60 microns for example. The total perimeter seal thickness may be about 280 microns. The thicknesses of the thick primer layer 32, thin primer layer 31 and main seal layer 30 can be optimized to attain desired processing conditions.

In certain example embodiments, in steps 203 and 208, the primer layers 31 and 32 may bond to and/or diffuse into the respective glass substrates upon which they are located since the glass substrates 1, 2 are above the glass softening point, and create a high adhesion strength to the glass substrates. Interdiffusion of the primer layer(s) into the respective glass substrate(s) results in a high adhesion strength to the glass substrates, as for example $SiO_2$ in the primer layer(s) bond to a silicon-rich layer in a soda lime silicate float glass in certain example embodiments. For example, adhesion strength using lap shear mechanical test methods may be from about 60-120 kg per $cm^2$, which is higher than the modulus of rupture of soda lime silicate glass substrates. The primer layers may have a high degree of hermeticity, e.g., less than $1\times10^{-8}$ cc/$m^2$/day of vacuum loss, low moisture vapor transmission rates, and/or provide high levels of mechanical adhesion to the glass substrates, in certain example embodiments. The primer layers may have a CTE of about $8.0\text{-}8.80\times10^{-6}$ or about $8.2\text{-}8.35\times10^{-6}$, and may act as a CTE buffer between the glass substrates with a CTE of about 8.8-9.2 (e.g., about $9.0\times10^{-6}$) and the main seal layer 30 with a CTE of about $7.2\text{-}8.0\times10^{-6}$ or $7.4\text{-}8.0\times10^{-6}$ (e.g., about $7.60\times10^{-6}$) in certain example embodiments.

In step 204, the ceramic sealing glass main layer 30 (e.g., which may be Te oxide based or inclusive) may then applied in paste form (including the binder and solvent mentioned above) to one of the glass substrates over the primer layer (e.g., over primer 31, or over primer 32), such as via silkscreen printing, ceramic spray, extrusion coating, digital printing, pad printing, nozzle dispense or other commercially available ceramic sealing material application methods. The layer 30 may have tellurium oxide as a material with the highest weight percentage and vanadium oxide as a material with the second highest weight percentage, in certain example embodiments. Layer 30 may initially be applied at a thickness that is 30-60% higher (or 40-60% higher) than the desired target thickness for the layer. The main seal layer 30 may then be thermally dried and heated at 204*a* to remove solvents in the sealing glass matrix. The substrate may be thermally heated to remove solvents in the material using one of the following substrate heating methods or a combination thereof; radiation, convection, induction, microwave and/or conduction. The substrate may be heated between 100 degrees C to 250 degrees C. for 30 seconds to ten minutes to remove the solvents from the material with an example temperature being about 180 degrees C for about 4 minutes. In step 204*b*, the material for the main seal layer 30 may then be again heated in order to at least partially decompose the binder therein, for example at temperature(s) of from about 240-350 degrees C, more preferably from about 250-340 degrees C. Step 204*b* may take place either before or after the mating of step 210.

After the spacers are provided on a substrate in step 209, the two glass substrates 1 and 2 may then be mated together and clamped around the periphery of the vacuum insulated unit to create a mated unit in step 210. The pump-out tube 12 and preform 13 may be applied to the substrate having recess 15 between steps 210 and 211 in certain example embodiments. The mated unit may be thermally heated to burn out the resin binders that provide the carrier vehicle for the sealing glass paste material and then pre-glazed in step 211 at a temperature of about 370 degrees C to impart mechanical strength properties and performance between the main layer and primer layer(s). For example, mechanical adhesion strength after the mated unit has been pre-glazed may be about 30 kg per $cm^2$ and can be up to 100 kg per $cm^2$. For example, the perimeter of the vacuum insulated glass unit may be physically clamped with a controlled pressure to assist in setting the final thickness/height of the edge seal 3. The substrates may be thermally heated to remove organic resin materials in the main sealing glass material 30 using one of the following substrate heating methods or a combination thereof; radiation, convection, induction, microwave or conduction. The binder burnout duration (e.g., step 204*b*) may be optimized so that much or substantially all binder is removed from the main layer 30 and the target density and/or porosity may be achieved. After binder burnout of the main layer 30, the physical thickness may be about 10% to 20% thicker than the target final thickness. In various example embodiments, a heating ramp rate(s) may be provided for the binder burn-out, so that air pores or air sinks may be removed from the main layer 30 to create a sealing glass layer with a high density and/or controlled/limited porosity. An example temperature ramp rate may be between about 4 degrees C. per minute and 20 degrees C. per minute, between the initial binder burnout temperature and the main layer glass transition temperature to burn out binder to a given level, as residual carbon in the main layer may impact vacuum cavity pressure. The mated unit may be heated between 250 degrees C to 350 degrees C for 30 seconds to twenty minutes with an example material temperature of 320 degrees C and a duration of 8 minutes, in certain example embodiments; and/or heated between 340 degrees C to 390 degrees C for 30 seconds to ten minutes with an example material temperature of 370 degrees C and a duration of 8 minutes. The mated unit may be heated to about 370 degrees C to pre-glaze the main layer 30 in certain example embodiments. The pre-glaze heating in step 211 may one or more of: (1) create a strong mechanical bond between the primer layer(s) and the main seal layer; (2) the main seal layer may reach or substantially reach its target thickness so the mechanical clamps may be removed prior to laser sintering; and/or (3) reduce process requirements for the laser to enable high linear rates. For example, prior attempts to use laser sintering for vacuum insulated glass have been problematic because the laser used to pre-glaze the material, wet the interfaces, sinter the material and melt the material to remove air pores; most sealing glass materials have a pre-glaze temperature in the range of 420 to 460 degrees C. which is too high and will de-temper the glass during processing. In certain example embodiments, we are able to use a low-temperature sealing glass that is pre-glazed for a short duration (e.g., at 370 degrees C) thereby significantly reducing processing requirements for laser wetting, sintering and/or melting. In certain example embodiments, main seal layer 30 pre-glaze density may be from 3.0-4.0 or 3.2-3.8 grams per $cm^2$, with an example being about 3.6 grams per $cm^2$. In certain example embodiments, mechanical adhesion strength after the mated unit has been pre-glazed may be about 30 kg per $cm^2$ and can be up to at least 100 kg per $cm^2$.

In step 211, the mated unit may be pre-heated to an ambient temperature of about 320 degrees C (e.g., see pre-heating discussion above). The mated unit can be pre-heated using radiation, convection and/or conduction for example, with an example being a precision hot plate incorporating convective heating to achieve desired thermal uniformity across the substrate surfaces. The mated pair may be heated to 320 degrees C. to minimize or reduce the thermal delta between the glass substrate temperature and the sintering/melting point of the main seal layer 30 (e.g., which may be from about 390 degrees C to 410 degrees C) in certain example embodiments, so as to reduce transient thermal stress in the sealing glass materials. For example, transient thermal stress may be about 50 MPa without pre-heating to raise the ambient substrate temperature versus less than 10 MPa with pre-heating the glass substrates to about 320 degrees C.

In step 212, a laser (e.g., a 527 nm, 532 nm, 542 nm, 555 nm, 800 nm, 808 nm, 810 nm, or 940 nm, e.g., continuous wave, laser) 41 may then be used to locally and selectively sinter/fire the main seal layer 30. For example, the laser 41 and/or laser beam 40 may move around the periphery of the vacuum insulated unit using an XYZ gantry robot at a defined linear rate to wet the interface between the fully sintered primer layers 31, 32 and the pre-glazed main seal layer 30, sinter the main seal layer 30 to its final state (e.g., thickness, density and porosity) and to melt or partially melt the material to reduce the size of air pores in the main seal layer 30 and/or at the main layer to primer interface. The laser linear speed, laser power, laser beam size, laser irradiation time, and/or laser thermal decay time may be optimized to achieve desired physical, chemical and/or mechanical properties. For example, the main seal layer 30 may be processed to achieve a sintered width of about 6 mm around the periphery of the vacuum insulated unit. In certain example embodiments, the main layer may be sintered and/or melted using the principle of thermal diffusivity, instead of direct photopic radiation. The glass substrates 1 and 2 may be substantially transparent to the laser energy for example, with around 80% of the laser energy reaching the thin primer layer 31. The thin primer layer 31 at a thickness of 40 microns for example, may act as a graded absorbing layer wherein around 20% of the photopic radiation reaches the primer layer 31 to main seal layer 30 interface. The thickness of the thin primer layer 31 and main seal layer 30 may be optimized to allow the main layer to be sintered and/or melted at a given laser linear rate, power level, beam size, irradiation spot time and/or spot temperature using the principle of thermal diffusivity. The thin primer layer 31 and main seal layer 30 thermal conductivity and density may be designed to increase or maximize the thermal diffusivity rate between the two layers. The seal 13 around the pump-out tube 12 may be laser sintered/fired using the same or a different laser. In various example embodiments, a continuous wave 808-nm or 810-nm laser may be used to one or more of: (1) wet the surface or interface between the thin primer layer 31 and main seal layer 30 and the thick primer layer 32 and the main seal layer 30 to achieve for example a target 40 kg/$cm^2$ mechanical adhesion; (2) locally sinter/fire the main seal layer 30 to densify material; and/or (3) locally melt the main layer material to fill in air voids/pores at the main seal layer 30 to primer layer(s) interface(s) that were generated during the main seal layer application process. While any type of laser may be used in various embodiments for sintering layer 30, a continuous wave laser may be preferred over a scanning/rastering laser scanning lasers may involve multiple pulses at a given irradiation spot resulting in a series of heating and cooling events that can increase transient stress and raise the final residual stress, which could result in micro-cracks that result in no or poor hermeticity. The sintered main seal layer 30 may have an example density of about 3.16 g/cc (g/$cm^3$) which is considerably higher than the soda lime silicate base glass, 2.50 g/cc, and a porosity of less than 0.02%.

In step 213, the vacuum insulating panel is then evacuated to a low pressure using the pump-out tube 12, the tube closed off, and a cap 14 may be applied thereto. For example, the vacuum insulating panel may have one or more of: a compressive surface stress of at least about 12,000 psi, a central tensile stress of at least about 6,000 psi, a center to edge stress gradient of no more than about 2,000 psi, a glass edge stress greater than about 9,700 psi, a high degree of hermeticity of about $1\times10^{-8}$ cc/m$^2$/day, a lap shear mechanical strength of at least 30 kg per cm$^2$, a high thermal edge strength supporting an inner to outer glass substrate asymmetric thermal stress load of at least 70 degrees C, and/or any combination thereof.

In certain example embodiments, there may be provided a thermally insulating glass panel comprising: first and second spaced apart glass substrates defining a low pressure space therebetween having a pressure less than atmospheric pressure; a plurality of spacers disposed between at least said first and second glass substrates for spacing said substrates from one another in order to maintain said low pressure space therebetween; and a hermetic edge and/or peripheral seal including at least one sealing material. In certain example embodiments, one or more of a range of primer and/or main seal layer thicknesses, transparent and/or opaque primer layers, laser wavelengths, and/or laser processing conditions, or any combination thereof, may be provided to achieve desired physical, chemical and/or mechanical properties, and vacuum insulated unit end product configurations. Certain example embodiments may relate to vacuum insulating panels optimized for high-speed manufacturing utilizing one or more of thermal pre-glazing, localized laser sintering, and/or localized laser melting of the perimeter main sealing glass material(s).

In an example embodiment, there is provided a vacuum insulating panel comprising: a first substrate (e.g., 1 or 2); a second substrate (e.g., the other of 1 or 2); a plurality of spacers (e.g., 4) provided in a gap (e.g., 5) between at least the first and second substrates, wherein the gap (e.g., 5) is at pressure less than atmospheric pressure; a seal (e.g., 3) provided at least partially between at least the first and second substrates, the seal comprising a ceramic first seal layer (e.g., 30); and wherein the first seal layer (e.g., 30) has a melting point of no greater than about 450 degrees C (more preferably no greater than about 430 degrees C, more preferably no greater than about 420 degrees C, and for example no greater than about 400 degrees C) and comprises from about 5 to 70 ppm carbon, more preferably from about 5 to 43 ppm carbon (C).

In an example embodiment, there is provided a vacuum insulating panel comprising: a first glass substrate (e.g., 1 or 2); a second glass substrate (e.g., the other of 1 or 2); a plurality of spacers (e.g., 4) provided in a gap (e.g., 5) between at least the first and second substrates, wherein the gap is at pressure less than atmospheric pressure; a seal (e.g., 3) provided at least partially between at least the first and second substrates, the seal (e.g., 3) comprising a first seal layer (e.g., 30); wherein the first seal layer (e.g., 30) comprises tellurium oxide and/or vanadium oxide, and wherein on an elemental basis in terms of wt. % either Te or V has the largest content of any metal in the first seal layer; and wherein the first seal layer comprises from about 5 to 70 ppm carbon, more preferably from about 5 to 50 ppm carbon, more preferably from about 5 to 43 ppm carbon.

In an example embodiment, there is provided a vacuum insulating panel comprising: a first glass substrate (e.g., 1 or 2); a second glass substrate (e.g., the other of 1 or 2); a plurality of spacers (e.g., 4) provided in a gap (e.g., 5) between at least the first and second substrates, wherein the gap is at pressure less than atmospheric pressure; a seal (e.g., 3) provided at least partially between at least the first and second substrates, the seal (e.g., 3) comprising a first seal layer (e.g., 30); wherein the first seal layer (e.g., 30) comprises tellurium oxide and/or vanadium oxide, and wherein on an elemental basis in terms of wt. % either Te or V has the largest content of any metal in the first seal layer; and wherein the first seal layer comprises no more than about 70 ppm carbon, more preferably no more than about 50 ppm carbon, more preferably no more than about 45 ppm carbon, more preferably no more than about 40 ppm carbon, more preferably no more than about 35 ppm carbon, and most preferably no more than about 30 ppm carbon.

In the vacuum insulating panel of any of the preceding three paragraphs, the first seal layer may comprise from about 5-70 ppm carbon, more preferably from about 5-50 ppm carbon, more preferably from about 5-43 ppm carbon, more preferably from about 10-40 ppm carbon, and for example from about 20-35 ppm carbon.

In the vacuum insulating panel of any of the preceding four paragraphs, the first seal layer may comprise no more than about 50 ppm carbon, more preferably no more than about 45 ppm carbon, more preferably no more than about 40 ppm carbon, more preferably no more than about 35 ppm carbon, more preferably no more than about 30 ppm carbon.

In the vacuum insulating panel of any of the preceding five paragraphs, the first seal layer may have a melting point of no greater than about 430 degrees C, more preferably no greater than about 420 degrees C, more preferably from about 380-420 degrees C.

In the vacuum insulating panel of any of the preceding six paragraphs, the first seal layer may comprise tellurium oxide and/or vanadium oxide, and on an elemental basis in terms of wt. % either Te or V may have the largest content of any metal in the first seal layer.

In the vacuum insulating panel of any of the preceding seven paragraphs, the first seal layer may comprise from about 20-80 wt. % tellurium oxide, the tellurium oxide comprising $TeO_4$ and $TeO_3$, and wherein the first seal layer may comprise more $TeO_3$ than $TeO_4$ by wt. %.

In the vacuum insulating panel of any of the preceding eight paragraphs, the first seal layer may comprise from about 40-70 wt. % tellurium oxide.

In the vacuum insulating panel of any of the preceding nine paragraphs, the first seal layer may comprise tellurium oxide, and from about 60-95% of Te in the first seal layer may be in a form of $TeO_3$.

In the vacuum insulating panel of any of the preceding ten paragraphs, the first seal layer may comprise tellurium oxide, and from about 70-90% of Te in the first seal layer may be in a form of $TeO_3$.

In the vacuum insulating panel of any of the preceding eleven paragraphs, the first seal layer may comprise tellurium oxide, and from about 3-35% of Te in the first seal layer may be in a form of $TeO_4$.

In the vacuum insulating panel of any of the preceding twelve paragraphs, the first seal layer may comprise tellurium oxide, and from about 5-25% of Te in the first seal layer may be in a form of $TeO_4$.

In the vacuum insulating panel of any of the preceding thirteen paragraphs, the first seal layer may comprise tellurium oxide which may comprise $TeO_{3+1}$, and wherein the first seal layer may comprise more $TeO_3$ than $TeO_{3+1}$ by wt. %.

In the vacuum insulating panel of any of the preceding fourteen paragraphs, the first seal layer may comprise tellurium oxide, and a ratio $TeO_4$:$TeO_3$ in the first seal layer may be from about 0.05 to 0.40.

In the vacuum insulating panel of any of the preceding fifteen paragraphs, the first seal layer may comprise tellurium oxide and vanadium oxide, and wherein the first seal layer by wt. % may comprises more tellurium oxide than vanadium oxide.

In the vacuum insulating panel of any of the preceding sixteen paragraphs, the first seal layer may vanadium oxide which comprises $VO_2$ and $V_2O_5$, wherein more V in the first seal layer may be in a form of $VO_2$ than $V_2O_5$.

In the vacuum insulating panel of any of the preceding seventeen paragraphs, the first seal layer may vanadium oxide, and wherein from about 35-85% of the V in the first seal layer may be in a form of $VO_2$, more preferably from about 50-75% of the V in the first seal layer may be in a form of $VO_2$.

In the vacuum insulating panel of any of the preceding eighteen paragraphs, the first seal layer may vanadium oxide, and wherein from about 10-35% of the V in the first seal layer may be in a form of $V_2O_5$.

In the vacuum insulating panel of any of the preceding nineteen paragraphs, the first seal layer may vanadium oxide, wherein the vanadium oxide comprises $V_2O_3$, and wherein more V in the first seal layer may be in a form of $VO_2$ than $V_2O_3$.

In the vacuum insulating panel of any of the preceding twenty paragraphs, the first seal layer may vanadium oxide, and wherein a ratio $V_2O_5$:$VO_2$ in the first seal layer may be from about 0.10 to 0.90, more preferably from about 0.25 to 0.50.

In the vacuum insulating panel of any of the preceding twenty-one paragraphs, the seal may further comprise a second seal layer and/or a third seal layer, where the second and/or third seal layers may be primer layers of the seal. The second seal layer and/or the third seal layer may comprise less carbon on a ppm basis than does the first seal layer.

In the vacuum insulating panel of any of the preceding twenty-two paragraphs, the seal may further comprise a second seal layer which comprises bismuth oxide and/or boron oxide, and wherein the second seal layer may have a higher melting point than does the first seal layer.

In the vacuum insulating panel of any of the preceding twenty-three paragraphs, the seal may further comprise a second seal layer wherein the second seal layer may have a melting point of at least about 500 degrees C, more preferably of at least about 600 degrees C, and for example from about 575-680 degrees C.

In the vacuum insulating panel of any of the preceding twenty-four paragraphs, the seal may further comprise a second seal layer where the second seal layer may have a melting point at least about 100 degrees C higher, more preferably at least about 150 degrees higher, and more preferably at least about 200 degrees higher, than the melting point of the first seal layer.

In the vacuum insulating panel of any of the preceding twenty-five paragraphs, the seal may further comprise a second seal layer where the second seal layer may comprise from about 1-40 mol % bismuth and/or from about 3-40 mol % boron on an elemental basis, and/or may comprises at least two times more boron than bismuth on an elemental basis in terms of mol %. The seal may further comprise a third seal layer, the first seal layer being located between the second and third seal layers. For at least one location of the seal, the first seal layer may have a first thickness, the second seal layer a second thickness, and the third seal layer a third thickness; and wherein the first thickness may be greater than the second thickness and less than the third thickness. The third seal layer may comprise from about 1-40 mol % bismuth and/or from about 3-40 mol % boron on an elemental basis, and may comprise at least two times more boron than bismuth on an elemental basis in terms of mol %.

In the vacuum insulating panel of any of the preceding twenty-six paragraphs, the seal may be substantially lead-free.

In the vacuum insulating panel of any of the preceding twenty-seven paragraphs, the first seal layer may comprise: from about 40-70% wt. % tellurium oxide, from about 12-40 wt. % vanadium oxide, from about 3-30 wt. % aluminum oxide, and from about 1-25 wt. % silicon oxide.

In the vacuum insulating panel of any of the preceding twenty-eight paragraphs, the first seal layer may have a physical thickness of from about from about 40-100 μm.

In the vacuum insulating panel of any of the preceding twenty-nine paragraphs, the first and second substrates may comprise glass substrates.

In the vacuum insulating panel of any of the preceding thirty paragraphs, the first and second substrates may comprise tempered glass substrates or heat strengthened glass substrates.

In the vacuum insulating panel of any of the preceding thirty-one paragraphs, the seal may be a hermetic edge seal of the vacuum insulating panel.

In the vacuum insulating panel of any of the preceding thirty-two paragraphs, the panel may be configured for use in a window.

The vacuum insulating panel of any of the preceding thirty-three paragraphs may be made via a method of making the vacuum insulating panel, wherein the method of making the panel may comprise: providing a material for the first seal layer on at least one of the substrates in a form of a paste, the paste comprising a solvent and a binder and comprising at least 50,000 ppm carbon; heating the material for the first seal layer in at least one heating step in order to substantially remove the solvent and substantially decompose the binder so that after said heating the material for the first seal layer comprises from about 5 to 43 ppm carbon; using a laser to heat the material for first seal layer comprising from about 5 to 43 ppm carbon to form the seal provided at least partially between at least the first and second substrates, so that after using the laser to form the seal the first seal layer comprises no more than about 40 ppm carbon, the first seal layer having a melting point of no greater than about 450 degrees C.; and after forming the seal, evacuating the gap between at least the first and second glass substrates to pressure less than atmospheric pressure.

It is to be understood that a singular form of a noun corresponding to an item may include one or more of the things, unless the relevant context clearly indicates otherwise. As used herein, “A or B”, “at least one of A and B”, “at least one of A or B”, “A, B or C”, “at least one of A, B and C”, and “A, B, or C,” each of which may include any one of the items listed together in the corresponding one of the phrases, or all possible combinations thereof. Terms such as “first”, “second”, or “first” or “second” may simply be used to distinguish the component from other components in question, and do not limit the components in other aspects (e.g., importance or order). Terms, such as “first”, “second”, and the like, may be used herein to describe various components. Each of these terminologies is not used to define an essence, order or sequence of a corresponding component but used merely to distinguish the corresponding component from other component(s). For example, a “first” component may be referred to as a “second” component, and similarly, the "second" component may be referred to as the "first" component. "Or" as used herein may cover both "and" and or.

It should be noted that if it is described that one component is "connected", "coupled", or "joined" to another component, at least a third component(s) may be "connected", "coupled", and "joined" between the first and second components, although the first component may be directly connected, coupled, or joined to the second component. Thus, terms such as "connected" and "coupled" cover both direct and indirectly connections and couplings.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The word "about" as used herein means the identified value plus/minus 5%.

"On" as used herein covers both directly on, and indirectly on with intervening element(s) therebetween. Thus, for example, if element A is stated to be "on" element B, this covers element A being directly and/or indirectly on element B. Likewise, "supported by" as used herein covers both in physical contact with, and indirectly supported by with intervening element(s) therebetween.

Each embodiment herein may be used in combination with any other embodiment(s) described herein.

While the disclosure has been illustrated and described with reference to various example embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in combination with any other embodiment(s) described herein.

The invention claimed is:

1. A vacuum insulating panel comprising:

a first substrate;

a second substrate;

a plurality of spacers provided in a gap between at least the first and second substrates, wherein the gap is at pressure less than atmospheric pressure;

a seal provided at least partially between at least the first and second substrates, the seal comprising a ceramic first seal layer;

wherein the first seal layer has a melting point of no greater than about 450 degrees C and comprises from about 5 to 43 ppm carbon, and wherein the seal further comprises a second seal layer, the second seal layer comprising bismuth oxide and/or boron oxide, and wherein the second seal layer has a higher melting point than does the first seal layer.

2. The vacuum insulating panel of claim 1, wherein the first seal layer comprises from about 10-40 ppm carbon.

3. The vacuum insulating panel of claim 1, wherein the first seal layer comprises from about 20-35 ppm carbon.

4. The vacuum insulating panel of claim 1, wherein the first seal layer comprises no more than about 35 ppm carbon.

5. The vacuum insulating panel of claim 1, wherein the first seal layer comprises no more than about 30 ppm carbon.

6. The vacuum insulating panel of claim 1, wherein the first seal layer has a melting point of no greater than about 430 degrees C.

7. The vacuum insulating panel of claim 1, wherein the first seal layer has a melting point of no greater than about 420 degrees C.

8. The vacuum insulating panel of claim 1, wherein the first seal layer has a melting point of from about 380-420 degrees C.

9. The vacuum insulating panel of claim 1, wherein the first seal layer comprises tellurium oxide and/or vanadium oxide, and wherein on an elemental basis in terms of wt. % either Te or V has the largest content of any metal in the first seal layer.

10. The vacuum insulating panel of claim 1, wherein the first seal layer comprises from about 20-80 wt. % tellurium oxide, the tellurium oxide comprising $TeO_4$ and $TeO_3$, and wherein the first seal layer comprises more $TeO_3$ than $TeO_4$ by wt. %.

11. The vacuum insulating panel of claim 1, wherein the first seal layer comprises from about 40-70 wt. % tellurium oxide.

12. The vacuum insulating panel of claim 10, wherein from about 60-95% of tellurium oxide in the first seal layer is in a form of $TeO_3$.

13. The vacuum insulating panel of claim 10, wherein from about 70-90% of tellurium oxide in the first seal layer is in a form of $TeO_3$.

14. The vacuum insulating panel of claim 10, wherein from about 3-35% of tellurium oxide in the first seal layer is in a form of $TeO_4$.

15. The vacuum insulating panel of claim 10, wherein from about 5-25% of tellurium oxide Te in the first seal layer is in a form of $TeO_4$.

16. The vacuum insulating panel of claim 10, wherein the tellurium oxide further comprises $TeO_{3+1}$, and wherein the first seal layer comprises more $TeO_3$ than $TeO_{3+1}$ by wt. %.

17. The vacuum insulating panel of claim 10, wherein a ratio $TeO_4$:$TeO_3$ in the first seal layer is from about 0.05 to 0.40.

18. The vacuum insulating panel of claim 1, wherein the first seal layer comprises vanadium oxide and from about 20-80 wt. % tellurium oxide, and wherein the first seal layer by wt. % comprises more tellurium oxide than vanadium oxide.

19. The vacuum insulating panel of claim 18, wherein the vanadium oxide comprises $VO_2$ and $V_2O_5$, and wherein more vanadium oxide in the first seal layer is in a form of $VO_2$ than $V_2O_5$.

20. The vacuum insulating panel of claim 18, wherein from about 35-85% of the vanadium oxide in the first seal layer is in a form of $VO_2$.

21. The vacuum insulating panel of claim 18, wherein from about 50-75% of the vanadium oxide in the first seal layer is in a form of $VO_2$.

22. The vacuum insulating panel of claim 18, wherein from about 10-35% of the vanadium oxide in the first seal layer is in a form of $V_2O_5$.

23. The vacuum insulating panel of claim 19, wherein the vanadium oxide further comprises $V_2O_3$, and wherein more vanadium oxide in the first seal layer is in a form of $VO_2$ than $V_2O_3$.

24. The vacuum insulating panel of claim 19, wherein a ratio $V_2O_5$:$VO_2$ in the first seal layer is from about 0.10 to 0.90.

25. The vacuum insulating panel of claim 19, wherein a ratio $V_2O_5$:$VO_2$ in the first seal layer is from about 0.25 to 0.50.

26. The vacuum insulating panel of claim 1, wherein the second seal layer has a melting point of at least about 500 degrees C.

27. The vacuum insulating panel of claim 1, wherein the second seal layer has a melting point of at least about 600 degrees C.

28. The vacuum insulating panel of claim 1, wherein the second seal layer has a melting point of from about 575-680 degrees C.

29. The vacuum insulating panel of claim 1, wherein the second seal layer has a melting point at least about 100 degrees C higher than the melting point of the first seal layer.

30. The vacuum insulating panel of claim 1, wherein the second seal layer comprises from about 1-40 mol % bismuth and from about 3-40 mol % boron on an elemental basis, and comprises at least two times more boron than bismuth on an elemental basis in terms of mol %.

31. The vacuum insulating panel of claim 1, wherein the seal further comprises a third seal layer, the first seal layer being located between the second and third seal layers.

32. The vacuum insulating panel of claim 31, wherein for at least one location of the seal, the first seal layer has a first thickness, the second seal layer has a second thickness, and the third seal layer has a third thickness; and wherein the first thickness is greater than the second thickness and less than the third thickness.

33. The vacuum insulating panel of claim 31, wherein the third seal layer comprises from about 1-40 mol % bismuth and from about 3-40 mol % boron on an elemental basis, and comprises at least two times more boron than bismuth on an elemental basis in terms of mol %.

34. The vacuum insulating panel of claim 1, wherein the seal is substantially lead-free.

35. The vacuum insulating panel of claim 1, wherein the first seal layer has a physical thickness of from about from about 40-100 um.

36. The vacuum insulating panel of claim 1, wherein the first and second substrates comprise glass substrates.

37. The vacuum insulating panel of claim 1, wherein the first and second substrates comprise tempered glass substrates or heat strengthened glass substrates.

38. The vacuum insulating panel of claim 1, wherein the seal is a hermetic edge seal of the vacuum insulating panel.

39. The vacuum insulating panel of claim 1, wherein the panel is configured for use in a window.

40. The vacuum insulating panel of claim 1, wherein the first seal layer on a ppm basis contains more carbon than does the second seal layer.

41. The vacuum insulating panel of claim 1, wherein the first and second seal layers overlap each other as viewed from above and/or below.

42. The vacuum insulating panel of claim 1, wherein the first and second seal layers directly contact each other.

43. A vacuum insulating panel comprising:

a first substrate;

a second substrate;

a plurality of spacers provided in a gap between at least the first and second substrates, wherein the gap is at pressure less than atmospheric pressure;

a seal provided at least partially between at least the first and second substrates, the seal comprising a ceramic first seal layer;

wherein the first seal layer has a melting point of no greater than about 450 degrees C and comprises from about 5 to 43 ppm carbon, and wherein the first seal layer comprises: from about 40-70% wt. % tellurium oxide, from about 12-40 wt. % vanadium oxide, from about 3-30 wt. % aluminum oxide, and from about 1-25 wt. % silicon oxide.

44. A vacuum insulating panel comprising:

a first glass substrate;

a second glass substrate;

a plurality of spacers provided in a gap between at least the first and second substrates, wherein the gap is at pressure less than atmospheric pressure;

a seal provided at least partially between at least the first and second substrates, the seal comprising a first seal layer;

wherein the first seal layer comprises tellurium oxide and/or vanadium oxide, and wherein on an elemental basis in terms of wt. % either Te or V has the largest content of any metal in the first seal layer;

wherein the first seal layer comprises from about 5 to 70 ppm carbon, and wherein the seal further comprises a second seal layer, the second seal layer comprising bismuth oxide and/or boron oxide, and wherein the second seal layer has a higher melting point than does the first seal layer.

45. The vacuum insulating panel of claim 44, wherein, on wt. % basis, tellurium oxide and vanadium oxide have the highest two metal oxide contents of metal oxides in the first seal layer.

46. The vacuum insulating panel of claim 44, wherein the first seal layer comprises from about 5-43 ppm carbon.

47. The vacuum insulating panel of claim 44, wherein the first seal layer comprises from about 20-35 ppm carbon.

48. The vacuum insulating panel of claim 44, wherein the seal further comprises a third seal layer that comprises boron oxide and/or bismuth oxide.

49. The vacuum insulating panel of claim 44, wherein the first seal layer comprises from about 20-80 wt. % tellurium oxide, the tellurium oxide comprising $TeO_4$ and $TeO_3$, and wherein the first seal layer comprises more $TeO_3$ than $TeO_4$ by wt. %.

50. A vacuum insulating panel comprising:

a first glass substrate;

a second glass substrate;

at least one spacer provided in a gap between at least the first and second substrates, wherein the gap is at pressure less than atmospheric pressure;

a seal provided at least partially between at least the first and second glass substrates, the seal comprising a first seal layer and a second seal layer;

wherein the first seal layer comprises tellurium oxide and/or vanadium oxide, and wherein on an elemental basis in terms of wt. % either Te or V has the largest content of any metal in the first seal layer, and wherein the second seal layer comprises bismuth oxide and/or boron oxide;

wherein the first seal layer comprises no more than about 70 ppm carbon, and wherein the first seal layer on a ppm basis contains more carbon than does the second seal layer, and wherein the second seal layer has a melting point at least 100 degrees higher than does the first seal layer.

51. The vacuum insulating panel of claim 50, wherein the first seal layer comprises no more than about 45 ppm carbon.

52. The vacuum insulating panel of claim 50, wherein the first seal layer comprises no more than about 40 ppm carbon.

53. The vacuum insulating panel of claim 50, wherein the first seal layer comprises no more than about 30 ppm carbon.

54. The vacuum insulating panel of claim 50, wherein the first seal layer comprises from about 20-80 wt. % tellurium oxide, the tellurium oxide comprising $TeO_4$ and $TeO_3$, and wherein the first seal layer comprises more $TeO_3$ than $TeO_4$ by wt. %.

55. The vacuum insulating panel of claim 50, wherein the first seal layer has a melting point of no greater than about 430 degrees C.

56. A vacuum insulating panel comprising:

a first glass substrate;

a second glass substrate;

a plurality of spacers provided in a gap between at least the first and second substrates, wherein the gap is at pressure less than atmospheric pressure;

a seal provided at least partially between at least the first and second substrates, the seal comprising a first seal layer and a second seal layer contacting each other;

wherein the first seal layer comprises tellurium oxide and/or vanadium oxide;

wherein the second seal layer comprises bismuth oxide and/or boron oxide, and wherein the second seal layer has a melting point at least 100 degrees higher than does the first seal layer; and wherein the first seal layer comprises no more than about 50 ppm carbon, and wherein the first seal layer on a ppm basis contains more carbon than does the second seal layer.

57. The vacuum insulating panel of claim 56, wherein the first seal layer comprises from about 40-70 wt. % tellurium oxide, and has a melting point of no greater than about 450 degrees C.

58. The vacuum insulating panel of claim 57, wherein the first seal layer comprises from about 10-40 ppm carbon.

59. The vacuum insulating panel of claim 56, wherein the second seal layer has a melting point of at least about 500 degrees C.

* * * * *